United States Patent [19]

Eickmann

[11] Patent Number: 4,822,255
[45] Date of Patent: Apr. 18, 1989

[54] PUMP FOR PRESSURES EXCEEDING ONE THOUSAND ATMOSPHERES BY THE PROVISION OF A HALF-PRESSURE CHAMBER AROUND A HIGH PRESSURE CHAMBER BETWEEN CONED RING ELEMENTS

[76] Inventor: Karl Eickmann, 2420 Isshiki, Hayama-machi, Kanagawa-ken, Japan

[21] Appl. No.: 37,910

[22] Filed: Apr. 8, 1987

Related U.S. Application Data

[63] Continuation-in-part of Ser. No. 788,174, Oct. 16, 1965, Pat. No. 4,701,113, which is a continuation-in-part of Ser. No. 282,990, Jul. 14, 1981, Pat. No. 4,557,347, and a continuation-in-part of Ser. No. 387,567, Jun. 11, 1982, Pat. No. 4,569,630.

[51] Int. Cl.4 ............................................. F04R 43/10
[52] U.S. Cl. .................................... 417/401; 417/472; 92/42; 92/45
[58] Field of Search ............... 417/472, 392, 401, 402; 92/42, 45, 46

[56] References Cited

U.S. PATENT DOCUMENTS

| | | | |
|---|---|---|---|
| 1,580,479 | 4/1926 | Frankenfield | 92/45 X |
| 3,224,344 | 12/1965 | Baumann et al. | 92/45 |
| 3,394,631 | 7/1968 | Thompson | 92/46 |
| 4,483,665 | 11/1984 | Hauser | 417/472 X |
| 4,536,135 | 8/1985 | Olsen et al. | 417/383 |

FOREIGN PATENT DOCUMENTS

| | | | |
|---|---|---|---|
| 1182389 | 1/1959 | France | 417/402 |
| 687254 | 9/1979 | U.S.S.R. | 417/472 |

Primary Examiner—Paul F. Neils

[57] ABSTRACT

A pump has in a housing a revolvable shaft which drives a piston stroke guide body. Drive pistons are provided with piston shoes which run on the guide face of the piston stroke guide body and drive fluid supply pistons of smaller diameter. The pump preferies a fluid separator between lubricating and non-lubricating fluid, like for example, between oil and water, whereof one of the fluids flows through an inner chamber which is provided with inlet and outlet valves while the outer fluid acts in an outer chamber which is open toward the cylinder wherein the fluid supply piston reciprocates. Dead space fillers are provided to prevent losses by compression of fluid and seal means are assembled to prevent leakage of fluid from one into the other of the chambers. The fluid separator may be compressible and expandable within the plastic deformable range of the material whereof it is made. The pump includes sophisticated technologies which necessiated more than half a decade of intensive research and testing but it is now capable of pumping fluid, including water, of several thousand atmospheres of pressure.

4 Claims, 42 Drawing Sheets $tg\, \alpha = S/\Delta R$ (1)
$LR = \sqrt{S^2 + (\Delta R)^2} = 1/\Delta R \cos \alpha$ (2)
$\Delta R = LR \cos \alpha$ (3)
$S = LR \sin \alpha$ (4)

$$\delta = \frac{P}{E} \frac{(D/d)^2 + 0{,}7}{(D/d)^2 - 1} d \quad (5)$$

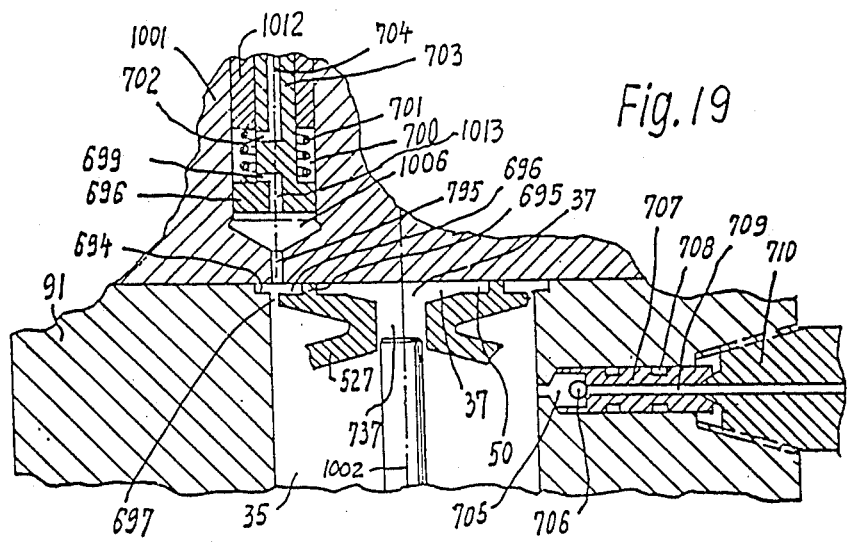
Fig. 17
Fig. 18
Fig. 19
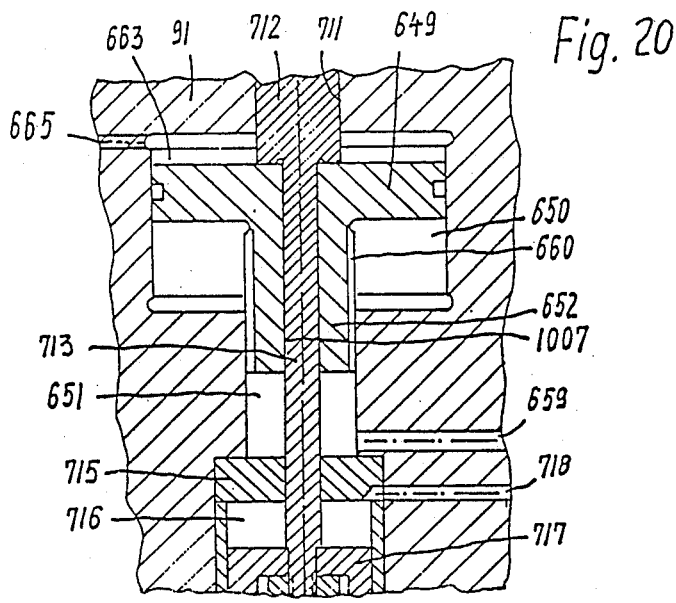
Fig. 20

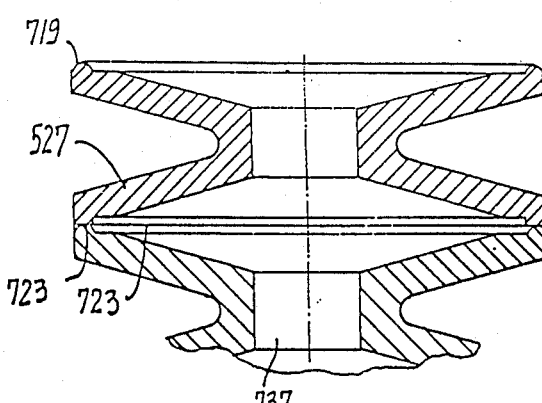
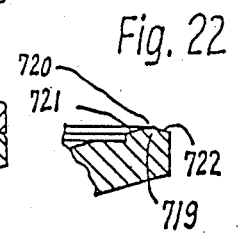
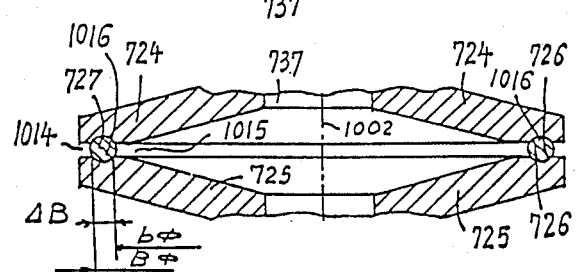
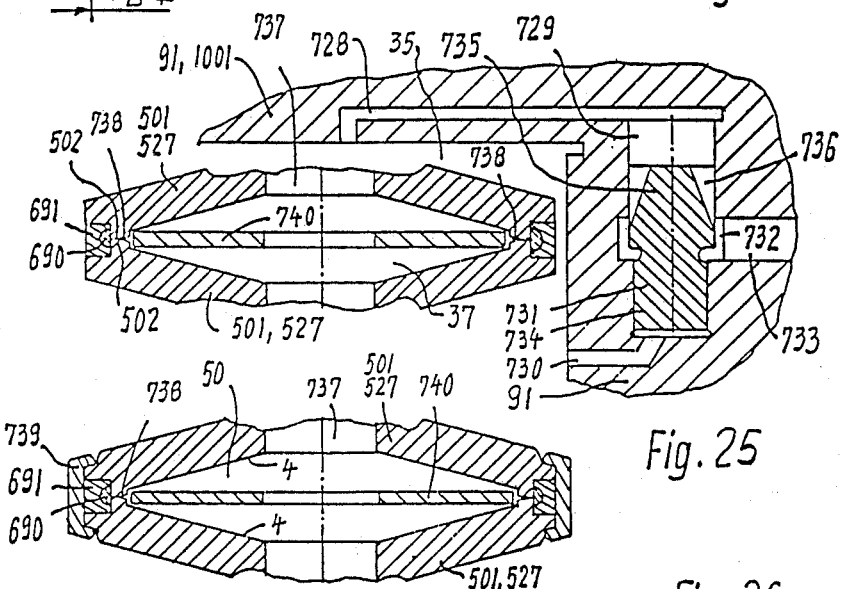
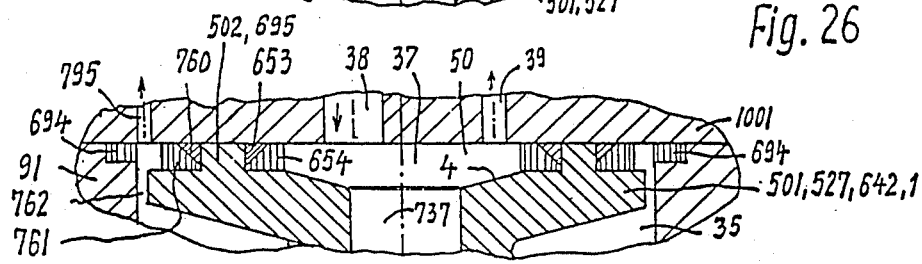

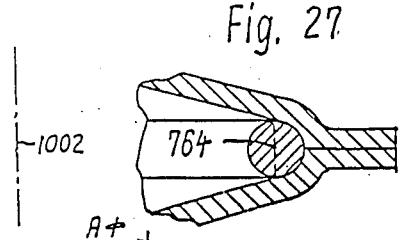
Fig. 27
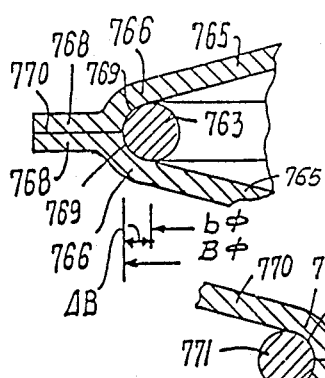
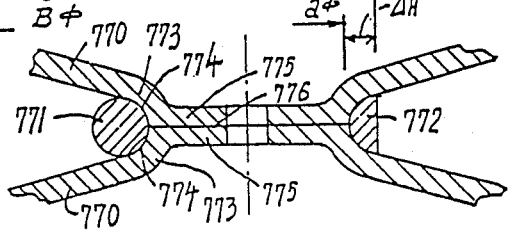
Fig. 28
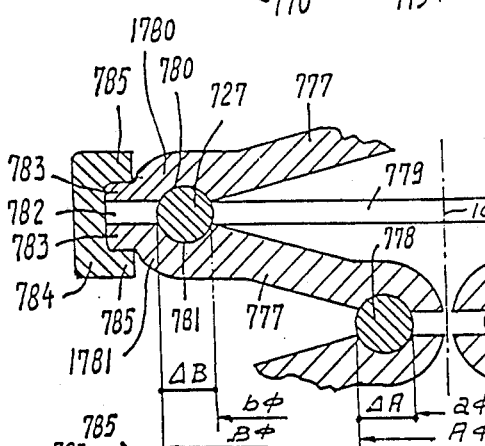
Fig. 29
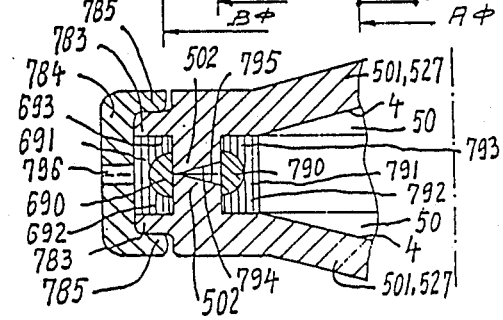
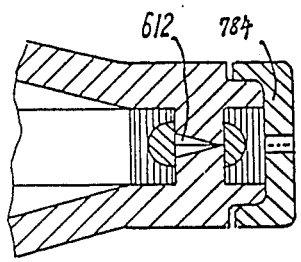
Fig. 30
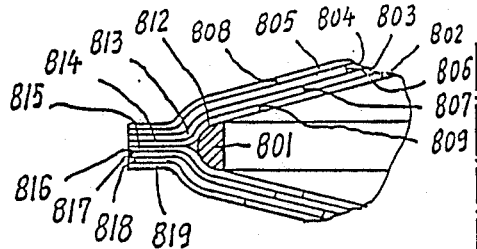
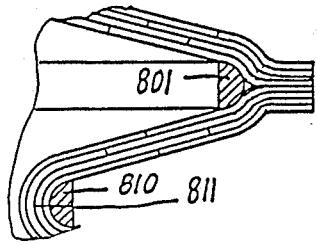
Fig. 31

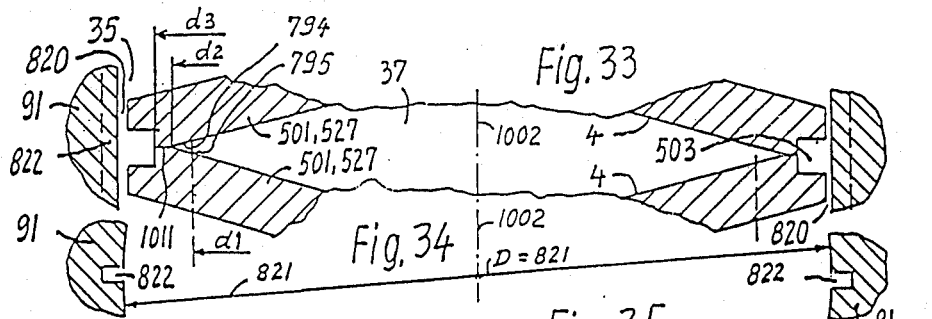
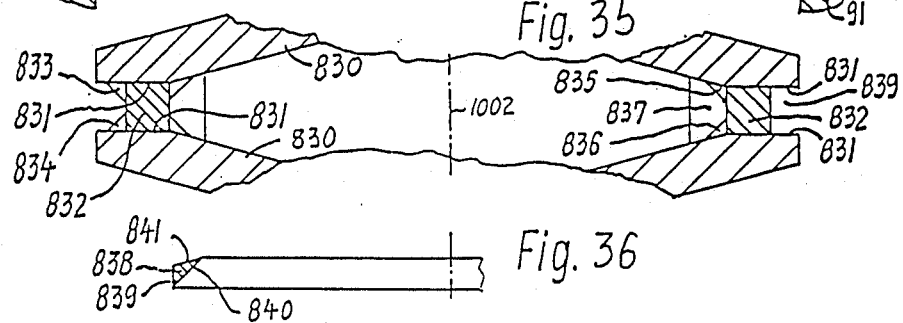
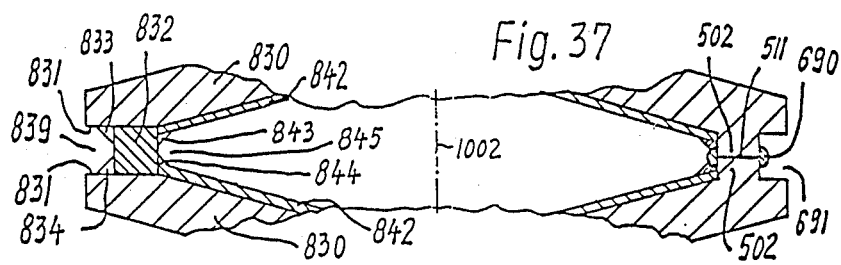
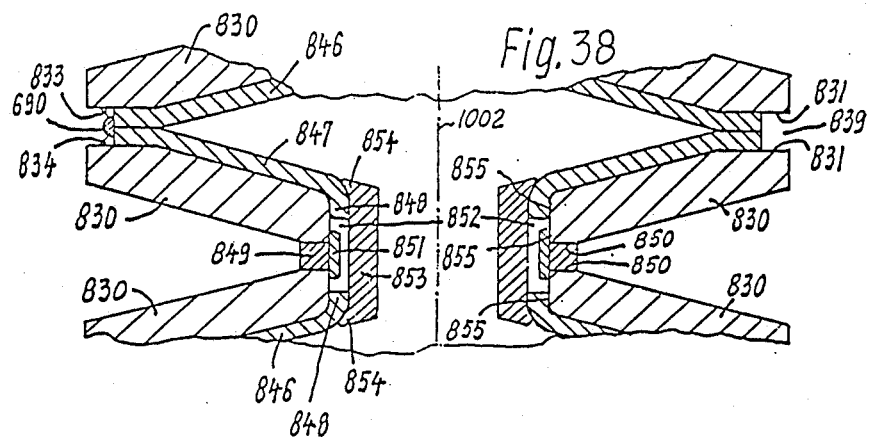

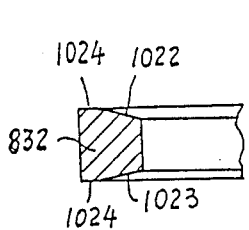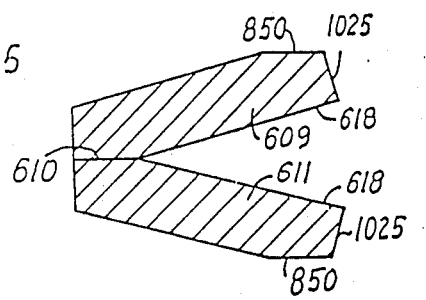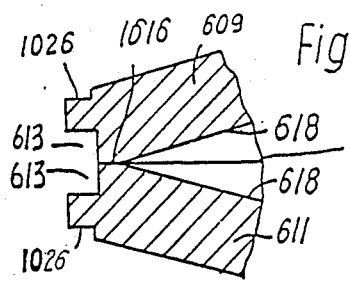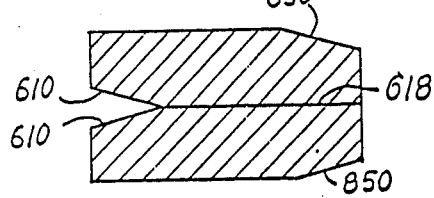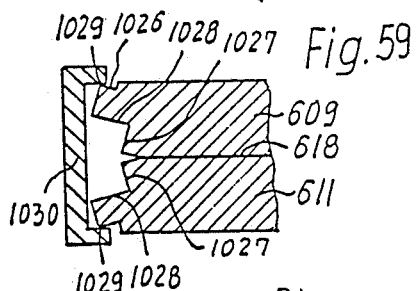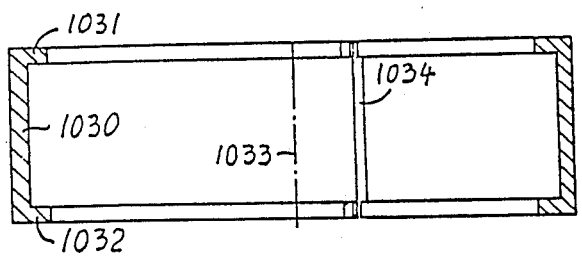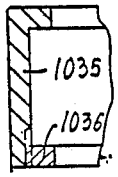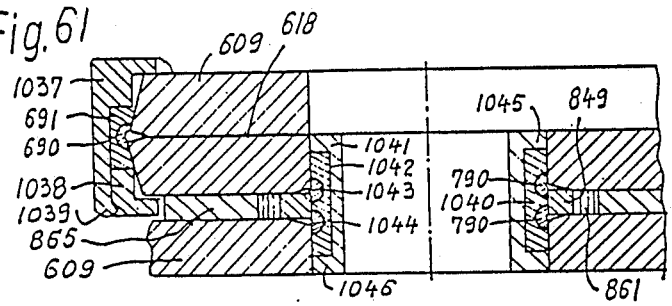

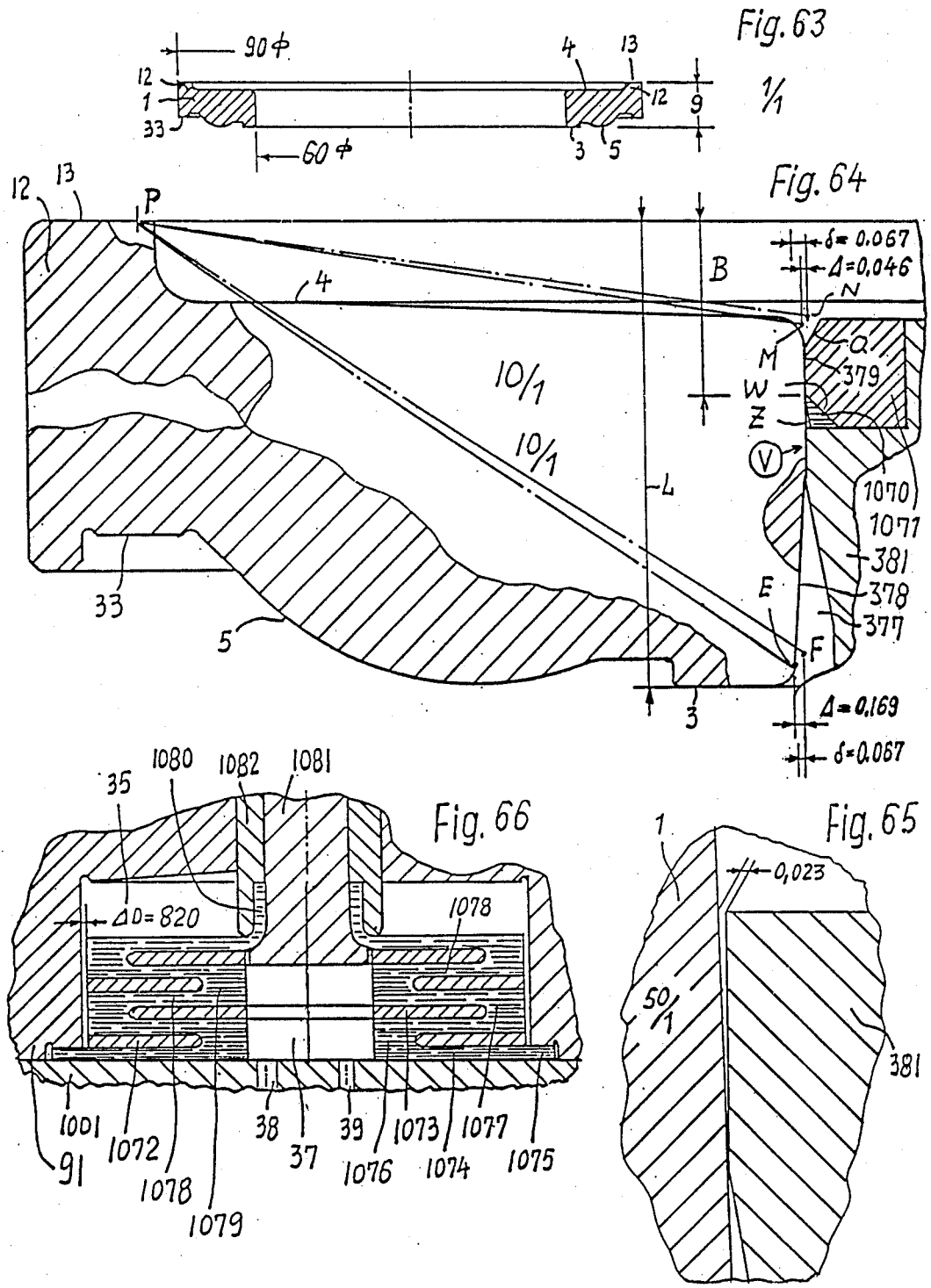

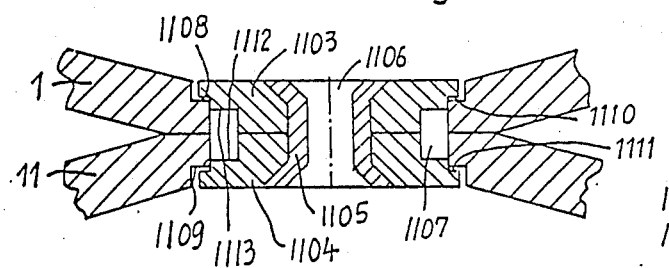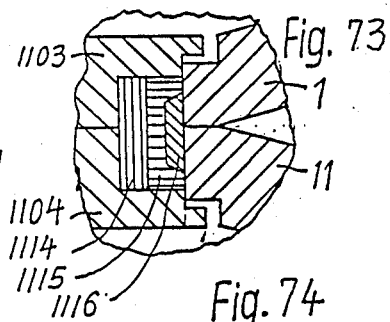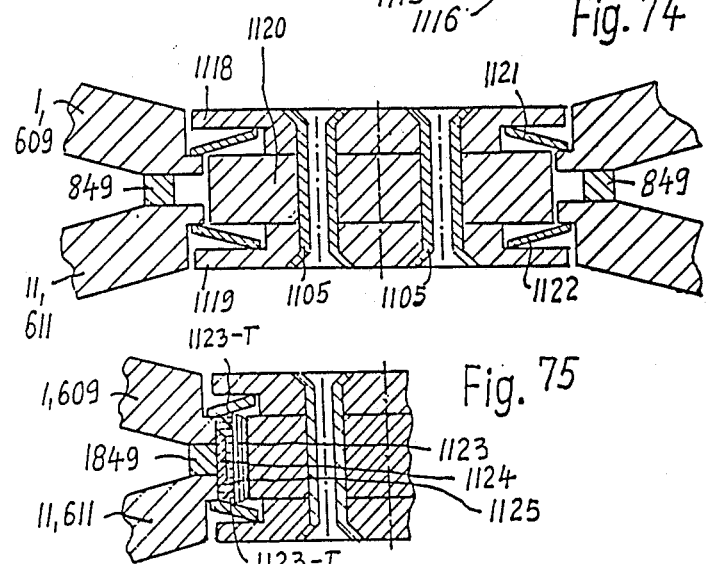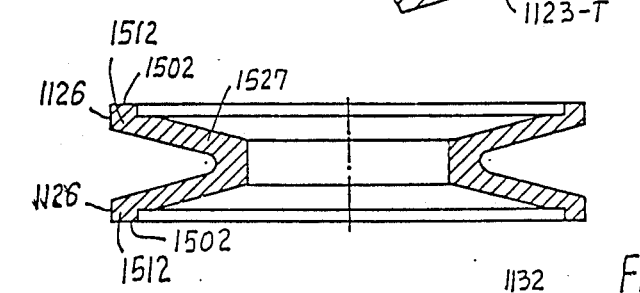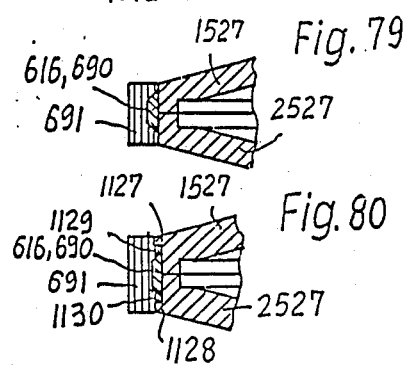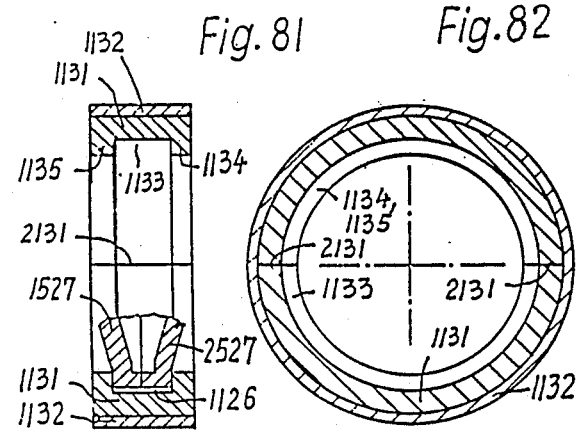

Fig. 90
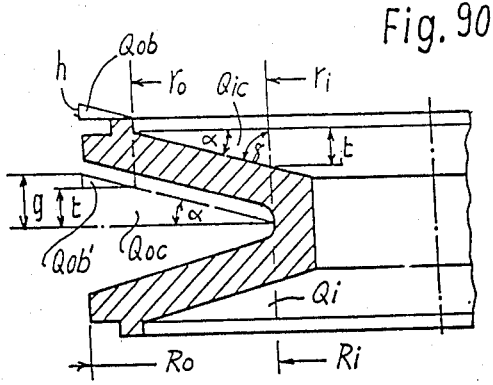
V-ELEMENT UNCOMPRESSED.

Fig. 91
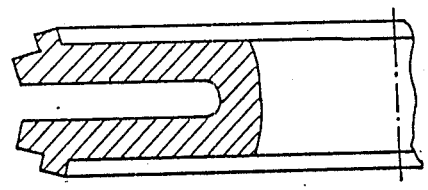
V-ELEMENT FULLY COMPRESSED.

APPLICATION OF THE CALCULATION TO THE RING-NOSE V-ELEMENT:

$$tg\alpha = \frac{t}{\Delta R} = \frac{t}{r_o - r_i} \; ; \; tg\gamma = \frac{\Delta R}{t} = \frac{r_o - r_i}{t} \qquad g = t \frac{R_o - R_i}{r_o - r_i} \qquad (25)$$

$$dt = tg\alpha \, dR = \frac{t}{\Delta R} dR = \frac{1}{tg\gamma} dR = \frac{1}{\Delta R/t} dR = \frac{t}{\Delta R} dR \qquad h = g - t$$

$$Q_{iT} = \pi \int R^2 dR \Big|_{r_i}^{r_o} = \frac{1}{tg\gamma} \pi \int R^2 dR = \frac{\pi}{tg\gamma} \frac{1}{3} R^3 \Big|_{r_i}^{r_o} = Q_{iT} = \frac{\pi}{3} \frac{t}{r_o - r_i} (r_o^3 - r_i^3) \qquad (26)$$

$$Q_{ic} = \frac{\pi}{3} \frac{t}{r_o - r_i} (r_o^3 - r_i^3) - r_i^2 \pi t \qquad (27)$$

$$Q_{oc} = R_o^2 \pi g - \frac{\pi}{3} \frac{g}{R_o - R_i} (R_o^3 - R_i^3) \qquad (28)$$

$$Q_{ob} = \frac{\pi}{3} \frac{h}{R_o - r_o} (R_o^3 - r_o^3) - r_o^2 \pi h \qquad (29)$$

$$Q_{oa} = Q_{oc} - Q_{ob} \quad \text{since } Q_{ob'} \text{ flows from } Q_{oc} \text{ into } Q_{ob}. \qquad (30)$$

ALTERNATIVE CALCULATION OVER MEDIAL INTEGRAL RADII:

$$2\overline{R_i} TA = Q_{ic}. \quad \overline{R_i} = \left[ \frac{\pi}{3} \frac{t}{r_o - r_i} (r_o^3 - r_i^3) - r_i^2 \pi t \right] / 2\pi 0.5 t (r_o - r_i) = \left[ \left\{ \frac{r_o^3 - r_i^3}{3(r_o - r_i)} \right\} - r_i^2 \right] / (r_o - r_i) \qquad (31)$$

$$2\overline{R_o} TA = Q_{oc}. \quad \overline{R_o} = \left[ R_o^2 \pi g - \frac{\pi}{3 tg \gamma} R^3 \right] / 2\pi 0.5 g R = \left[ g R_o^2 \pi - \frac{\pi}{3 tg \gamma} \frac{R_o^3 - R_i^3}{\pi g (R_o - R_i)} \right] \qquad (32)$$

$$Q_{ic} = \overline{R_i} \cdot 0.5 t R \cdot 2\pi = 2\pi 0.5 t (r_o - r_i) \left[ r_i + (\Delta r)^2 / 3 g \, tg \gamma \right] \qquad (33)$$

$$Q_{oc} = \overline{R_o} \, 2\pi 0.5 g (\Delta R) = 2\pi 0.5 g (R_o - R_i) \left[ g R_o^2 \pi - (3/tg\gamma)(R_o^3 - R_i^3) \right] / g \pi (R_o - R_i) \qquad (34)$$

$$\overline{R_i} = r_i + (r_o - r_i)^2 / tg\gamma \cdot 3 t \qquad (35)$$

$$\overline{R_o} = R_i + \left[ g(R_o - R_i) - (R_o - R_i)^2 / 3 \, tg\gamma \right] / g \qquad (36)$$

$$Q_{ic} = \left[ r_i + (r_o - r_i)^2 / tg\gamma \cdot 3 t \right] 2\pi 0.5 t (r_o - r_i) \qquad (37)$$

$$Q_{oc} = \left\{ R_i + \left[ g(R_o - R_i) - (R_o - R_i)^2 / 3 \, tg\gamma \right] / g \right\} 2\pi 0.5 g (R_o - R_i) \qquad (38)$$

Fig. 92

CALCULATION OF THE VOLUMES AND DELIVERY QUANTITIES:

$R_J; J$ = INDICE FOR INNER CHAMBER;   $R_O; O$ = INDICE FOR OUTER CHAMBER
$\overline{R_J}^I$ = INTEGRAL MEAN RADIUS OF AROUND $t$-AXIS REVOLVING INNER FACE.
$\overline{R_O}^I$ = INTEGRAL MEAN RADIUS OF AROUND $t$-AXIS REVOLVING OUTER FACE.

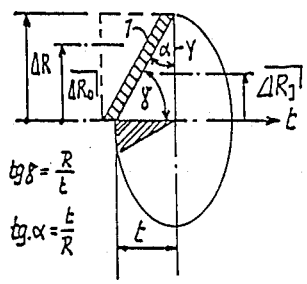

$t = y/tg\alpha;\; y = \dfrac{t}{tg\alpha} = tg\gamma\cdot t;\; t = \dfrac{y}{tg\gamma}$ $tg\gamma = \dfrac{R}{t}$ $tg\alpha = \dfrac{t}{R}$ $A = AREA = 0.5\,(1/tg\gamma)dR;\quad V = VOLUME$ (6)

$(dR/dt) = tg\gamma;\quad dt = (1/tg\gamma)dR;\quad t = R/tg\gamma$ (7)

$V_J = \int \pi (\Delta R)^2 dt = (\pi/tg\gamma)(\Delta R)^2 dR = (\pi/3\,tg\gamma)(\Delta R)^3$ (8)

$2\overline{(\Delta R_J)}^I \pi A = V_J = (\pi/3\,tg\gamma)(\Delta R)^3$ (9)

$\overline{\Delta R_J}^I = (\pi/3\,tg\gamma)(\Delta R)^3 / 2\pi 0.5\,t(\Delta R) = (\Delta R)^2 / tg\gamma\, 3\,t$ (10)

$V_O = t(\Delta R)^2 \pi - V_J = t(\Delta R)^2 \pi - (\pi/3\,tg\gamma)(\Delta R)^3$ (11)

$2\overline{(\Delta R_O)}^I \pi A = [t(\Delta R)^2 \pi - (\pi/3\,tg\gamma)](\Delta R)^3$ (12)

$\overline{\Delta R_O}^I = [t(\Delta R)^2 \pi - (\pi/3\,tg\gamma)(\Delta R)^3] / 2\pi 0.5(\Delta R)$ (13)

$\overline{\Delta R_O}^I = [t(\Delta R) - (\Delta R)^2 / 3\,tg\gamma]/t$ (14)

CALCULATION BY MEDIAL INTEGRAL RADII OF REVOLVING FACES (AREAS):

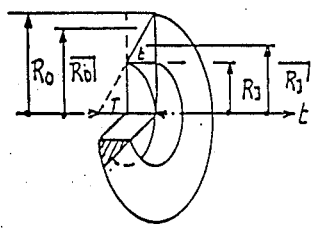

$\overline{R_J}^I = R_J + \overline{\Delta R_J}^I$ (15)

$\overline{R_O}^I = R_J + \overline{\Delta R_O}^I$ (16)

$V_J = A\,2\overline{R_J}^I \pi = 0.5\,t(R_O - R_J)\,2\pi [R_i + (R_O - R_i)^2/3\,tg\gamma\cdot t]$ (17)

$V_O = A\,2\overline{R_O}^I \pi = 0.5\,t(R_O - R_J)\,2\pi [R_i + \{t(R_O - R_J) - (R_O - R_J)^2\}/3\,tg\gamma]/t$ (18)

CALCULATION OF THE VOLUME UNDER A REVOLVING INCLINED STRAIGHT LINE:

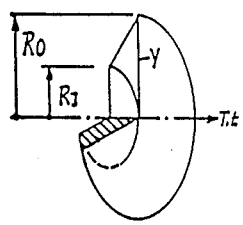

$R = \dfrac{t}{tg\gamma};\quad T = \dfrac{R}{tg\gamma}$ $V = \int \pi y^2 dt = \pi \int (t/tg\gamma)^2 dt = \dfrac{\pi}{(tg\gamma)^2}\int t^2 dt = \dfrac{\pi}{3(tg\gamma)^2}[T^3 - t^3]$ (19)

$= \dfrac{\pi}{3(tg\gamma)^2}\left[\left(\dfrac{R}{tg\gamma}\right)^3 - \left(\dfrac{r}{tg\gamma}\right)^3\right] = \dfrac{\pi}{3\,tg\gamma}[R^3 - r^3] = \dfrac{\pi}{3}tg\alpha [R^3 - r^3] = \dfrac{\pi}{3}\dfrac{t}{R - r}[R^3 - r^3]$ (20)

$(R_J)^2 \pi t = VOLUME$

DEFINITION OF VOLUMES FOR FURTHER CALCULATIONS. "V" REPLACED BY DELIVERY "Q".

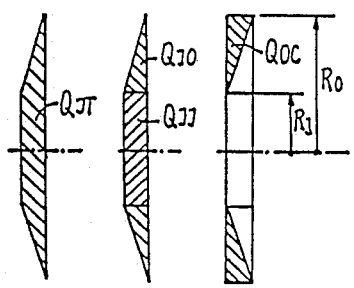

$Q_{JT} = \dfrac{\pi}{3\,tg\gamma}(r_o^3 - r_i^3) = \dfrac{\pi}{3}\dfrac{t}{(R_O - R_J)}(r_o^3 - r_i^3)$ (21)

$Q_{JJ} = r_i^2 \pi t$ (22)

$Q_{JC} = Q_{JT} - Q_{JJ} = \dfrac{\pi}{3}\dfrac{t}{R_O - R_J}(r_o^3 - r_i^3) - r_i^2 \pi t$ (23)

$Q_{OC} = R_O^2 \pi t - Q_{JT} = R_O^2 \pi t - \dfrac{\pi}{3}\dfrac{t}{R_O - R_J}(R_O^3 - R_J^3)$ (24)

Fig. 93

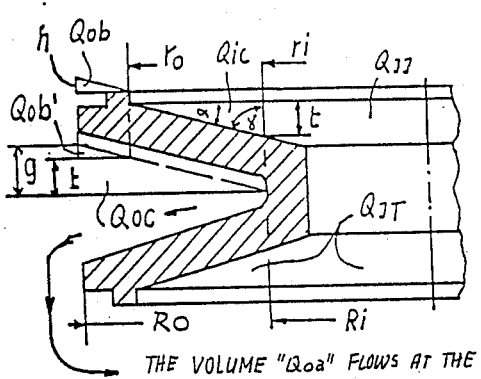
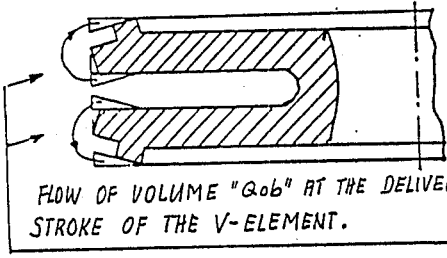

FLOW OF VOLUME "Qob" AT THE DELIVERY STROKE OF THE V-ELEMENT.

THE VOLUME "Qoa" FLOWS AT THE DELIVERY STROKE FROM THE OUTER SPACE BETWEEN THE SHANKS INTO THE BOTTOM OF THE OUTER CHAMBER BELOW THE V-ELEMENTS.

SAMPLE OF A CALCULATION OF A V-ELEMENT OF :(in mm.): 0.5 t; 15.5 rj; 15.5 Rj; 26.5 ro; 30.5 Ro:

$\Delta R = 30.5 - 15.5 = 15 = R_o - R_J$      $\Delta r = r_o - r_j = 26.5 - 15.5 = 11$

(25) $g = 0.5(15/11) = 6.82$     (25) $h = g - t = 0.182$ (6) $A = (0.5 \times 11)/2 = 2.75 \ mm^2$     (7) $tg\gamma = 11/0.5 = 22 = 87.40°$ (7) $tg\alpha = 0.5/11 = 0.04545 = 2.60°$     (8) $V_J = (\pi/3 \cdot 22)(11)^2 = 63.355 \ mm^3$

(10) $\overline{\Delta R_J} = (11)^2/3 \times 22 \times 0.5 = 3.67 \ mm$     (11) $V_o = 0.5 \cdot 11^2 \cdot \pi - (\pi/3 \cdot 22)(11)^3 = 126.71 \ mm^3$

(14) $\overline{\Delta R_o} = [0.5 \cdot 11 - (11)^2/3 \cdot 22]/0.5 = 7.33 \ mm$     (15) $\overline{R_J} = 15.5 + 3.67 = 19.17 \ mm$

(16) $\overline{R_o} = 15.5 + 7.33 = 22.88 \ mm$     (17) $V_J = 0.5 \cdot 0.5 \cdot 15 \cdot 2 \cdot \pi [15.5 + 11/3 \cdot 22 \cdot 0.5] = 331.18 \ mm^3$

(18) $V_o = A \cdot 2 \overline{R_o} \pi = 2.75 \cdot 22.88 \cdot 2 \cdot \pi = 395.34$     (18) $V_o = 1.5 \cdot 0.5 \cdot 11 \cdot 2 \cdot \pi [15.5 + [15.5 \cdot 11 - 11^2/3 \cdot 22]/0.5] = 394.53 \ mm^3$

(20) $V = (\pi/3 \cdot 22)(26.5^3 - 15.5^3) = 708.56 \ mm^3$     (21) $Q_{JT} = (\pi \cdot 0.5/11)(26.5^3 - 15.5^3) = 708.56 \ mm^3$

(22) $Q_{JJ} = (15.5)^2 \cdot \pi \cdot 0.5 = 377.38 \ mm^3$     (23) $Q_{JC} = Q_{JT} - Q_{JJ} = 708.56 - 377.38 = 331.18 \ mm^3$

(23) $Q_{JC} =$

(24) $Q_{oc} =$     (24) $Q_{oc} = R_o^2 \pi t - Q_{JT} = 26.5^2 \cdot \pi \cdot 0.5 - 708.56 = 394.53 \ mm^3$

FOR PRACTICAL APPLICATIONS TO CALCULATE THE BELOW FRAMED VALUES OFTEN SATISFIES.

| | |
|---|---|
| $g = 0.5(15/11) = 6.82$ ;   (25) | $h = g - t = 6.82 - 0.5 = 0.182$   (25) |
| $Q_{JT} = (\pi \cdot 0.5/11)(26.5^3 - 15.5^3) = 708.56 \ mm^3$   (26) | $Q_{JC} = (\pi \cdot 0.5/11)(26.5^3 - 15.5^3) - 15.5^2 \pi \cdot 0.5 = 331.18$   (27) |
| $Q_{oc} = 30.5^2 \pi \cdot 0.682 - \frac{\pi}{3} \frac{0.682}{15}(30.5^3 - 15.5^3) = 819.61 \ mm^3$   (28) | $Q_{ob} = (\pi \cdot 0.182/15)(30.5^3 - 15.5^3) - 26.5^2 \pi \cdot 0.182 = 62.98$   (29) |
| $Q_{oa} = Q_{oc} - Q_{ob} = 819.61 - 62.98 = 756.63 \ mm^3$   (30) | |

(31) $\overline{R_J} = [\{(26.5^3 - 15.5^3)/3 \cdot 11\} - 15.5^2] / (26.5 - 15.5) = 19.17 \ mm$

(32) $\overline{R_o} = [30.5^2 \pi \cdot 0.682 - (\pi/3 \cdot 22)(30.5^3 - 15.5^3)] / 0.682 \pi (15) = 25.51 \ mm$

(33) $Q_{JC} = 2\pi \cdot 0.5 \cdot 0.5 \cdot 11 [15.5 + 11^2/3 \cdot 0.5 \cdot 22] = 331.18 \ mm^3$

(34) $Q_{oc} = 2\pi \cdot 0.5 \cdot 0.682 \cdot 15 [0.682(30.5)^2 \pi - (\pi/3 \cdot 22)(30.5^3 - 15.5^3)] / 0.682 \cdot \pi \cdot (15) = 819.85 \ mm^3$

(35) $\overline{R_J} = 15.5 + (11)^2/22 \cdot 3 \cdot 0.5 = 19.17 \ mm.$

(36) $\overline{R_o} = 15.5 + [0.682(15) - (15)^2/3 \cdot 22]/t = 25.51 \ mm$     $t = 0.5$

(37) $Q_{JC} = [15.5 + (11)^2/22 \cdot 3 \cdot 0.5] 0.5 \cdot 0.5 \cdot 11 \cdot 2\pi = 331.23 \ mm^3$

(38) $Q_{oc} = [\{15.5 + [0.682(15) - (15)^2/3 \cdot 22]/t\}] 2\pi \cdot 0.5 \cdot 0.682 \cdot 15 = 819.85 \ mm^3$

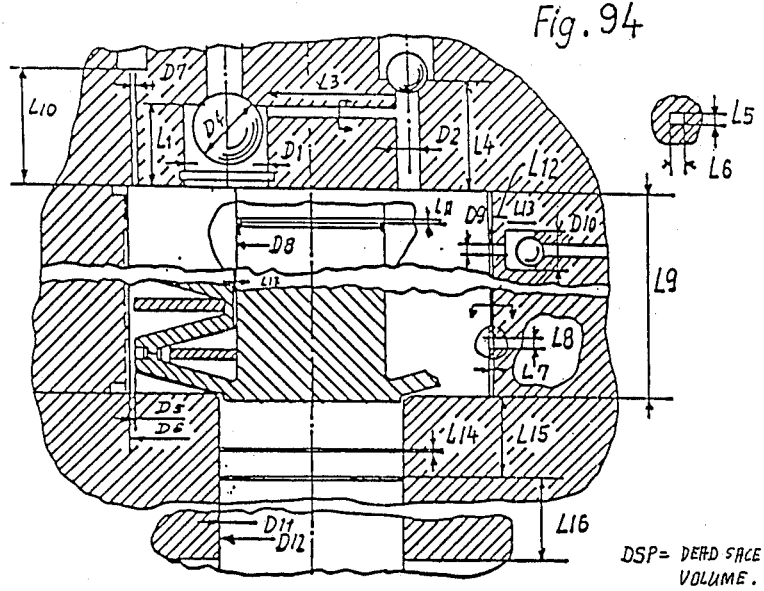

Fig. 94

DSP = DEAD SPACE-VOLUME.

| DSP | WHERE? | CALCULATION FORMULA | ACTUAL RESULT: | mm³ |
|---|---|---|---|---|
| | INNER CHAMBER: | | | |
| " 1 | INLET VALVE | $D_1^2 \pi/4 \cdot L_1 - \frac{4}{3}(\frac{D_4}{2})^3 \pi -$ | | |
| " 2 | OUTLET VALVE | $D_2^2 (\pi/4) \cdot L_4$ | | |
| " 3 | AIR-OUT PASSAGE | $L_5 \cdot L_6 \cdot L_3$ | | |
| " 4 | FREE SPACE OF FILLER SHAFT | $D_8^2 (\pi/4) \cdot L_4$ | | |
| " 5 | SEALS, DSP EQUIVALENTS, CALCULATE CASE BY CASE: | | | |
| " 6 | FILLER SHAFT TOLERANCE | $D_8 \cdot \pi \cdot L_{17} \cdot 0.9 \cdot L_9$ | | |
| | OUTER CHAMBER: | | $\sum \cdot 0.001 = DSP\ cic = CC =$ | |
| " 11 | CONTROL FLUID ENTRANCE | $D_9^2 (\pi/4) \cdot L_{12} + D_{10}^2 (\pi/4) \cdot L_{13}$ | | |
| " 12 | CONTROL FLUID OUTLET | $D_4^2 (\pi/4) \cdot L_{10}$ | | |
| " 13 | SPACE AROUND ELEMENTS | $(D_6^2 - D_5^2)(\pi/4) \cdot L_9$ | | |
| " 14 | FREE STROKE PISTON SPACE | $D_{12}^2 (\pi/4) \cdot L_{14}$ | | |
| " 15 | Qca PASSAGE × Number of it | $L_7 \cdot L_8 \cdot L_9 \cdot Z$ | | |
| " 16 | SPACE OF UNCOMPL. DEAD SPACE FILLERS | | | |
| " 17 | SEALS AND DSP EQUIVALENTS | | | |
| " 18 | DEL. PISTON DISPLACEMENT | $(D_{12})^2 (\pi/4) \cdot$ | | |
| | | | $\sum \cdot 0.001 = DSP\ Coc = CC =$ | |

LOSS IN INNER CHAMBER BY COMPRESSION OF WATER: $= DSP\ cic\ (P/250) \cdot 0.01 =$ _____ CC LOSS IN OUTER CHAMBER BY COMPRESSION OF OIL: $= DSP\ Coc\ (P/180) \cdot 1.1 \cdot 0.01 =$ _____ CC LECKAGE $= Q_L = \frac{10\pi}{12\eta} \Delta P_0 \cdot \frac{D_{12}}{L_{16}} \left(\frac{D_{11}-D_{12}}{2}\right)^3 = \frac{CC}{sec.}$ _____ CC MIT $P_0 = P_{OUTER\ CHAMBER} \approx 1.1\ P_{INNER\ CHAMBER}$    IN BAR = $Kp/cm^2$; D,L in mm; $\eta$ in $Kpsec/m^2$

MEMO:

From $m^3$ to $mm^3 = \times 10^9$; From $\frac{Kg}{m^2}$ to $\frac{Kg}{cm^2} = \times 10^{-4}$; $10^9 \cdot 10^{-4} = 10^5$. From $m^3$ to $CC = \times 10^{-6}$, GIVES: $10^{-1} cc \times 10 = CC$.

B, b, A, a = radii.

q = PRESSURE IN INNER CHAMBER
Q = PRESSURE IN OUTER CHAMBER.

M = MOMENT AROUND A CIRCULAR LINE  $a, A, b$ or $B$ BY FLUID PRESSURE.

$M_Q$ ; OUTER CHAMBER > $M_J$ ; INNER CHAMBER, IF $Q \geq q$.

$$M_B = 2\pi Q \left[ \tfrac{B}{2}(B-A)^2 - \tfrac{1}{3}(B-A)^3 \right]$$
$$M_a = 2\pi q \left[ \tfrac{a}{2}(b-a)^2 + \tfrac{1}{3}(b-a)^3 \right]$$

Fig. 108
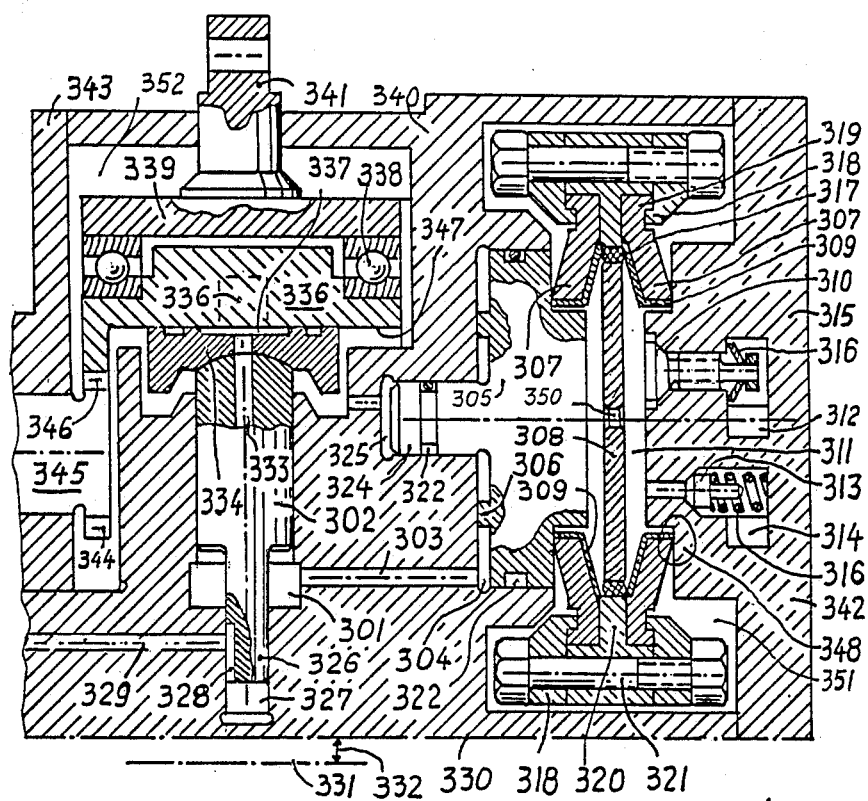
Fig. 107
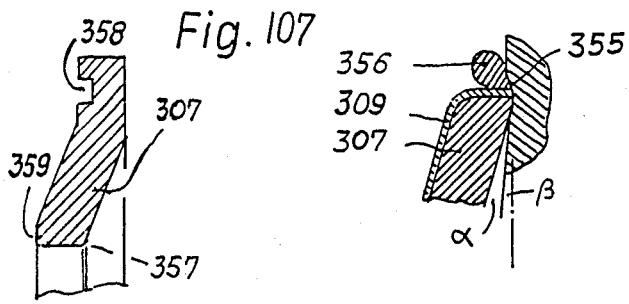
Fig. 109

Fig. 110

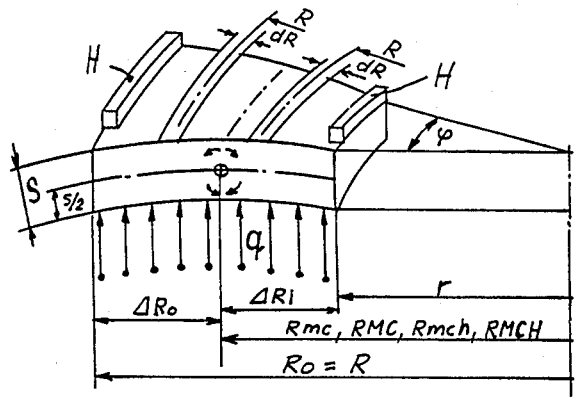

$$dMd = q \cdot B \cdot \Delta R \, d\Delta R \quad (1)$$

$$B = \frac{\varphi \pi}{180}(r + \Delta R_i) \quad (2)$$

$$\text{OR} \quad B = \frac{\varphi \pi}{180}(R_o - \Delta R_o)$$

$$dMdi = q\left(\frac{\varphi \pi}{180}\right)(r + \Delta R)\Delta R \, d\Delta R \quad (3)$$

$$Md = q\int\left(\frac{\varphi \pi}{180}\right)[f(\Delta R)] d\Delta R \quad (4)$$

$$Mdi = q\left(\frac{\varphi \pi}{180}\right)\left[\frac{r}{2}(\Delta R_i)^2 + \frac{1}{3}(\Delta R_i)^3\right] (5) \quad Mdo = q\left(\frac{\varphi \pi}{180}\right)\left[\frac{R}{2}(\Delta R_o)^2 - \frac{1}{3}(\Delta R_o)^3\right] (6)$$

$$\sigma_B = \frac{M}{J}(S/2) \quad (7) \quad J = \left(\frac{\varphi \pi}{180}\right) RMC \cdot S^3/12 \quad (8) \quad M = Md(\Delta R)/(S/2) \quad (9)$$

$$\sigma_{Bi} = q\left(\frac{\varphi \pi}{180}\right)\left[\frac{r}{2}(\Delta R_i)^2 + \frac{1}{3}(\Delta R_i)^3\right][\Delta R_i/(S/2)](S/2)/\left(\frac{\varphi \pi}{180}\right) S^3/12 \quad (10)$$

$$\sigma_{Bo} = q\left(\frac{\varphi \pi}{180}\right)\left[\frac{R_o}{2}(\Delta R_o)^2 - \frac{1}{3}(\Delta R_o)^3\right][\Delta R_o/(S/2)](S/2)/\left(\frac{\varphi \pi}{180}\right) S^3/12 \quad (11)$$

$$\sigma_{Bi} = 12q\left[\frac{r}{2}(RCM - r)^2 + \frac{1}{3}(RCM - r)^3\right](RCM - r)/RCM \cdot S^3 \quad (12)$$

$$\sigma_{Bo} = 12q\left[\frac{R_o}{2}(R_o - RCM)^2 - \frac{1}{3}(R_o - RCM)^3\right](R_o - RCM)/RCM \cdot S^3 \quad (13)$$

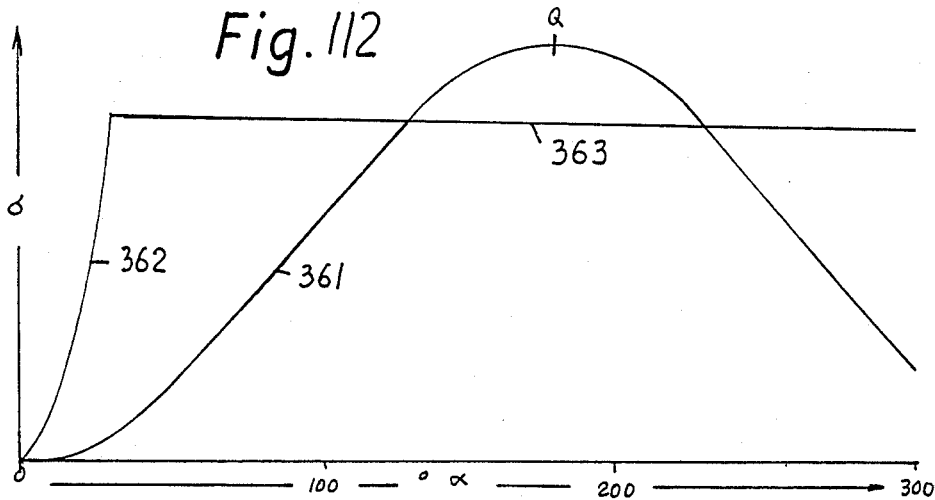

Fig. 112

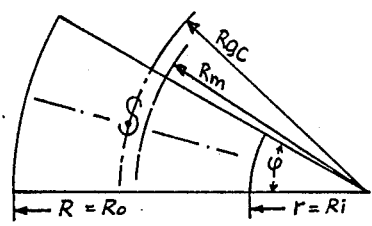
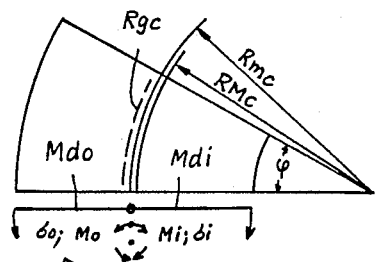
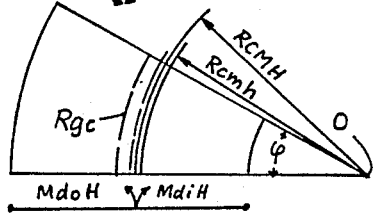

$Rm = (R+r)/2$   Fig. 111

$S$ = Centroid $Rgc$ = RADIUS FOR CENTROID $Rgc = (2/3)(R^3-r^3)/(R^2-r^2)$ $Rmc$ = EQUAL MOMENTS OF FLUID PRESSURE.

$Mdo = Mdi = \frac{r}{2}(Rmc-r)^2 + \frac{1}{3}(Rmc-r)^3 = \frac{R}{2}(R-Rmc)^2 - \frac{1}{3}(R \cdot Rmc)^3$ $Mod = Mid = \frac{r}{2}(RMC-r)^2 + \frac{1}{3}(RMC-r)^3 = \frac{R}{2}(R-RMC)^2 - \frac{1}{3}(R-RMC)^3$ = MOMENTS AROUND $Rmc$ AND $RMC$ RmcH AND RMCH GIVE EQUAL MOMENTS OF AREAS AND INNER STRESS AROUND HOLDERS "H"

$\frac{Rmc}{2}(Rmc-r)^3 + \frac{Rmc}{3r}(Rmc-r)^4 = \frac{Rmc}{2}(R-Rmc)^3 - \frac{Rmc}{3R}(R-Rmc)^4$ $\frac{RMC}{2}(RMC-r)^3 + \frac{RMC}{3r}(RMC-r)^4 = \frac{RMC}{2}(R-RMC)^3 - \frac{RMC}{3R}(R-RMC)^4$

MOMENT AROUND THE CENTER AXIS "O":

$dMdc = q \, B \, R \, dR; \quad B = (\varphi \pi/180)R$ $dMdc = q(\varphi\pi/180)RR\,dR.$ $Mdc = q\frac{\varphi\pi}{180}\int R^2 dR; \quad Mdc = q\frac{\varphi\pi}{540}(R^3-r^3)$ or: $Mdc = [Rgc(R^2-r^2)\varphi\pi/360]q$ 4,822,255

1

PUMP FOR PRESSURES EXCEEDING ONE THOUSAND ATMOSPHERES BY THE PROVISION OF A HALF-PRESSURE CHAMBER AROUND A HIGH PRESSURE CHAMBER BETWEEN CONED RING ELEMENTS

REFERENCE TO RELATED APPLICATIONS

This is a continuation-in-part application of my application Ser. No. 788,174, now Pat. U.S. No. 4,701,113, issued on Oct. 20, 1987, and which was filed on Oct. 16, 1985 as a continuation-in-part application of my at that time co-pending applications Ser. Nos. 282,990, filed July 14, 1981 and 387,567, filed on June 11, 1982. Application Ser. No. 282,990 is now U.S. Pat. No. 4,557,347, while application Ser. No. 387,567 is now U.S. Pat. No. 4,569,630. Benefits of the abovementioned applications are claimed for this present application.

BACKGROUND OF THE INVENTION (a) Field of the Invention

This invention relates to water pumps for several thousand atmospheres and can also pump other fluids. At the same time it may belong to pumps with rotary shafts and plural pumping chambers in a common housing.

(b) Description of the Prior Art

Water pumps for several hundred atmospheres were commonly three plunger pumps which were reciprocated by a crankshaft over connecting rods and a valve head was assembled onto the cylinders.

For pressures of more than onethousand atmospheres the prior art commonly used so called "boosters" which are pressure intensifiers. A medial pressure pump supplies oil under pressure of several hundred atmospheres alternatingly into different ends of a big diameter cylinder wherein a piston of equally big diameter reciprocates under the alternating direction of the oil under pressure. Piston shafts of smaller diameters extend into the high pressure water cylinders axially of the mentioned big diameter cylinder. Inlet and outlet valves are communicated to the high pressure cylinders for the pumping of the water. The difference of diameters of the mentioned cylinders and pistons provides a transmission which boosts the pressure in the water stage to high pressure of more than onethousand atmospheres.

The sealing of the pistons which pump the water is expensive and difficult because the water is not lubricating. Wear reduces the life time of the seals, internal compression and wear of the seals reduces the efficiency. The pumps of the prior art are, therefore, expensive and a more simple pump of better efficiency, reliability and of lower weight and smaller space is highly desired but presently not available in the prior art. The most closely related prior art seems to appear in U.S. Pats. Nos. 1,190,716 ; 3,394,631 and in British Pat. No. 1,377,087.

SUMMARY OF THE INVENTION

The object of the invention is to overcome the drawbacks of the pumps of the prior art and to provide a compact pump for very high pressures in excess of onethousand atmospheres and which can also pump nonlubricating fluid, as for example, water.

Another object of the invention is to use a reliable high pressure drive system for the drive of fluid supply pistons.

2

A further object of the invention is to provide fluid separation means between different fluids in different chambers of the pump.

Still another object of the invention is to provide sealing arrangements on pumping elements or between elements and pistons or covers.

A still further object of the invention is to provide dead space fillers to prevent excessive losses by compression of fluid.

Still a further object of the invention is to provide control means for the expulsion of undesired air and for the proper amount of filling fluid for a chamber which contains oil to compress and expand pumping elements.

Another object of the invention is to provide pumping elements for extremely high pressures.

A further object of the invention is to provide plural membranes to single fluid supply pistons or to common inlet and outlet valves.

Another object of the invention is to provide configurations of membranes and of dead space filling or stroke limiting bodies to them.

A further object of the invention is to provide specific dead space fillers for S-elements.

Another object of the invention is to combine two neighbouring coned ring elements by a common inner or outer root.

An important object of the invention is also to develop and to provide the calculation means and formulas for the calculation of pumps and of pumping elements.

There are still more objects and aims of the invention present in this present application and they will be found in the appended claims or in the description of the preferred embodiments of the invention.

BRIEF DESCRIPTION OF THE DRAWINGS

FIGS. 13 to 68 are longitudinal sectional views through devices of the invention.

FIGS. 72 to 81 are longitudinal sectional views through devices of the invention.

FIG. 82 is a cross sectional view through FIG. 81.

FIGS. 90 to 92 show geometrical definitions and mathematical formulas which are developed by the inventor and which are helpful for the actual application of the present invention.

FIG. 93 shows an actual calculation of a device of the invention.

FIG. 94 is a form for the calculation of the dead space volumes.

FIGS. 107 to 109 are sectional views through devices of the invention.

FIGS. 110 to 112 show geometrical concepts with mathematical equations, and,

DESCRIPTION OF THE PREFERRED EMBODIMENTS

This invention relates to improvements in high pressure pumps wherein the pumped fluid may be a corrosion effecting fluid.

In such pumps it is difficult to pump the fluid by a piston because the sealing of the reciprocal movement of the piston under such pressures causes sever problems. The aim of the present invention, therefore, is, to improve my earlier inventions in this field and to provide a reliable pump for more then one thousand atmospheres. This aim will be obtained by a plurality of arrangements and combinations, which may be, according to the respective specific application, be applied either singly or in combination with one or more of the other embodiments of the invention.

Figure 1:
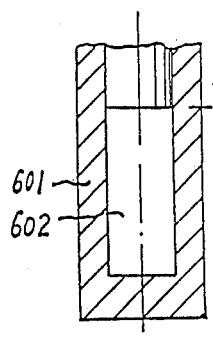
FIGS. 1 to 4 are longitudinal sectional views through geometrically defined bodies for the explanation of the calculations which are involved.
Figure 2:
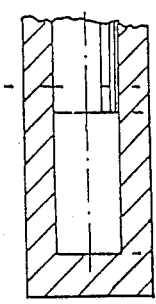

In FIGS. 1 and 2 a cylinder is shown wherein a piston is reciprocable. The cylinder 601 is in its interior space 602 filled with a liquid. FIG. 2 explaines that the length "L" defines the volume if the piston is not loaded with thrust. If the piston presses with a strong force against the liquid fluid in the space 602, the fluid becomes compressed by the distance "41" to the final length "1". This shows, as generally known, that liquid fluid is compressible. This compressibility is neglectable often at a few hundred atmospheres of pressure but it becomes very decisive at the several thousand atmospheres at which the pump of the invention shall work. The actual compressibility of water is perfectly know, but the actual compressibility of oil is given with different values in different literatures.

Figure 3:
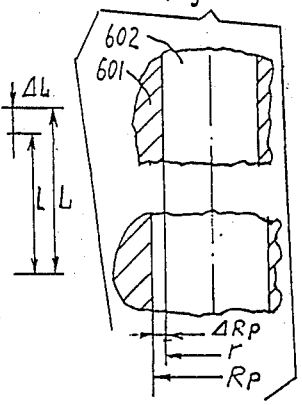
Figure 4:
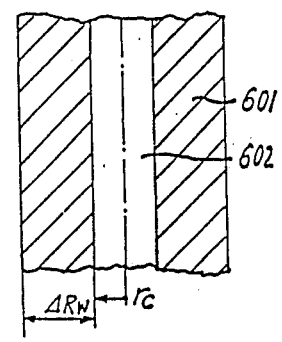

FIG. 3 shows in its upper portion a portion of the cylinder of FIGS. 1 and 2 in its original size at the condition when no pressure acts inside of chamber 602. The bottom portion of FIG. 3 shows the same cylinder, however, subjected to a high pressure in the fluid in chamber 602. Therefrom it is seen that the cylinder 601 expands in diameter by the radial expansion "$\Delta Rp$" from the original radius "r" to the expanded radius "Rp". FIG. 4 shows an equal portion of the cylinder of FIGS. 1 and 2. The inner radius is herein defined as "rc" and the thickness of the wall of the cylinder 601 is defined as "$\Delta Rw$".

Figure 10:
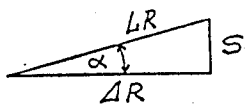
FIGS. 10 and 11 show geometries for calculations.
Figure 11:
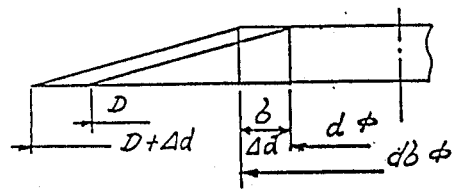

In FIG. 10 a radial half of the cross section of a disc spring is shown by a line "LR". If its inner end is compressed by the axial length "S" and thereby swang by the angle "alpha", the spring will have the flattened position as shown by the line "$\Delta R$". In FIG. 11 the same is illustrated again, but it is shown here that by force of fluid in the interior space of the mentioned spring, the spring obtains a diametric expansion "$\delta = \Delta d$" on its radial inner end, expanding from "d $\phi$" to "db 100 " and expanding on its radial outer end from "D $\phi$" to: "D+$\Delta$D $\phi$".

Then for the respective above mentioned Figures the following equations apply which are also written under FIGS. 10 and 11, respectively:

$$tg\alpha = s\Delta R \quad (1)$$

$$LR = Vs^2 + (\Delta R)^2 = 1/\Delta R \cos \alpha \quad (2)$$

$$\Delta R = (LR)\cos \alpha \quad (3)$$

$$S = (LR)\sin \alpha \quad (4)$$

and, very important, the radial expansion of the cylinder or of the spring becomes:

$$\delta = \frac{P}{E} \frac{1.3 (D/d)^2 + 0.7}{(D/d)^2 - 1} \quad (5)$$

with d = inner diameter.

In Equation (5) the value "$\delta$" defines the diametric radial expansion of the inner diameter of the pipe or of the spring if the fluid inside of it is loaded with the pressure "p". In this important equation the measures may be used in "mm", while the pressure "p" and the modulus of elasticy may be used in "Kg/mm$^2$". Applicant obtained this important equation from Mr. Igarashi or Riken Seiki Co.Ltd., Japan. Note, that equations for thin walled steel pipes are not useable in the devices of the present invention.

Figure 5:
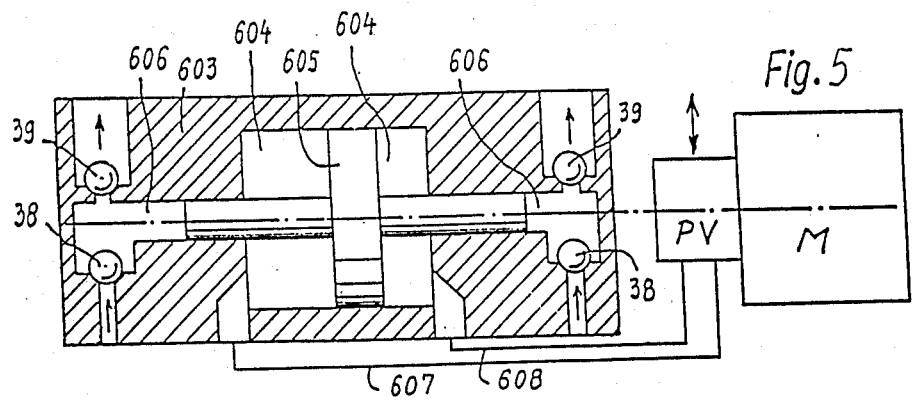
FIG. 5 is a longitudinal sectional view through a device of the former art.

FIG. 5 illustrates in a schematical sectional view the device of the former art which is presently commonly used to provide high pressure water in excess of one thousand atmospheres of pressure. A motor "M" drives a pump "PV" which sends fluid alterantingly into the different ends 604 of a bigger diameter cylinder wherein the bigger diameter piston 605 is thereby reciprocated. From the piston 605 extend thinner diameter piston rods into cylinders 606 of smaller diameters and pump therein water under high pressure out of exit valves 39 after the water was taken in over the intake valves 38. The fluid lines from the pump to the cylinder 604 are shown by 607 and 608.

In this type of device of the former art it is difficult and expensive to seal the piston rods against the high pressure in the water pumping cylinders 606. It is one aim of the invention to overcome these difficulties and to provide a simple and improved pump for equal pressure in water or other liquid fluid.

The present invention now discovers that the mentioned device of the former art has additional drawbacks, namely first that such devices create a "zero" supply time at the time of changing the directions of the piston strokes and, secondly, the oil in the big diameter cylinders 606 compresses at each stroke according to the teaching of FIGS. 1 to 3 of the present patent application. This causes a loss in efficiency which is as bigger as bigger the pressure in the cylinder 604 is and which is as bigger as bigger the volumes in the chambers 604 of FIG. 5 are.

Figure 45:
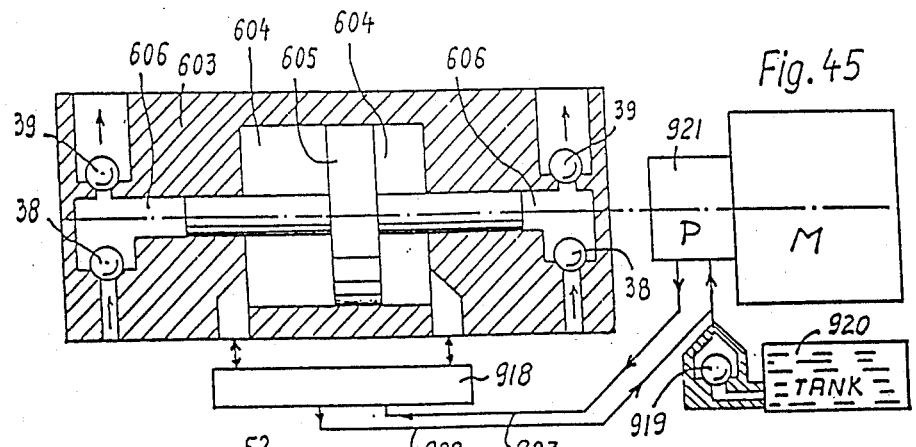

The present invention overcomes the mentioned problems partially by FIG. 45 of the present patent application. Therein a fixed pump "P" is preferred because fixed pumps have no compression losses as variable pumps have at smaller delivery strokes. The directional control is then done by controller 918. The fluid lines to and from it are 922 and 923. Such controller is not novel and such arrangement is not new. The invention, however, prevents the before described losses in efficiency of the former art device at least partially thereby, that a one way check valve 919 is set into the fluid line from the tank 920 to the pump "P". The advantage thereof is that the fluid, which returns from the cylinder 604, enters directly into the opposite half of the pump "P" and thereby drives the pump as a fluid motor. This is especially effective if the pump uses long stroke pistons. At proper design more than half of the efficiency losses of the prior art device of FIG. 5 can thereby by spared, specifically if a high efficiency long stroke pump is used as pump "P" in FIG. 45. Long stroke effective pump my be obtained from the inventor's respective patents or the pump of FIG. 46 may be applied.

Figure 6:
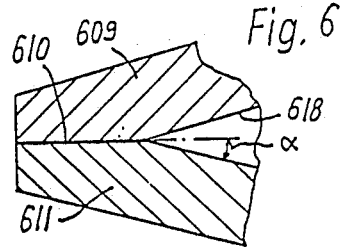
FIG. 6 to 9 are longitudinal sectional views through devices of the invention.

In FIG. 6 two oppositely tapered disc springs with flattened outer ends are laid together. In FIG. 6 the springs are uncompressed , while in FIG. 7 the both springs are compressed. In these Figures and in many later Figures in which only the radial outer ends of the tapered elements or springs are of importance, only the radial outer end portions of one radial ends of the mentioned elements are illustrated.

In FIG. 6 the flattened faces 610 are shown laying on each other while the elements and shown by 609 and 611. When the elements 609,611 are axially fully compressed,as in FIG. 7, the axial inner faces 618 of the formerly under angle "alpha" tapered elements lay now on each other with angle "alpha" having become "zero". The effect of the compression, however, is also that now a gap 612 opens between the flattened faces 610 with angle "alpha" between the outer portions of the elements 609 and 611. This gap is actually small and commonly only a few hundreds of a millimeter, but its effect in high pressure pumps is considerable.

Figure 7:
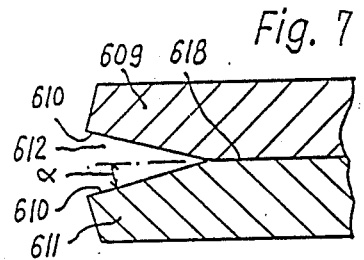
Figure 8:
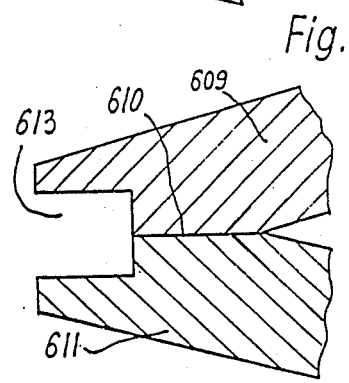
Figure 9:
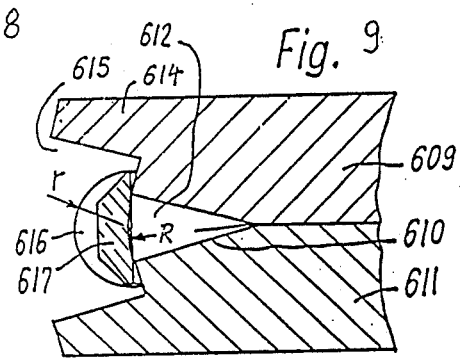

In FIG. 8 the same elements are shown as in FIG. 6 but here the outer ends of the elements are provided with a seat 613 for the insertion of a seal ring between the elements. FIG. 9 now shows that also in such case a gap 612 appears similar in principle as in FIG. 7. Therefrom appears an important discovery of the invention, namely, that a common seal ring can not be effective in seat 613 because it would be pressed into the gap 612 when the gap opens. Consequently, the invention provides a strong support ring, commonly metal, 617, and prefers to provide it with an inner radius "R" (FIG. 9). A plasticly deformable seal ring is then laid radially outwards around the support ring 617. The radial outer face of support ring 617 is preferred to have tapered outer ends or a radius "r" (FIG. 9) in order not to disturb the surrounding plastic seal ring.

FIG. 24 includes a complete pair of such elements which are shown therein by 501,527. Similar complete element pairs are shown in FIG. 33, 25 and 30. FIGS. 25 and 30 illustrate that outer rings 784,739 may surround the seals, embrace the radial outer ends of the respective pair of elements and thereby fasten the elements of the respective pair of elements permanently together.

In FIG. 25 the meeting faces 738 of the pair of elements are radially short and tapered in order to provide a radial inner space into which the inner dead space filler 740 is set. Thereby the axial inner faces 4 of the elments 501,527 are axially inwardly distanced into the elements away from the meeting faces 738 (610 in FIGS. 6 to 9).

FIG. 30 now also shows that in such case an inner gap 612 may alternatingly open and close when the elements alternatingly compress and expand . Such inner gap 612 will then open between the neighboring faces 794 and 795. FIG. 30 also shows the short meeting portions more clearly than FIG. 25 does and they are called "ring noses" and they are shown in FIG. 30 by referentials 502. The consequence of this is that in FIG. 30 radially seen outer and inner seal beds are formed radially of the ring noses and that respective seal rings with support rings, 690,790, are inserted. Plastic seal rings or their portions 691, 791, 692,693,792,793 then embrace the axial ends of the support rings 690 and 790, respectively. A bore 796 may be provided in the outer ring 784 to secure the flow of pressure onto the adjacent sealing ring.

FIGS. 17 and 18 show such seal ring assemblies in separated views. FIG. 17 shows it with support ring 686 and seal ring 687 with embracing portions 688,689 as an inner seal assembly radially inside of ring noses of elements, while FIG. 18 shows such assembly with support ring 690 and seal ring 691 with embracing portions 692,693 for the insertion into a seal bed radially outwards of ring noses of a pair of tapered elements. In FIG. 23 the elements 724,725 are provided with annular ring groves of a configuration of the faces of the grooves complementary to a ring 727 of a cross section of a circle while the mentioned ring 727 is laid into and between the mentioned annular ring grooves. The elements can then swing about the annular ring and the gaps of the earlier mentioned Figures are then prevented. Respective seal beds 1014 and 1015 appear then radially inwards and outwards of the ring 727 and respective seals can become inserted. The elements then swing at compression and expansion along the circular curved faces 726. The difference "B" minus "b" = "ΔB" defines the area with which the elements are pressed together if pressure is present in the space outwards of the elements. This area is also shown by 1016.

In FIGS. 27 and 28 the elements themselves are formed with circularly curved portions for the insertion of a ring 763, 764 or 771 with circular cross section. The assembly of FIG. 27 shows such arrangement for the radial outer portions and FIG. 28 for the radial inner portions of the respective pair of elements. Radially inwards or outwards of the curved portions and rings flat portions of the elements are formed by 768 or 775, respectively, to lay here the elements 765,770 together by the faces 770,776, respectively. These faces may be welded together if so desired and the curved portions of the elements are shown by 773 and 766, respectively, to form with the rings the circularly curved faces 769 or 774, respectively.

FIG. 29 illustrates that the provision of such annular rings and curved faces may be done on the radial inner portions of the elements as well as on the radial outer portions. See rings 727,778 with the neighboring curved portions and faces 780,781, etc.. The radial distances which define the area for pressing the assembly together by fluid pressure in the outer surrounding are shown again by A,a,B,b, "ΔA" and "ΔB". The seal beds 782 and 1002 are clearly visible and the outer ring 784 is provided to clamp both elements 777 of the pair together by embracing the outer ends 783 of the neighboring elements of the pair of elements by its emnbracing end portions 785. See the similarity also in FIG. 30.

In FIG. 35 a ring of rectangular cross sectional area is inserted between the two neighboring flat faces of the outer (or inner) portions of a pair of elements. Thereby the ring noses can be spared. The ring 832 is clearly seen between the plane flat faces 831. The seal beds 837 and 839 are then formed. For proper sealing respective support rings 833,834,835,836 may be inserted. A sample of such support ring is illustrated in Figur 36. Such support rings should have a tapered face 840 to meet the respective plastic seal ring, a face 839 (on ring 838 of FIG. 36) to meet the respective ring 832 and an additional coned face 841 which will meet with its tip of this coned face the respective inner face portion of the tapered element 830,501,527 and the like. Without the tapered faces the support rings are not effective because they would open gaps when the elements compress and expand. Each respectively configurated ring is inserted into one of the four corners which appear in FIG. 35.

FIG. 37 illustrates that cover sheets 842 may be arranged either in the form of the right side of the Figure or in the form of the left side of the Figure to protect the element, if it is made of spring steel, from the corrosion providing water radially inside of the pair of elements. The ring 832, known from the before discussed Figures, is assembled again and so are the respective support rings in FIG. 37.

In FIG. 38 the protection sheets 846,847, which may be made of non-corroding
metal or stainless steel, are so configurated that they form the distance between the neighboring elements and thereby replace the ring 832 of the formerly discussed Figures. The outer seal bed is then formed radially of the ends of the protection sheets and is visible by referentials 839 while 833,834 define the support rings in the seal bed. The radial inner ends of the elements are kept together by the clamping ring 853 which embraces the protection sheets 846,847 axially. The inner ends 848 of the protection sheets then form a portin of the inner seal ring bed 852 while 849 is a rectangular formed distance ring between the elements and 851 is a support ring for the plastic seal in the seal ring bed 852.

Figure 41:
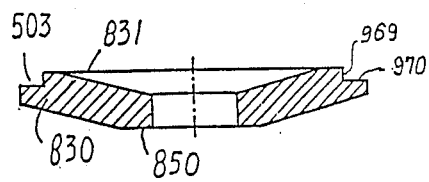

FIG. 41 shows a complete element of the before discussed type in a longitudinal sectional view separately shown with element 830 forming the flat end faces 831,850 and the seal bed 503 with its radially and axially extending seal bed border faces 969,970.

Figure 42:
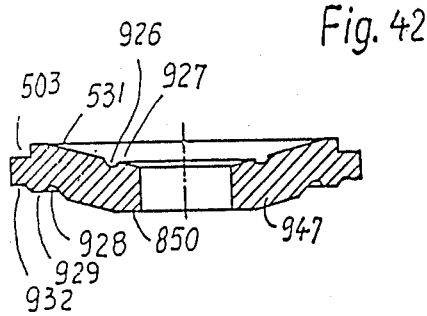

In FIG. 42 recesses 926,928 are provided radially of the flat face portions of element 947. A further recess 932 may be provided. The recesses serve either for the insertion of seal rings into them or for the better provision of clamping rings to clamp elements together.

Figure 43:
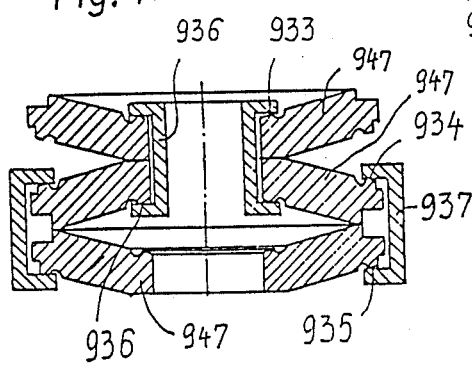
Figure 44:
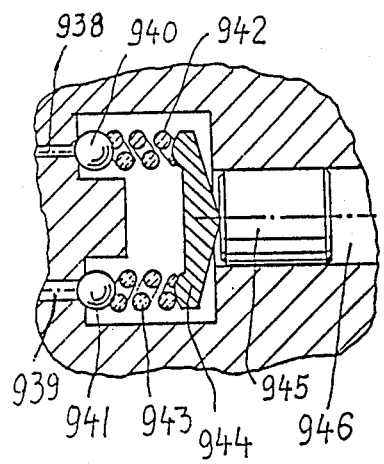

FIG. 43 then illustrates how a plurality of elements 947 are clamped together by inner and outer axial ends of elements embracing clamping rings 936 and 937.

Figure 51:
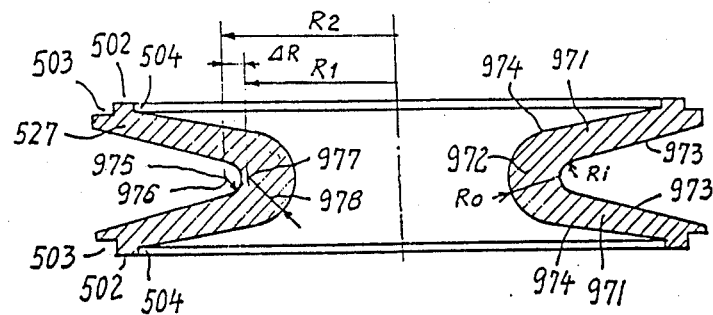

In FIG. 51 two elements of a pair of elements are made integral by one single body whereby the element becomes a so called "V-element". It is provided with the ring noses with meeting faces 502 radially surrounded by seal ring bed recesses 503 and 504. The root of the "V-element" is formed by respective radii 976 and 978 around respective circular lines 975 and 977. They are distanced from the axis by "R1" and "R2", while between them the radial distance "ΔR" exists. These values are important for the calculation of the stresses and forces. The shanks of the "V-element" are 971 while the root of the element is 972 with radius "Ro". The axial inner faces are 973 and the axial outer faces are defined by 974. These values are required to built effective dead space fillers. Such dead space fillers are shown in FIG. 52.

Figure 52:
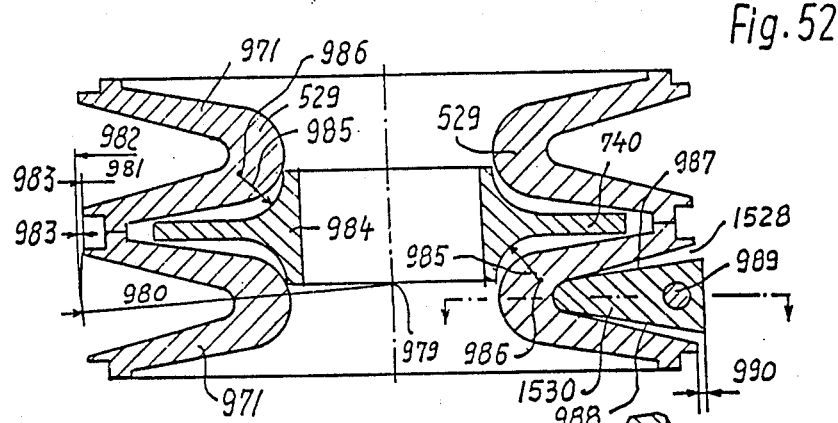
Figure 53:
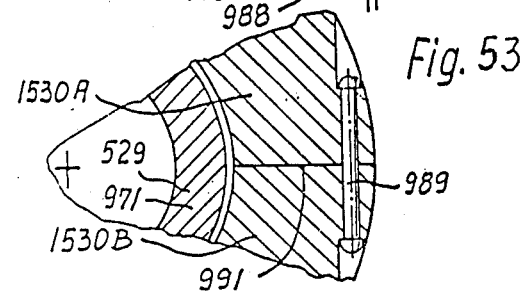

FIG. 52 shows a pair of V-elements assembled together with the respective inner and outer dead space fillers 984 and 1530 provided. Filler 1530 is radially divided into plural portions because otherwise it can not be assembled. It is fastened together thereafter, if so desired, by the holder pin 989. The radial division of this filler is shown in FIG. 53 wherein portions 1530 A and 1530 B are laid together by faces 991. The inner filler has a root 984 and a radial extension 740 which enters into the space between two neighboring V-elements. For proper functioning without losses by compression in fluid the neighboring faces of the fillers should be complementary to faces 973,974 of the elements, respectively, and meet them at full axial compression of the elements.

FIG. 52 also illustrates that at the axial compression the elements expand their outer diameters by radius 980 around axispoints, like 979, from diameter 981 by distance 983 to diameter 982. Also this expansion is only small, it must be considered for the definition of the inner diameter of the outer chamber of FIG. 37 or of another Figure.

Figure 47:
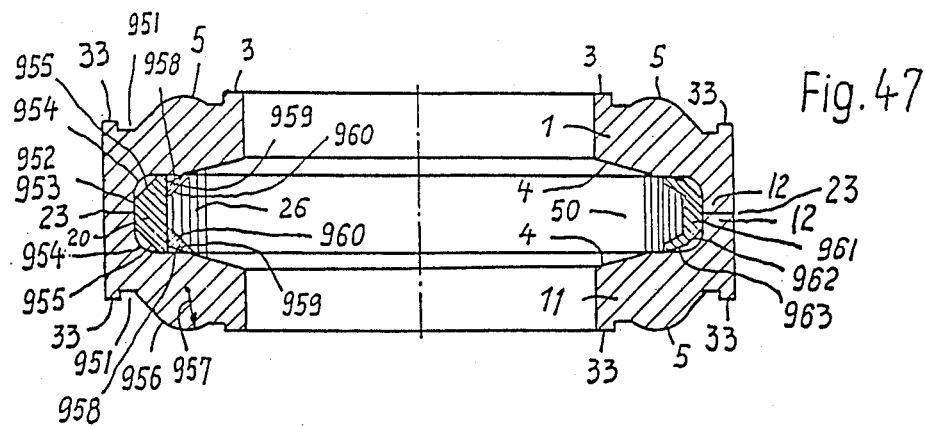

FIG. 47 shows a longitudinal sectional view through neigboring elements for very high pressure. Elements 1 and 11 have the ring noses 12 which meet in the meeting faces 23. Radially inside of the ring noses is the seal ring bed formed and a support ring 20,961 with two tapered lips 963 is inserted in the right portion of the Figure with the plastic seal radially inwards thereof. In the left portion of the Figure the support ring is on its axial outer ends tapered, centers the ring noses 12 relative to each other and is radially inwards cylindrical to locate on each axial end a tapered support ring 958 and radially inside thereof the respective plastic seal ring 26. The elements 1,11 have at this high pressure a big medial portion with a radius 957 formed around the respective circular line inside of the element. It also may have a circular recess 951 for holding therein or to hold on outer face 33 a respective clamping arrangement. The medial portion ends in face 5, the coned inner face is shown by 4 and an axial end face on the radial inner end is defined by 3. These kind of elements are so thick to have proper strength if high pressure acts only inside of the elements.

Figure 48:
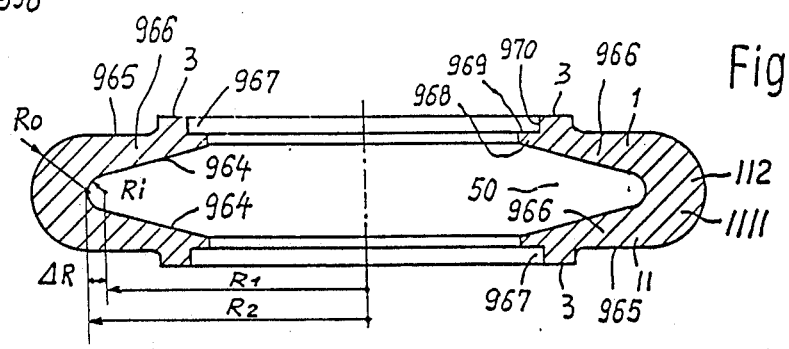

FIG. 48 shows the reversal of the before discussed V-element, namely the U-element. The root which combines two tapered elements to a single body element is here on the radial outer portion and defined by 112, while the shanks are shown by 1 and 11. The ring noses are provided with the axial end faces 3 for meeting neighboring elements, but they are now placed on the radial inner portion instead of on the radial outer portions as in the earlier discussed V-elements. Radially of the ring noses are the seal ring beds 967 with faces 969 and 970 provided, whereinto respective seal and/or supports rings are to be inserted, if required. The faces of the root are formed by radii "Ro" and "Ri" around circular lines which are distanced from the axis by "R1" and "R2", respectively, and which have the radial distance "ΔR" between them.

Figure 49:
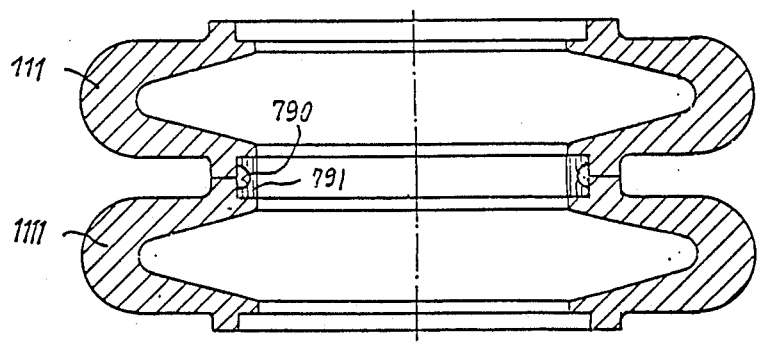

In FIG. 49 two such U-elements 111 and 1111 are assembled axially of each other and seal ring 791 with support ring 790 are inserted into the seal bed. The shanks 966 of U-elements have axial end faces 965 and the inner tapered end faces 964 to form therein a portion 50 of the pumping chamber.

Figure 50:
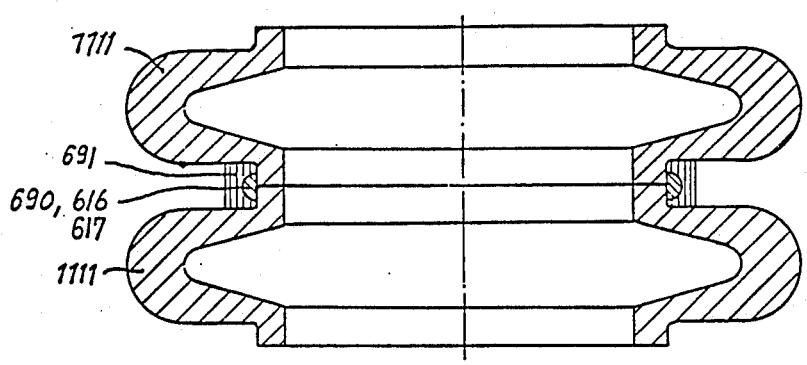

In FIG. 50 again such two U-elements are axially of each other assembled Herein, however, the seal ring 961 and the support ring 616 are assembled into the seal ring bed(s) radially outward of the ring noses 3. Thereby the assembly of FIG. 49 defines an U-ring assembly for pressure radially inside of the elements, while FIG. 50 defines an U-ring assembly for high pressure radially outwards of the elements.

FIG. 55 illustrates that a distance ring 832 for the location between the plane face portions of neighboring coned elements should be provided with relative sharp outer (or inner) corners 1024 with therefrom radially extending inclined faces 1022,1023 which narrow the ring axially parallel to the radial distance from the corners in order to prevent the appearance of the earlier discussed gap 612 (of FIG. 7) or of a respective gap between the radial inner ends of the elements.

FIG. 56 shows two adjacent elements (a complete radial half thereof) in the uncompressed position with plane face portions 610 together, while FIG. 58 shows the same in the completely compressed position with the gap between the face portions 610 opened. This Figure also shows the radially inner plane face portions 850 and the axial inner faces 618 now laid together while it is seen now that the radial outer faces 1025 are now parallel, while they were inclined in FIG. 56.

FIG. 57 shows two neighboring elements 809,611 with inner faces 618 and the meeting face portions 1616 wherein the meeting faces are radially so very short, that the appearing gap at compression will be very small. The seal seats 613 are provided. In this Figure the axial end face portions 1026,1028 are formed to make the radial outer ends thinner.

FIG. 59 shows the elements of FIG. 57 in the compressed position and provided with an outer ring 1030 which with its radial inwardly extending end bords 1029 meets the mentioned face portions 1026,1028 of the elements to keep them together. This outer ring 1030 may, as FIG. 60 illustrates, be radially divided into two parts by cutting the slot 1034. The two portions can then be radially from the outside laid around the two element portions in order to meet and embrace their faces 1026 and 1028.

FIG. 62 shows that with the very narrow gap due to the shortness of the meeting faces 1616 an inner seal bed may be spared if the pressure outwards of the meeting faces is higher than radial inwards. A dead space filler 865 should then be provided axially outward of the elements of FIGS. 57 59,60 and radially outwards of the distance ring 849. The seal ring assembly 861 should be provied between the filler 865 and the distance ring 849. The inside may be sealed by support rings 790, radially of the meeting faces or of the gaps 1043,1044 and by the sal ring 1040 embraced by an inner ring 1042,1045 with its end bords (borders) 1041 and 1046.

FIG. 63 shows a high pressure element again in a longitudinal sectional view to illustrate the locations of ring nose 12, coned face 4, outer or bowed face 5 and the meeting faces 3 and 13.

FIG. 64 shows such element assembled in a pump in a 10:1 enlarged scale. Shown in these Figures is also the face 33 for the clamping arms of the clamping arrangement. The element itself has referential number 1. This enlargement shows the very narrow angle of the inclined face 4 for the very high pressure. Shown also is the inner face, whereon a seal lip bearer 381 is assembled with a sealing arrangement 1070,1071 therein. The front portion of the inner face is cylindrical (60 mm diameter in this sample) and shown by 379 as radially of the sealing arrangement. To the rear therefrom the inner face is slightly inclined as shown by 378. The element swings at compression and expansion around circular line P. Thereby the rear inner end swings from "F" to "E" and vice versa. FIG. 65 shows the decisive seal portion again five times enlarged, whereby it as a 50:1 enlargement and illustrates that a very narrow gap of a few thousands of a mm may open between members 1 and 381. The maximum opening is 0.023 mm in the 50:1 Figure. Experience from testing brings to light, that the seal ring 1071 will enter into this gap and appear after several days of action on the rear of the element in thin black powder. Therefore, a tapered support ring 1070 with inclined faces "Z" and "W" must be inserted as shown. The corner by "M" is the highest stressed area and should be rounded. The measures "$\delta$" and "$\Delta$" show the different radial expansions at the respective locations due to different reasons, including high pressure in the fluid radially inside of the element. Note that the ring nose 12 is clearly visible with its cross sectional configuration in FIG. 64.

Figure 67:
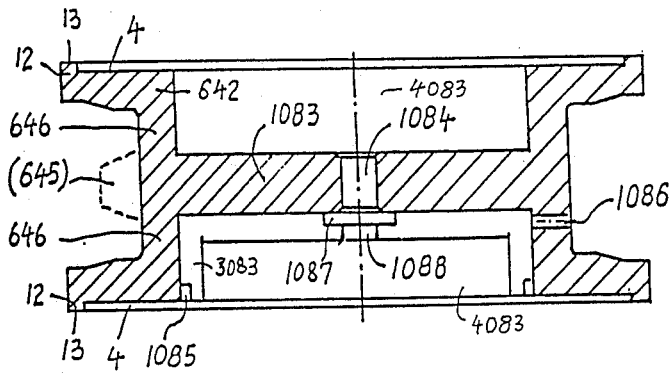

FIG. 67 shows a "W-Y element" in which the sealing problems of the elements of FIGS. 63 to 65 are spared. It shows two elements 1 built together by a medial common portion. The elements are readable by their tapered faces 4, their meeting faces 13, while the medial portion 642, the root of the elements, forms two portions 646 from which in the axial middle the radial inward extension 1083 extends. It has a bore 1084 for the transfer of the fluid. An insert 3083 may be provided with seal ring beds 1085 and/or 1087 if so desired,- whereby the insert also would need a bore 1088 for the transfer of the fluid. The so appearing inner spaces 4083 radially inside of the element will be filled by dead space fillers, not shown in the Figure.

Figure 68:
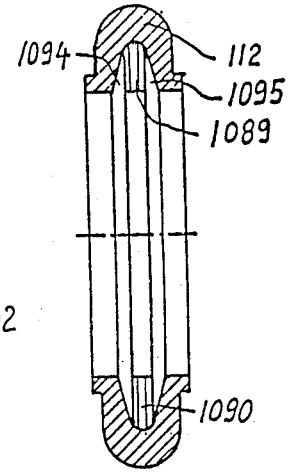
Figure 69:
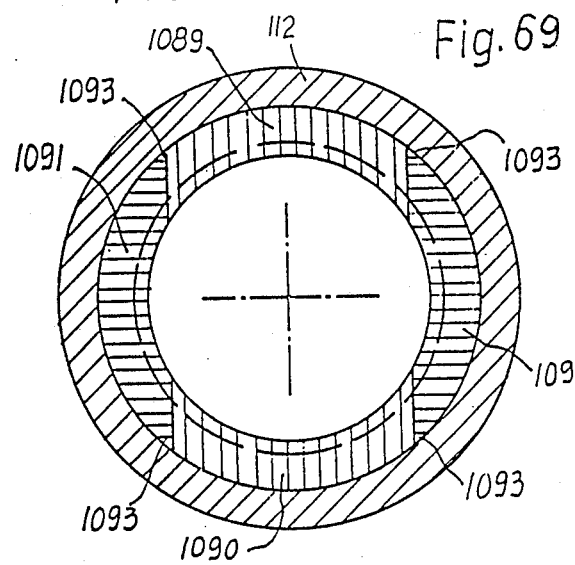
FIG. 69 is a cross sectional view through FIG. 68.

FIG. 68 shows the already described U-element. Shown is in this Figure together with FIG. 69, how the dead space fillers are inserted into the element. They are divided into four portions 1089 to 1092, which meet in faces 1093. The portions can be placed radially from inside into the chamber 50 and must leave the compression spaces (pumping spaces) 1094 and 1095 between them and the inner tapered faces of the U-element 112.

Figure 70:
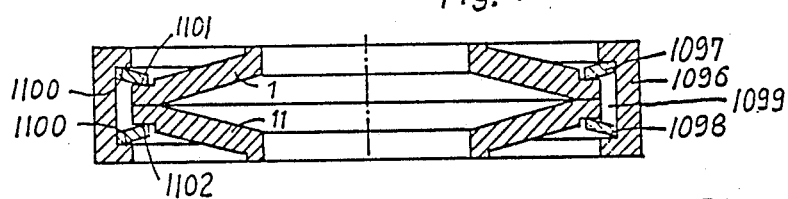
FIG. 70 is a longitudinal sectional view through a device of the invention.
Figure 71:
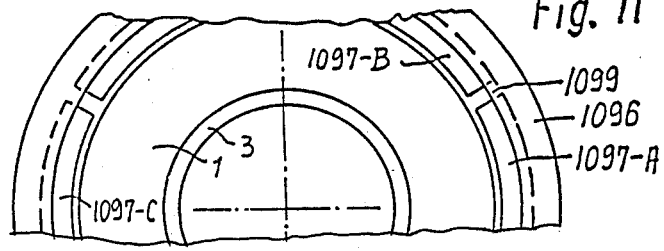
FIG. 71 is a cross sectional view through FIG. 70.

FIGS. 70 and 71 illustrate that disc springs 1097, 1098, which must be radially divided into parts 1097-A,B etc.(see FIG. 71) to be embraced by the bords 1100 of the outer ring 1096 and to embrace the radial and axial outer ends 1101,1102 of the elements 1,11, to keep them at all times closely and without gaps together, may be provided.

FIGS. 72 and 73 illustrate a preferred arrangement to clamp neighboring elements together from the inside. There are two inner rings 1103,1104 axially of each other, embracing portions 1108,1109 of the inner ends of the elements 1,11 and forming a seal bed 1107 between them. They lay on each other and are clamped together by the innermost one piece clamping ring 1105 with bore 1106. The ends of this innermost ring are pressed into tapered portions of the inner rings 1103,1104. The clamping faces of them are shown by 1110, 1111. The seal ring seat 1107 is filled with the seal between the portions 1112 and 1113. FIG. 73 shows the seal in detail in an enlargement of the respective portion of FIG. 72. Support ring 1116 radially of the meeting faces of elements 1,11 may be of metal, even of spring steel, a teflon ring may be provided radially inwards thereof, shown by 1115, wile a soft sea ring 1114 may be provided radially inside of ring 1115.

FIG. 74 shows an alternative to FIGS. 72-73. A distance ring 849 is here provided between elements 1 and 11. Disc springs 1121,1122 are provided to keep the elements together and are held by portions 1118,1119 of the inner ring portions. A distance ring 1120 may be provided between the clamping ring portions and the clamping ring portions are here clamped strongly together by a plurality of pipes 1105 which replace the single pipe 1105 of Figure 72.

FIG. 75 shows in a larger scale the details of the sealing arrangement therein by distance ring 1849 between the elements 1,11 with the support ring 1124 radially inwards thereof extending into the elements 1,11 and the seal rings 1123, 1125 radially inside of the support ring. !124 shall define that the support ring extends axially over the distance ring and into the elements.

FIG. 78 shows a V-element with no outer seal ring seat, whereby the meeting faces 1502 extend until the outermost diameter of the element.

FIGS. 79 and 80 illustrate that the sealing arrangement is then set around the outer faces of the meeting neighboring elements 1527,2527. Again one finds a support ring 616,690 radially of the meeting faces and the support ring is surrounded by the seal ring 691 which embraces also the faces 1126. In FIG. 80 the sealing arrangement is kept between holding portions 1127, 1128 of the elements 1527,2527.

FIGS. 81 and 82, which are sectional views of each other, show that the divided clamping ring 1131, which is laid together by faces 2131, can become kept together by a common outer holding ring 1132 which is set around them after the portions of the radially divided ring have been set with their borders 1134, 1135 over the outer portions of the elements 1527, 2527. Space 1126 enables the radial expansion of the elements inside of the clamping.

FIG. 90 shows the V-element in uncompressed condition and FIG. 91 shows it in fully compressed condition. The stroke of each shank of the element is defined to be "f". Further, different radii are defined in these Figures. The Figures serve for the very excaxt calculation of the volume of delivery of fluid of the element. They serve also to calculate the volumes radially outwards of the element. With the Figures defining the geometrical conditions, the equations in the Figure give their calculations. FIG. 90 deals also with the volumes radially outside of the element.

FIG. 92 shows how the inventor has developed the respective equations, FIG. 93 brings a numerical example calculated through and FIG. 94 brings a schematic to show where dead spaces appear in a respective pump and how they may be calculated.

With the beforegoing several different elements of the invention and their sealings have been described whereby it now becomes possible to show how they are actually applied in a respective pump or pumps.

In many of the Figures which will be discussed now hereafter and which contain entire pumps or major portions thereof, equal referential numbers appear for equal parts or for parts with similar functions. These referential numbers will now be described and their description will not become repeated at the description of the Figures wherein they appear. Thus, the headbody of the pump is defined by 1 or by 1001 or the like, and the head body or head cover 1 contains an inlet valve 38 for the intake of fluid into the inner chamber 37 (or 50) and an outlet valve 39 for the expulsion of the high pressure fluid from the inner chamber 37 (or 50). The main body or housing which holds the bottom portions and the head body of the pump together is mostly shown by 91. If an outer chamber which surrounds the elements or membranes is provided and periodically filled with high pressure fluid, this outer chamber is defined by 35. A high pressure fluid (f.e. oil) supplying reciprocating delivery piston is defined by 52 or by numbers 52 or 35 after a beforegoing number, for example. by 52,535,635,735 or the like. A drive piston which drives the high pressure fluid delivery piston is commonly defined by referential 40,49 or by these end digits and an additional number therebefore. As far as further referentials appear for equal purposes in plural Figures they will become described only at the description of the first discussed respective Figure because such description also defines the function in later Figures.

The embodiments of the invention may be applied in the following systems of high pressure pumps which were developed by the invention together with Messrs. Riken Kiki KK of Tokyo, Japan :

The first pump system is the mechanical drive of the drive piston, called "RATEW" , for example, as shown in the European patent application publication EP No. 0,102,441 in its FIG. 17.

The second pump system is the driving of the fluid delivery piston by a hydrostatic transmission, for example, as shown in FIG. 22 of the mentioned European patent application publication and this system is called: "ETEW".

The third pump system is to compress, for example, by a piston a lubricating fluid and use the fluid pressure to press another fluid out of an exit valve. This pump system is called "EPEW".

Of this third system several subsystems are applyable.

It is important to note that no calculation systems for high pressure elements existed and that the important calculation systems were developed by the present inventor and they are published in the mentioned European patent publication. Without them the calculation of high pressure pump elements is practicly impossible.

While the first and second pump systems are directly visible from the mentioned European patent application publication, and many of the present embodiments of this present application are applyable therein and are thereby improvements thereof, the third pump system, the "EPEW" system is basically understandable from the following subsystems of "EPEW:"

The first subsystem 3-*a*, has a lighter than water fluid, f.e. oil, above the water and uses a driven piston to run in oil, sealed by oil, to press the heavier than oil fluid out from the below the lighter fluid through a respective exit valve. This subsystem is basically described in FIG. 105.

In the second substystem, 3-*b*, a fluid separation body is provided between the two different fluids of the 3-*a* subsystem. Such separation body is, for example, shown by 1180 in FIG. 89.

The third subsystem 3-*c* has a membrane between the two different fluids to separate them from each other. This subsystem is in principle shown in FIG. 106.

The fourth subsystem 3-*d* has self-adapting elements or V-elements of the present invention, in which the elements expand under own inner stress and radial areas between adjacent elements are provided, or provided and radially sealed, whereby the pressure in the outer chamber 35 wherein the elements are provided presses the neighboring elements together and at the compression of the elements the inner fluid from the inner chamber 37 becomes delivered over an exit valve 39 after it had been taken in at the expansion stroke over an inlet valve 38 in the inner chamber 37.

The fifth subsystem 3-e is the provision of "S-elements" instead of the elements or V-elements of the invention. The "S-elements" have pluralities of oppositionally directed tapered ring elements in a single body.

The also invented "U-elements" have two different types, one for the application in the first or second pump system and the other for the application in the third pumping system.

Figure 105:
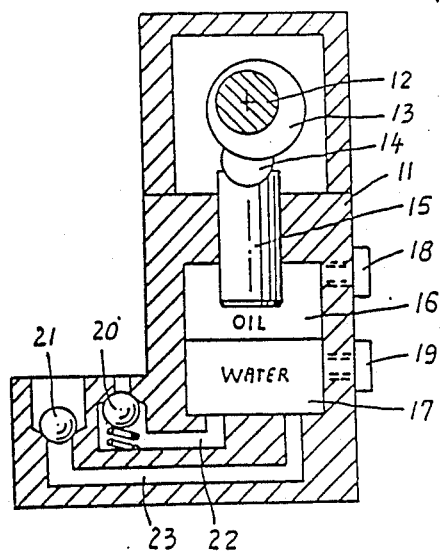
FIG. 105 shows a longitudinal sectional view through the basic oil over water pump.

Referring now to the simplest substem, subsystem 3-a, attention is given to FIG. 105.

In FIG. 105 a piston 15 carries a piston shoe 14 which slides on the drive face of a cam 13 of shaft 12 and thereby provides a piston stroke to piston 15. Note that if there is no piston shoe, no guide for the piston in the cylinder and no faces contact between these members, then the piston can not operate at high pressures. The main housing 11 has a chamber which contains a certain amount of lubrication providing oil, marked in the Figure as "oil". Passages 22 and 23 lead from the mentioned chamber to the inlet valve 20 and to the outlet valve 21. At the upward stroke the piston sucks water or other heavier than oil fluid through entrance valve 20 into the chamber in housing 11. Since the water is heavier than the oil in chamber portion 16 the water remains below the oil in chamber portion 17. At the downwards stroke the piston 15 presses the oil downwards whereby the oil presses the water out of chamber portion 17 through the outlet valve 21.

Figure 85:
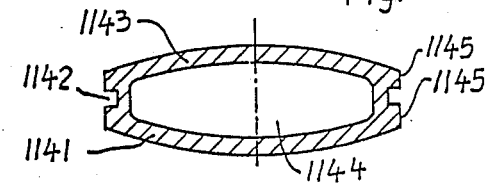

In subsystem 3-b the fluid separation member , for expamle, the fluid separation member 1143 of FIG. 85 or another similar member of another Figure would be assembled in the chamber in housing 11 between the water containing portion 17 and the oil containing portion 16 of FIG. 105.

Figure 106:
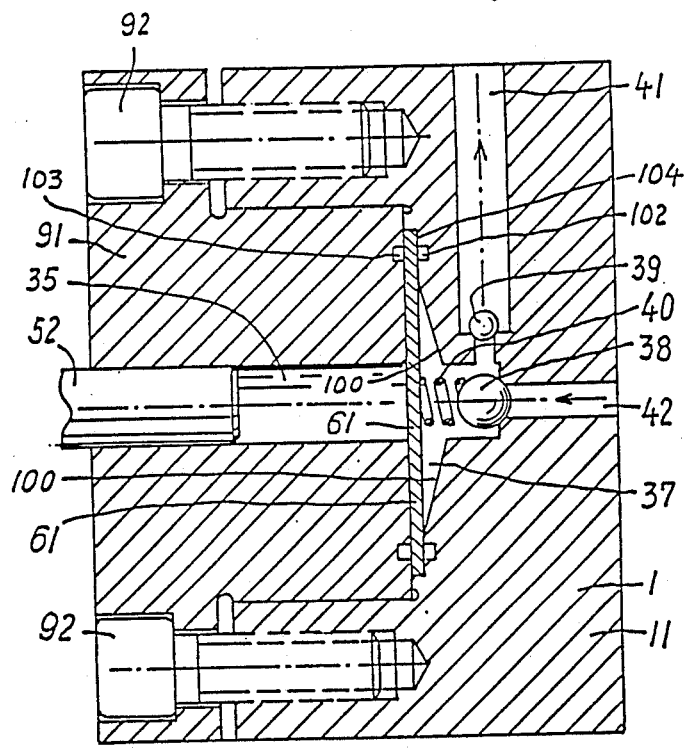
FIG. 106 shows a longitudinal sectional view through the basic membrane pump, partially of the invention.

In the third subsystem 3-c a membrane would be provided as fluid separation member, for example, as in basic FIG. 106.

In FIG. 106 a membrane 61 is fastened between the housing 91 and the head body 1. Piston 52 reciprocates and presses fluid into the outer chamber 35 at the delivery stroke. Water or other fluid was taken in at the intake stroke of piston 52 through inlet valve 38. At the delivery stroke, the oil which is delivered by piston 52 into the outer chamber 35,presses against the membrane 61 and thereby the membrane moves to the right in the Figure and presses the water out of the inner chamber 37 over the outlet valve 41. The strong bolts 92 and bodies 1 and 91 indicate that for the high pressures of the invention these members must be rigid and/or strong.

Figure 96:
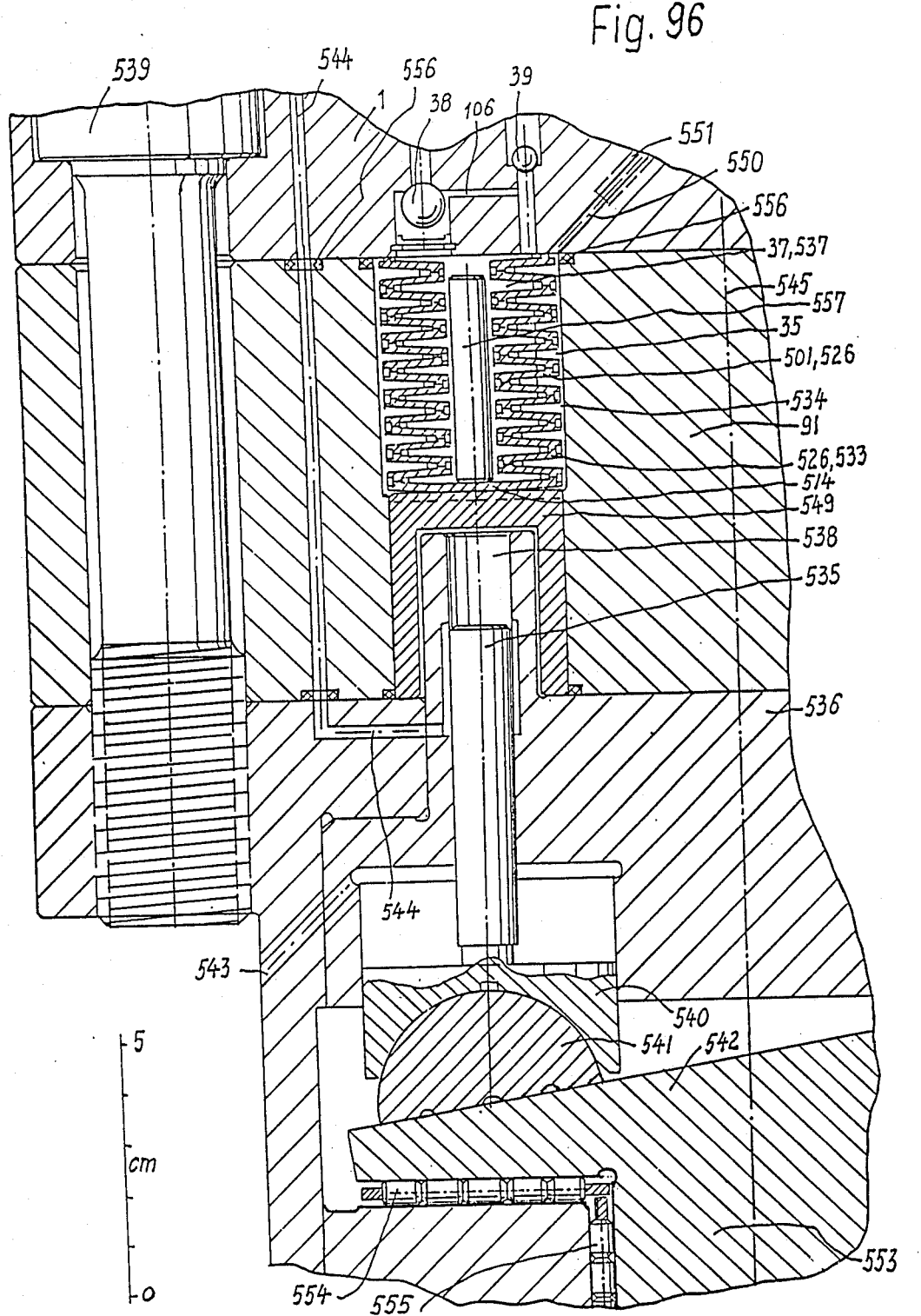

FIG. 96 describes the basics of subsystem 3-d. Housing 91 is fastened by bolts 539 to the head cover 1 which contains the inlet valve 38 and the outlet valve 39. Piston 535 is reciprovcated by drive flange 543 of shaft 553 over the piston shoe 541 in piston head 540. At the intake stroke the piston 535 runs downward and the elements 501,526 expand whereby they take in the fluid through the intake valve 38 into the inner chamber 37,537. The piston 535 takes in oil through the passage 544 into the outer chamber 35. At the beginning of the delivery piston stroke a valve, not shown, closes fluid line 544 and the oil in the outer chamber 35 and in the chamber below the accessory piston 549 compresses. At the further delivery stroke of the mentioned piston the oil compresses the elements 521,526 in the outer chamber 35 whereby the inner chamber 37 reduces its volume and delievers the water over the outlet valve 39. Sofar the basic system of the subsystem is described.

The other members in FIG. 96 have specific functions. For example, passage 106 serves according to the invention for automatic transfer of air from the highest place in the pump to the exit valve whereby an outomatic departure of efficiency reducing air is provided. Passage 550 with connecting portion 551 provides the automatic removal of air from the outer chamber 35, while passage 106 did this for the inner chamber 37. The inner chamber is inside of the elements, while the outer chamber is outside of the elements. Shaft 553 has the drive flange 542 with an inclined face to guide the piston shoe thereof. The shaft is revolvingly borne in bearings 554 and 555. Note that the fluid supply piston 535 has a small diameter for the high pressure and requires a bigger diameter drive piston portion 540, guided in 536, because otherwise the piston shoe 540 would be overloaded at the very high pressure. Thus, drive piston 540 with its bigger diameter carries in a bed in it a piston shoe of bigger diametric dimension than the diameter of the fluid supply piston 535 to provide large faces for lower loading of the piston shoes guide-and swing-faces.

Figure 98:
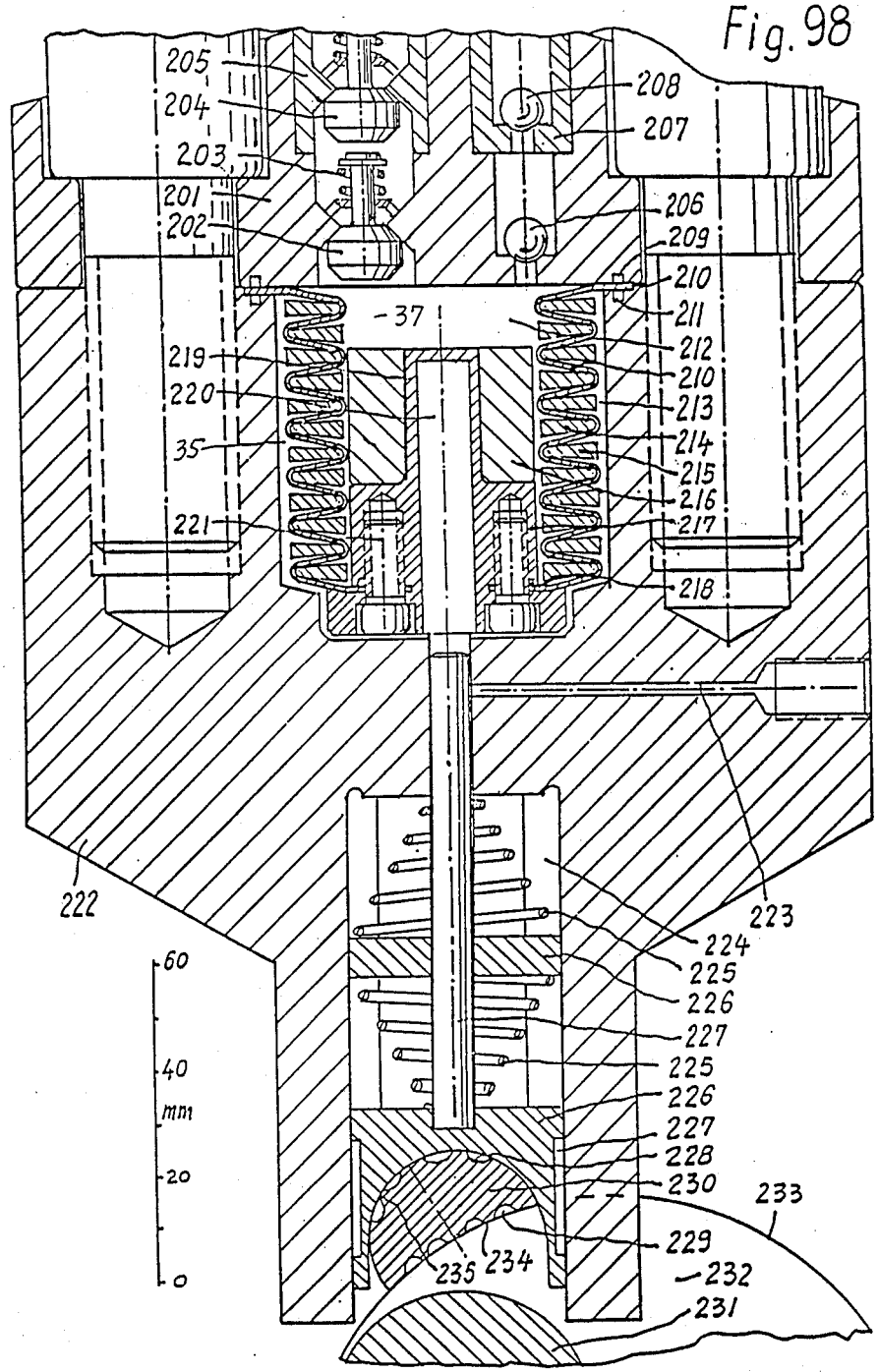

FIG. 98 illustrates the pump of the last mentioned subsystem 3-e. Herein the "S-element" 210 replaced the selfthrusting elements of Figure 96. It is with its upper end fastened between seals 209,211 between cover 201 and housing 222. Its bottom is closed by bottom 218 with bolts in holder 217. A dead space filler 216 is provided. Further are the outer dead space fillers 213 outside of the S-element and the inner dead space fillers 214 provided between the shanks of the elment inside of the elment 210. Note that the outer fillers 215 are provided between the to the outside open shanks of the S-element 210. Fluid supply piston 227 pumps periodically the fluid into the outer chamber 35 whereby the inner chamber 37 delivers the water out over the outlet valve, when the shanks of the S-elements compress.

Sofar the basics of this system are explained. The additional members are specifics of FIG. 98. Such specifics are, for example, the provision of plural inlet and outlet valves in the inlet and outlet passages. See hereto the members 202,203,204,205,206,207,208. These members show the preferred design for small dead space inlet and outlet valves of high reliability. Member 219 with bore 220 makes a long piston stroke deeply into the S-element possible. Passage 223 is a control passage with a connecting portion for the control of the provision of the proper quantity of oil in the outer chamber 35. This passage fills the outer chamber with the proper amount of oil when the supply piston 227 is in its bottom-most postiion. Since the supply piston is very long and thin, a guide arrangement 226 is provided in housing 222. Guide piston 226 reciprocates in the cylinder in the housing and is pressed into a medial position by springs 225. For the very high pressure a drive piston 226 with a big piston shoe 230 is again provided. The passages and recesses 227 to 229 serve for the control of the lubrication of the piston head 226 and for its shoe 230 as well as for providing hydrostatic bearings for them. Faces 228 and 235 are the swing faces and 234 is the slide face of the piston shoe which runs on the outer face, the piston stroke guide face 233 of the piston stroke drive. The piston stroke drive is a radial drive over eccenters 232 of revolvable shaft 231. A medial recess is provided between neighboring cams into which guide portions of the housing 222 temporary enter to provide the long piston stroke per given size of the pump for good efficiency of the machine. Sofar the basic subsystems of the EPEW system have been described.

Figure 99:
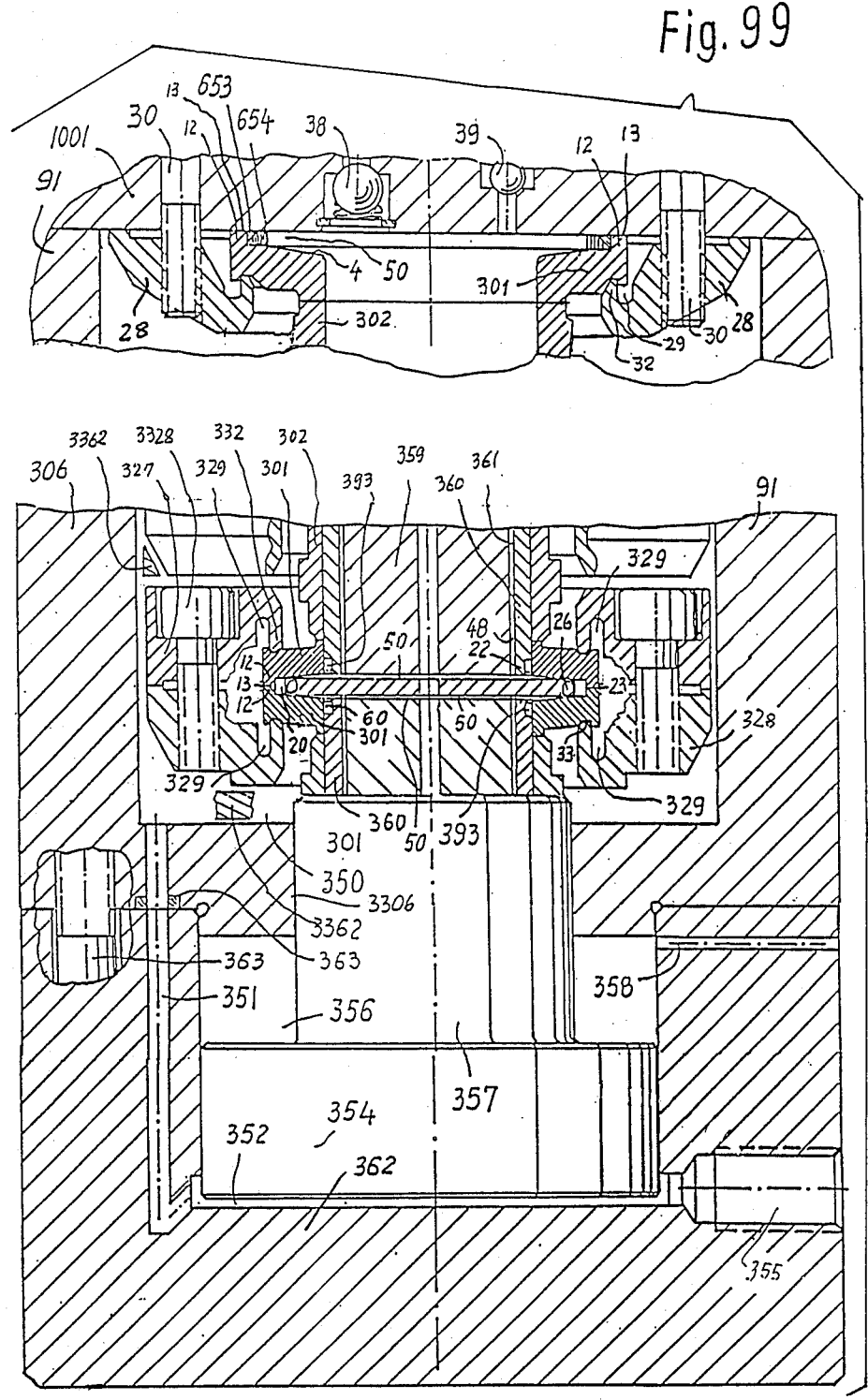

A sample of the ETEW system is also shown in FIG. 99.

Housing 362,306 has a cylinder 352 wherein a piston 354 is reciprocably mounted. Pressure fluid is supplied from a respective source through entrance port 355. The piston has the piston shaft 357 of smaller diameter respective to the mentioned piston 354 and is guided in a portion 3306 of housing 306 while passage 358 permits the entrance and exit of air to prevent compression of fluid in the space between piston 354 and housing portion 3306. On top of the piston shaft the arrangement of the pumping elements is assembled. The basic elements 301 form between them the inner chamber, known as 37. These basic high pressure elements may be called "N-elements" since they are the ring nose elements of the earlier discussion. Between the elements and neighboring parts are pipe portions 360 provided with the inner ends of the elements laid onto them. The purpose of these pipes, which serve as distance rings, is that they follow the radial expansions and contractions of the elements to prevent friction between on each other sliding faces under high axial load. The N-elements are clamped together by the clamping rings 327,328 with bolts 3328. The clamping rings are provided with annular ring grooves 329 to form the thereby radially expandable and contractable clamping lips 332 which embrace the earlier discussed faces of the high pressure elements. The ring noses are laid together and the seal bed radially of them is formed and limited in radial inward extension by the inner dead space filler rings. Seal lip bearers 360 are provided and extend into the elements to form seal ring seats 393. The seals in them seal the inner faces of the elments. Since the seal lip bearers are subjected to high pressure from the inside, they press their lips and seal ring seats radially against the elements to seal it. Respective clearances 361 are provided. Dead space fillers 359 are also provided. Sofar the basic system of the ETEW type is described whereby it is to be understood that a head cover 1 with the valves 38,39 must be provided on the topmost end of the assembly of plural sets or elements.

The speciality of this Figure is that pressure is led from cylinder 352 through passage 351 into the space 350 in housing portion 306, which surrounds the element assemblies as an outer chamber, known as 350. Dead space fillers 3362 may be provided to eliminate or reduce losses by compression of fluid. The pressure in the inner chamber inside of the elements will built up higher than the pressure in the mentioned cylinder 352 and in the outer chamber 350. However, while the ETEW system basically works with pressure only in the inner chamber, the in this Figure provided outer chamber reduces the pressure difference inside and outside of the elments and thereby makes a higher pressure in the inner chamber posssible. At proper design the pressure in the inner chambers may be doubled by the speciality of the arrangement of this FIG. 99. The pressure in the inner chamber may then be called, "high pressure" while the pressure in cylinder 352, passage 351 and outer chamber 350 may then be called: "half pressure". The head cover on top of housing 306 over the breaking line of FIG. 99 corresponds substantially to cover 1001 of FIG. 14 with the inlet- and outlet-valves 38 and 39 therein.

Figure 100:
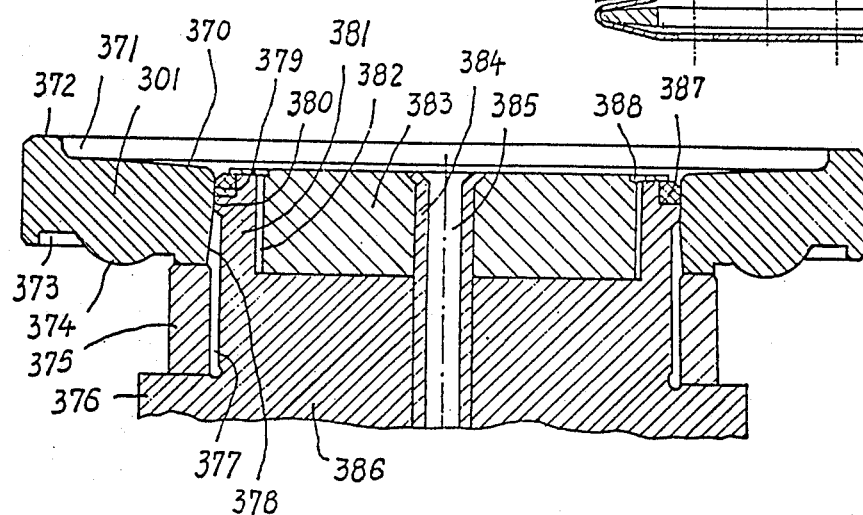

FIG. 100 shows a portion of the arrangement of a basic high pressure N-element separately illustrated. Element 301 is axially borne on the distance ring 375, which is in turn borne on the base body or piston 386 which forms for the bearing of the distance ring 375 the seat 376. The radial inner face portion 380 of the element 301 is cylindrical and ends in a slightly coned rear face portion 378. Piston 386 forms the seal lip bearer portion 381 with the seal ring 387 inserted into the seal ring seat of the seal ring bearer 381. To permit the radial expansion and contraction of the seal ring bearer, it has an interior recess 382. The dead space in it is filled by dead space filler 383, fastened to the piston 386 by holding pipe 384 with bore 385 while the lip 388 of the filler holds the seal ring in its seat. A clearance 382 remains to permit the entrance of the high pressure inner chamber fluid radially inside onto the seal lip bearer 381, while clearance 377 permits the radial contraction of the distance ring 375. The ring noses 372 of the element are shown, the tapered inner face of the element is 370, its rear outer face is 374 and its seat face for the setting of the clamping lips 332 of FIG. 99 is shown by 373. Note the axial thickness of the Nelement for high pressure of 1500 to 2000 atmospheres in a pump without pressure in the outer chamber.

Figure 101:
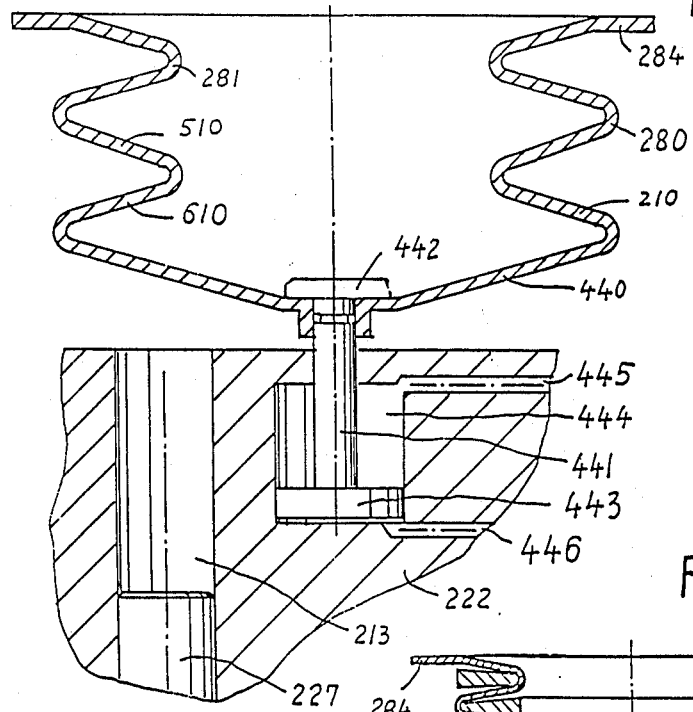

FIG. 101 shows an S-element with plural shanks 510,610 and plural inner and outer roots 280,281, a bottom portion 440 and an upper flange portion 284. This element is for high pressure commonly made of metal, for example of SUS 630 (Japanese Standard). 17-4 PH.c.h (U.S. standard) or of VEW precious steel. Since stainless steel elements loose with time the spring action capacity, the S-element which is supposed to make about 30 million strokes at the life time of the pump, may tire its return stroke effectiveness, a return stroke traction arrangement may be provided. The holder 442, thus, holds a piston shaft 441 which forms a piston 443 on its bottom end and is reciprocably sealingly provided in cylinder 444. Fluid lines 445,446 then alternatingly supply pressure fluid onto the different ends of the piston to thereby tract the bottom portion of the element downward to expand the element. This arrangement is in principle also shown in some more Figures of this application. Note as a further speciality of this invention that the fluid pressure supply piston 227 in cylinder 213 is then radially displaced from the axis of the outer and inner chambers. Flange 284 will be clamped between housing 91 and head 1 of a respective pump.

Figure 102:
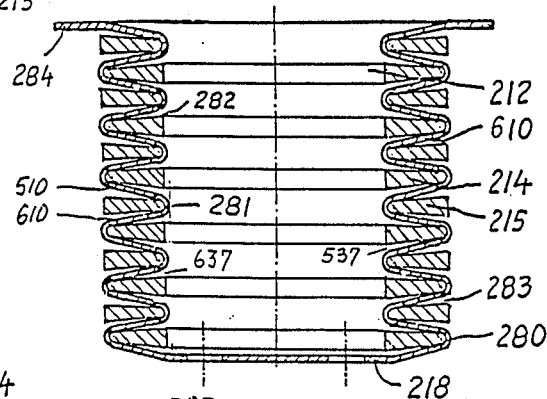

FIG. 102 illustrates that for the high pressure devices of the invention inner and outer dead space fillers 214 and 215 must be provided between the shanks of the elment. They must be of such cross sectional configurations that the tapered spaces 283,537,637, etc. remain between the walls of the shanks of the element and the walls of the dead space fillers. The interior space 212 then appears and must be filled by a dad space filler which then also serves as a guide for the inner dead space fillers between the shanks of the element to hold them in their locations.

Figure 97:
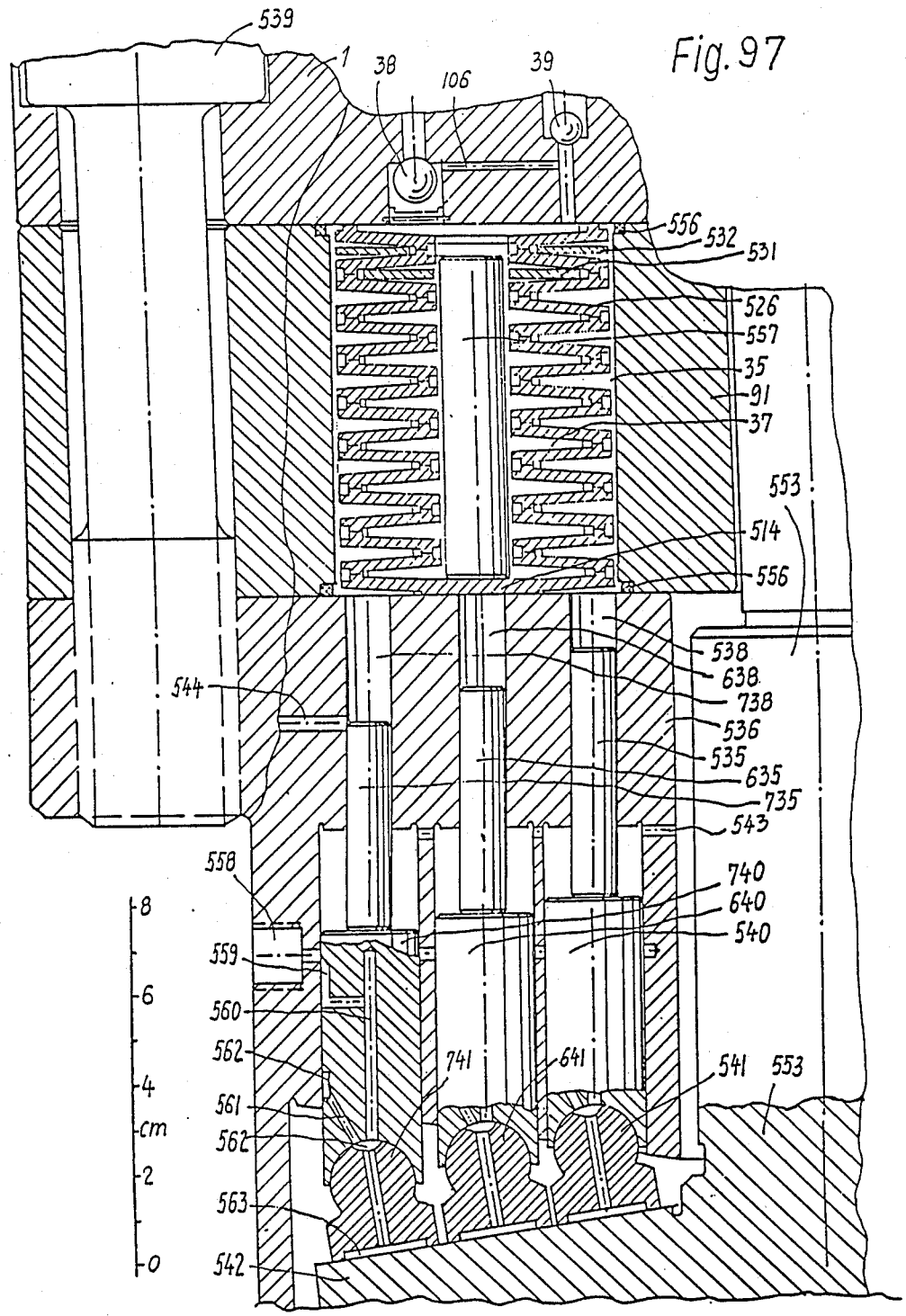

FIG. 97 shows basically a pump with an assembly of ring nose elements as in FIG. 96. The specialities of the invention of FIG. 97 are, for example, the extension of the drive shaft 553 through a bore in housing 91, or the provision of each three fluid supply pistons 535,635,735 with drive pistons 540,640,740 to a respective outer chamber 35 of the pump. The ringnose elements are assembled in the outer chamber 35, form between them the inner chamber 37 and form the inner and outer dead spaces between their shanks which should be filled with dead space fillers 532,531, respectively. The piston shoes 741 which run on the piston stroke face of the inclined piston stroke body 542 have fluid pressure containing balancing pockets 563 to form hydrostatic bearings and these are supplied with pressure fluid from port 558 through passages 559.560 through the drive pistons to the pockets in the piston shoes 541,641 and 741. Passages 561 suply this fluid to the pressure pockets 562 of respective hydrostatic radial bearings in the drive pistons, at times when they are at high inclinations of the shoes, communicated by control recesses 562 to the piston passages 560. Note the big diameter bolts 539 for the speciality of the very high pressures in the device.

Figure 95:
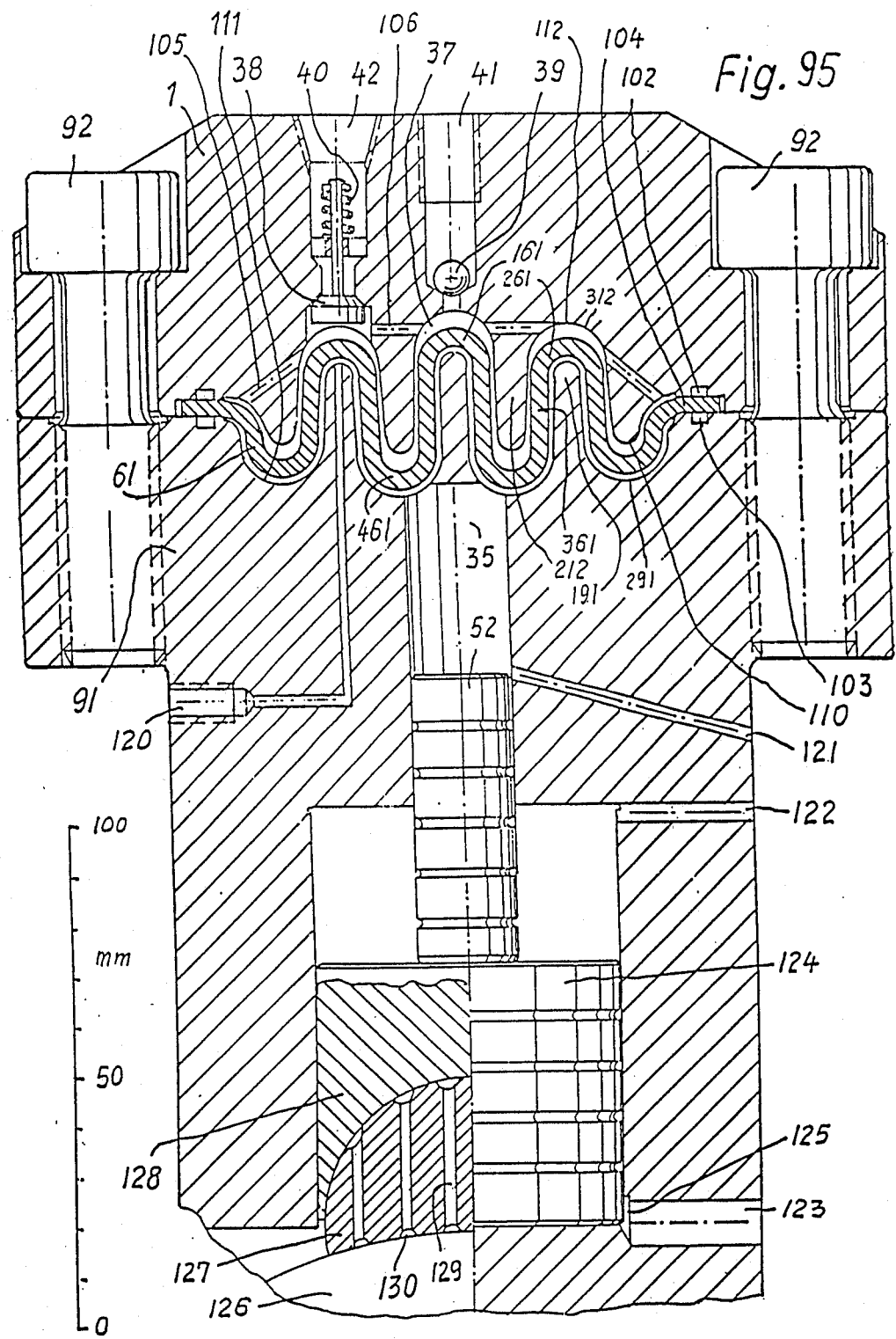
FIGS. 95 to 104 are longitudinal sectional views through devices of the invention.

In FIG. 95 a specific membrane arrangement of the invention is illustrated. Membrane 104 is with its flange 104 fastened between housing 91 and head cover 1. It forms downwards and upwards extending wave portions 61,361 with root bows 161,261,461 with the substantially axially extending shanks or waves therebetween. Thereby the shanks deform radially under the pressures while the medial portions,waves,bow rootes etc., deform under pressure axially as the S-elements or the other elments of the invention do. As a further specific invention, the dead space fillers between the shanks or waves, namely 191,212 etc. are formed integral with the head 1 or the housing 91 or with inserted bodies therein and fill the spaces between the waves of the element, whereby they, however, leave portions of chambers 35 and 37 for the pumping deformations of the element. Passages 106 are provided on the highest places of the inner chamber 37 to automatically send the air pockets out of the inner chamber over the outlet valve 39, while the passage of port 120 extends to the highest place of the respective dead space filler portion of the outer chamber 35. Note that any air in the chambers, which may have been left in the inner or outer chamber at the assembly of the pump, will drastically reduce the efficiency by internal compression of air or even prevent any pumping action of the pump.

Control passage 121 serves to fill at the bottom-most location of the fluid supply piston 52 before the next supply stroke to fill the outer chamber 35 with the correct amount of fluid, F.C. with oil. In the bottom portion of the Figure alternatives to drive the fluid supply piston are illustrated. Piston 124 can be of big enough diameter to be driven by medial pressure fluid of several hundred atmospheres from port 125 in cylinder 125. Passage 122 opens the upper portion of the cylinder to prevent compression of fluid therein. The other alternative is the piston drive by a cam 126 over a piston shoe 127 in a piston head 128 with the already described passages and fluid pressure pockets 129 and 130.

Figure 12:
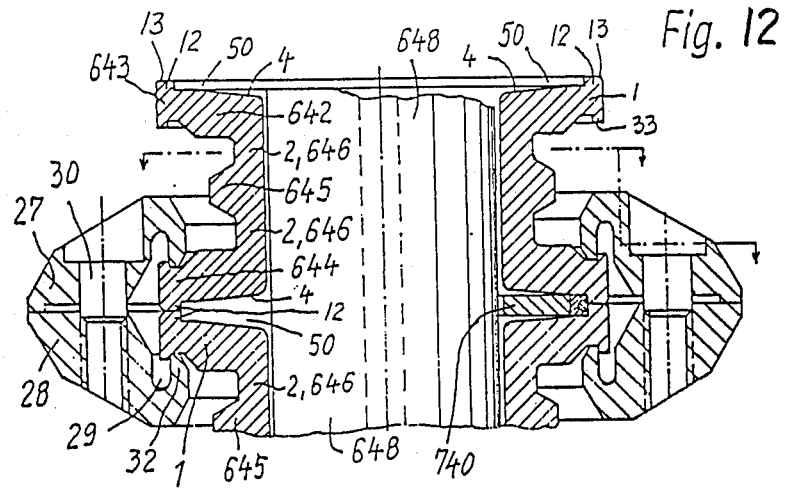
FIG. 12 is a longitudinal sectional view through a device of the invention.
Figure 13:
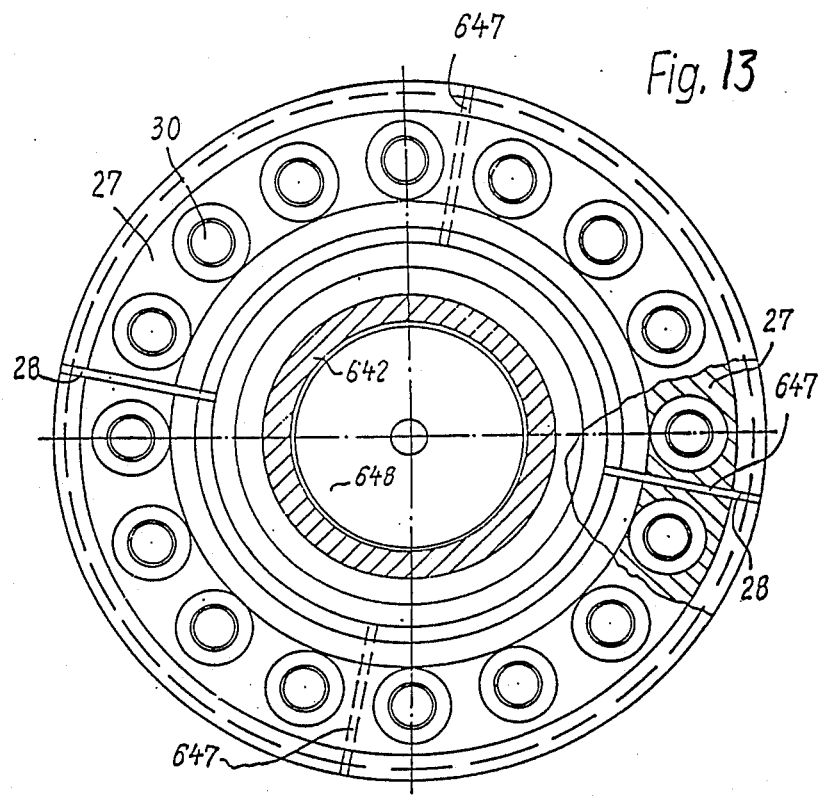
FIG. 13 is a cross sectional view through FIG. 12.

FIG. 12 with its cross sectional Figure 13 illustrates how a W-Y element can be assembled. A plurality of W-Y elements 2,636 are assembled axially of each other with the inner dead space fillers 648 and 740. The ring noses 12 are laid upon each other. The already known portions of shanks 643 and 644 are shown by their already known referential numbers. A medial thickening portion 645 may be provided to replace the inwardly extending portion of the already described alternative to prevent too strong radial expansion of the medial root 2 under inner pressure from the radial inside. The clamping rings 27,28 with bolts 30, the recesses 29 and the clamping lips 32 are provided, as already known from the earlier discussed Figure. However, in a W-Y element the known clamping arrangement can not become assembled without a modification. This modification by this invention is, to radially cut the clamping rings into at least two pieces by the slots 28,647 which are illustrated in FIG. 13. Figure 13 further shows that the upper and bottom clamping rings should become assembled with the slots 28 of one of them 90 degrees turned relative to the other of the slots 38,647. The portions of the clamping rings can then be set radially from the outside into the space between the shanks of the W-Y element. The element in these Figures is a "W-element" because it does not have the radial inward extension of the W-Y element of FIG. 67.

Figure 14:
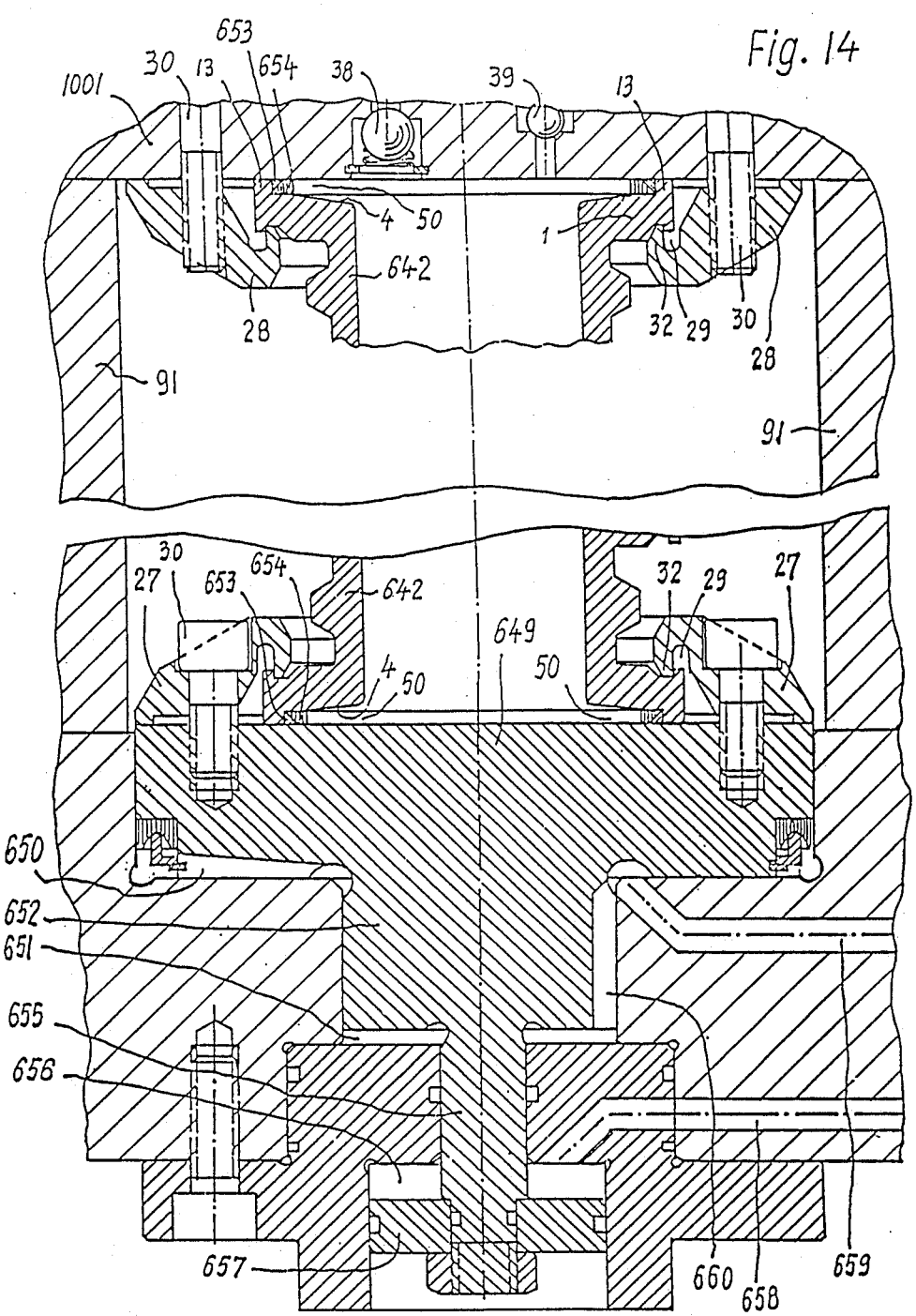

FIG. 14 shows a longitudinal sectional view through an ETEW system pump. Fluid under pressure is alternatingly supplied through passage 659 into the cylinder 650 to reciprocate the drive piston 652 therein. The bottom portion of an N-element, or as shown in this Figure, of the bottom-most W-element, is fastened by bolts 30 and holder 27 to the drive piston 652. The topmost element is with its topmost portion fastened by bolts 30 and holder 28 to the top cover 1001. Between the bottom-most and the topmost element a plurality of additional elements with their clamping rings can be provided. To seal the topmost and the bottom-most element, the seal means 653,654 are provided which are similar to respective means in FIG. 26 and will be discussed at hand of FIG. 26. FIG. 14 also shows the provision of a return stroke traction means by the application of a piston shaft 655 of piston 652 with a traction piston 657 provided thereon in a traction cylinder 665. Fluid line 658 supplies and opens alternatively to the traction fluid into and out of cylinder 656 at the respective times of the strokes of piston 652. A clearance 651 should remain below the bottom and of piston 652 to prevent breaking of the assembly under the strong forces of the axially big high pressure elements.

Figure 15:
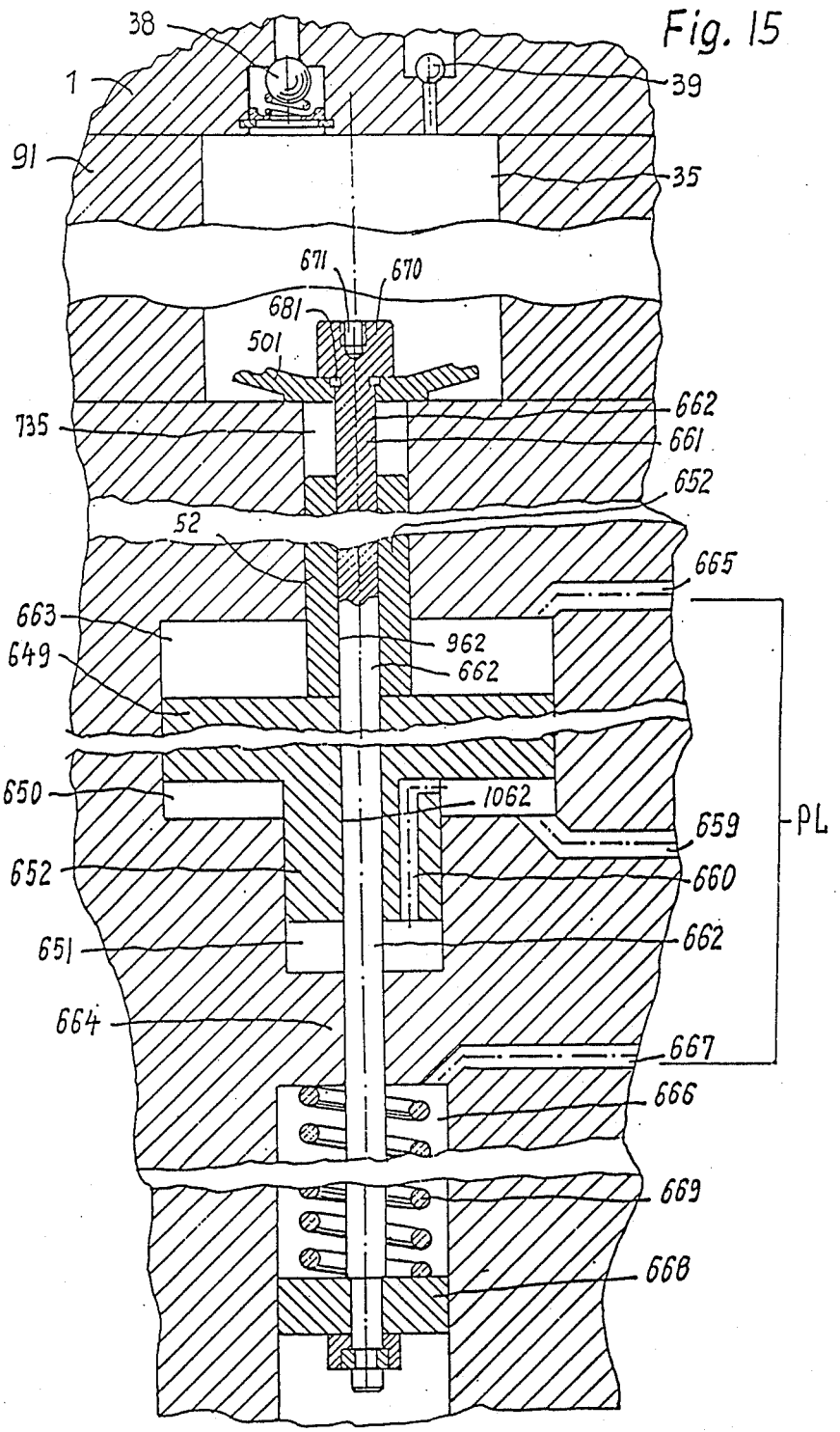

FIG. 15 illustrates the alternative or the combined application of a return stroke traction spring 669 with holding piston 668 on a traction piston 661 which is fastened to the bottom-most element 501 in the outer chamber 35 of housing 91 by fastener 670,671 with seal ring 681. The alternative fluid pressure retraction means is cylinder 650,663 with traction piston 649 therein reciprocable. Respective passages 667,665,659 are provided. The Figure illustrates also, that 649 can serve as a drive piston to supply fluid from cylinder 735 into the outer chamber 35. The traction piston 661 is then sealingly extended through the drive or fluid supply piston 649 with its portions 52,652. Seal 692 seals between pistons 662 and 52,649. Passage 660 should be applied. Passages 665,667 communicate to low pressure as the marking "LP" indicates.

FIG. 20 shows alternative return stroke tractions means 712, seal 711,1007 on pistons 712,713, assembled to housing 91 and piston 717 assembled to piston rod 713. An insert forms traction cylinder 715 and passage 659 makes piston 649,652 to the thrusting piston for the elements. Respective passages 665,718,660 are provided in addition to passage 659.

FIG. 19 illustrates important means of the invention for EPEW pumps of the invention. It brings fluid inlet control means and air outlet control means of the outer chamber 35 which act automatically and reliably. Inlet valve 706 is set to the inlet passage 709 for the control of the outer chamber at times of expanded elements into the outer chamber. A valve housing 707 is fastened by fastener 710 to the housing 91 and sealed by seal ring sets 708. In space 705 a spring can be provided to slightly press the control inlet valve 705 before the passage 709. This valve 705 is automatically closed as soon as the pump stroke begins by the rising pressure in the outer chamber and prevents escape of fluid and pressure from the outer chamber. The automatic air outlet valve is provided by valve 703 in valve housing 1012. But, important is, that this valve assembly is seen onto the highest placed of the outer chamber where the undesired air collects. In this Figure it is place above the clearance 697 which surrounds the elements in the outer chamber and the air outlet passage 795 meets this highest location in the outer chamber 35. Air outlet control piston 703 is reciprocably mounted in valve housing 1001,1012 and set into a medial axial location therein by a spring 701 in a space between piston shaft 703 and piston head 696. The control piston has an ingoing passage 1013 and an outgoing passage 704. At the time of low pressure in the outer chamber, that is when the elements are expanded and only the low pressure through control inlet valve 706 is present in the outer chamber 35, the spring 701 in space 700 presses the air outflow control piston 703,696 downward into the position as shown in FIG. 19. The air now flows through passage 1013 into radial passage 699 and on through space 700 into the radial passage 702 and then through passage 704 out of the pump. As soon, however, as the piston stroke starts and thereby the pressure in the outer chamber 35 increases, the control piston 696,703 is pressed upwards, whereby the radial outflow passage 702 enters into the bush 1012 and becomes closed by the close fit of the shaft 703 of the control piston in the sealing und guiding bush 1012. Since the passage 702 is now closed, no fluid can escape any more from the outer chamber 35 and the high pressure in it can built up. After the next expansion stroke the spring 701 will press the control piston downwards again for lettin any rest of air escape from the outer chamber 35.

Figure 16:
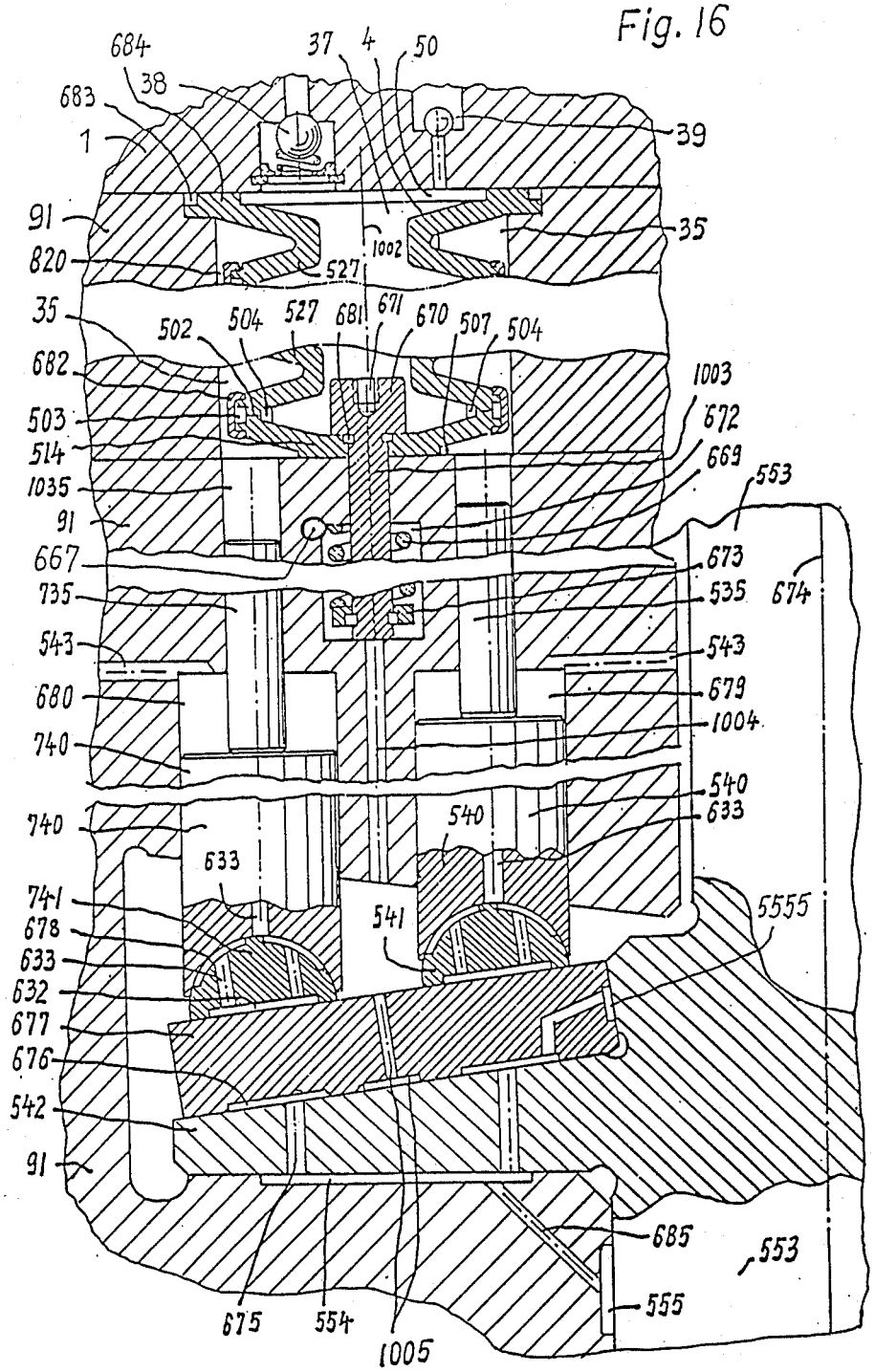

FIG. 16 illustrates again an EPEW pump of which all basic details are known from the earlier discussed Figures. FIG. 16 features clamping rings 682 around neighboring V-elements with their seal seats 503,504 radially of their ring noses 502. It further illustrates the application of a traction arrangement around the axis of the outer chamber, shown by 673,667,669,672, also by and 1003,681,671 and 670. The Figure further illustrates fluid pressure pockets 676,1005,554, 632 on the piston shoes 541,741, and on the drive flange with a rotary plate 542,677 with respective passages 675,633,685, and control corners between neighboring pockets 632 as well as additional radial fluid pressure pockets 555 and 5555 on or for the shaft, the drive flange or the bearing support plate 677 which is revolving or stationary between the drive flange 542 and the piston shoes 541,741 located. Note here, that the axes of the pistons 735,535,540,740 are radially distanced from the axis of the respective outer chamber 35 in order to permit the concentric application of the traction arrangement 1003 etc. below the outer chamber. Note also that the axis of the entire pump is 674, equal to the axis of the pump's drive shaft 553 while plural outer chambers 35 with their arrangements therein and thereto are radially spaced around the axis 674 of the pump. Thus, axes 1002 of outer chambers 35 are angularly spaced around the main axis 674, while the axes of the pistons are radially or radially and angularly spaced from the axes 1002 of the respective outer chamber 35.

FIG. 21 with enlargement FIG. 22 illustrates, how, the opening of a gap between two neighboring ring noses of elements may be prevented or become reduced in size. For that purpose one of the ring noses has a radially plane, flat end face while that of the neighboring element becomes a bowed face or a face with a medial portion 720 and radially thereof slighly away inclined portions 721,721 on the ring nose 719. See hereto also the enlargement FIG. 22 wherein these portions are illustrated. If the elements compress the medial portion 720 and the coned portions 721,722 will compress within the range of elastic deformability of the metal whereof the elements are made. Instead of opening a gap the ring noses then close by compressing their on each other lying face portions 720 and partially also 721 and 721 into the elements.

FIG. 24 shows in addition to its already described portion the application of an automatic control valve 731 between the inner chamber 37 and the outer chamber 35. The valve 731 is reciprocable in a cylinder 729 and has inclined recesses 736 towards the inner chamber, if these recesses are desired. The ends of the cylinder communicate by passages 728,730 to the inner and outer chambers 37,35, respectively. The medial portion of the cylinder, namely 732, communicates by passage 733 to the outside of housing 91 or to a space under low pressure. If now at operation of the pump the pressure is too high either in the inner or in the outer chamber, the valve body 731,734 moves up or down to communicate the respective chamber for the repsective short time to the outlet passage 733 for reducing the respective pressure in the respective chamber, As soon as the desired pressure difference is established again, the valve body moves into the position in which it closes the outlet passage 733, Note that the valve portions 735 and 734 may have different diameters and then the cylinder portions have correspondingly different diameters for proper sealing of the valve portions.

The already mentioned FIG. 26 now illustrates how the uppermost or bottom-most elements are sealed relative to the drive piston or to the head body 1,1001. The ring noses 502 must be sealed radially in both directions in order that the radial difference of the inner and outer diameters of the ring noses obtain the self to each other thrusting effect under the fluid pressures in the inner and outer chambers 37 and 35. Since the noses 502 might open small gaps at compression and expansion of the elements, the support rings 653,760 must be provided below the elastic seal rings 654,761. The support rings must have respective inclined faces as was described at hand of earlier discussed Figures. A seal ring 694 must also be provided in a respective seal ring bed between the housing 91 and the head cover 1, 1001. Note that the seals must be placed in such a way that they do not close the passage 795 to the automatic air outlet control valve.

FIG. 31 illustrates that the elements may also be made by fiber reinforced plastics, for example, by carbon fiber. Outwardly rounded rings 801 or inwardly rounded rings 810 form the start of the production. Shets of fiber then are glued half or quarter way around them. In the Figure these are glued together radially outwards of ring 801. It is convenient in production to use radially short sheets of the fiber reinforced plastics and overlapp them before glueing them together. Thus, one sees overlapping sheets 802 to 809 and 811 to 819 in the Figure.

Figure 32:
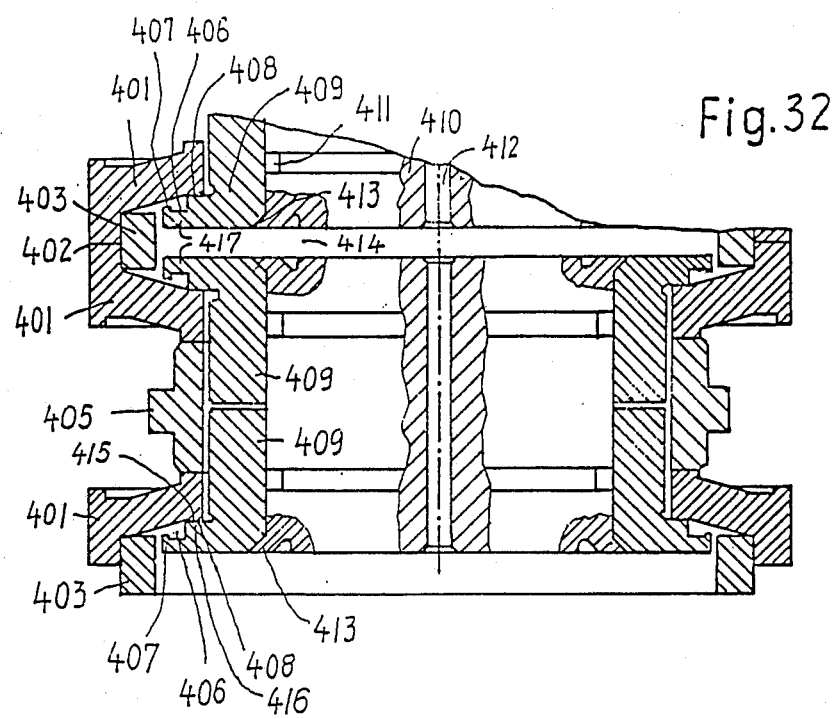
Figure 77:
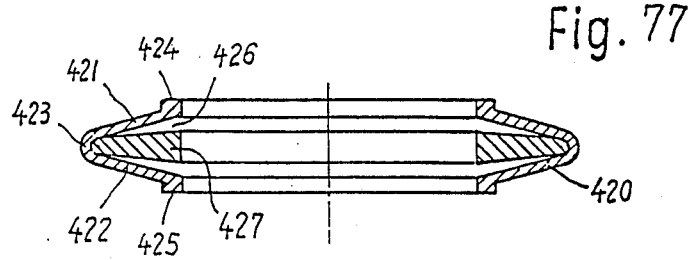

FIG. 32 illustrates another assembly of elements of the invention. The already described ring nose elements are laid together by their ring noses in face 402 and they are centered trogether by centering ring 403. Inner rings 409 have in this Figures radial extensions 417 which embrace the radial inner portions of the elements and provide therein a seal ring bed 406 with holder bord 407. They are assembled as long as the elements are not laid together by their ring noses. A distance ring 405 is assembled between outer neighboring portions of respective elements. The inner rings 409 may be clamped together by an inner body with clamping lips 413. Thereafter the ring noses of adjacent elements may be laid together in faces 402 radially of the centering ring 403 while therafter the clamping arrangements of clamping means 28,27,29,30 etc. of the already discussed Figures may be assembled. By this Figure the sealing place is removed from the inner faces 60 of the elements onto the inner inclined shank faces 4 of the elements.

FIG. 17 illustrates the already described U-element in the position with a vertical axis to clearly show the spaces 426 between the inner dead space fillers 427 and the shanks 321,422 of the U-element which is already discussed at another Figure.

Figure 103:
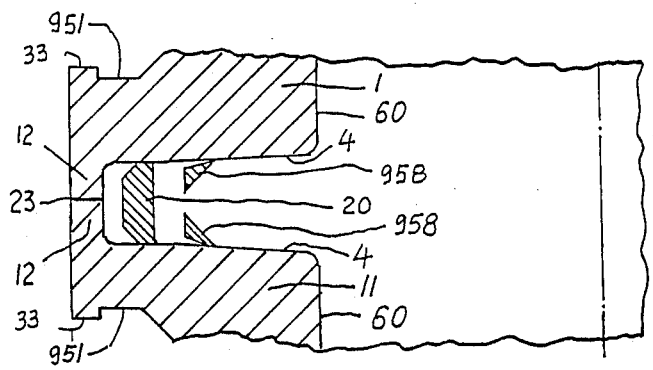

FIG. 103 is provided to show the portions, such as flange 250, shanks 266,260,266 and roots 270,263 of an S-element more clearly in a separate illustration.

FIG. 34 illustrates with FIG. 33 the inner diameter 821 of the housing 91 and shows that the outer diameters of the elements are provided with a close clearance 820 to the inner face of the housing to reduce or to prevent dead space in the outer chamber 35. Since then the fluid may cause too big resistance at flow, the flow passage 822 may be cut into the housing 91 in a longitudinal direction parallel to the axis of the outer chamber or in any other suitable direction, for example, longitudinally spiral. Note in FIG. 33 the radially short ring noses between "d2" and "d3" with inwardly therefrom directly extending inclined taper faces 794,795 which save the application of an inner seal so that only the radially outer seal seats 503 are provided. Since the pressure in the outer chamber is higher than the pressure in the inner chamber, the inner seals can by this configuration sometimes be spared.

Figure 39:
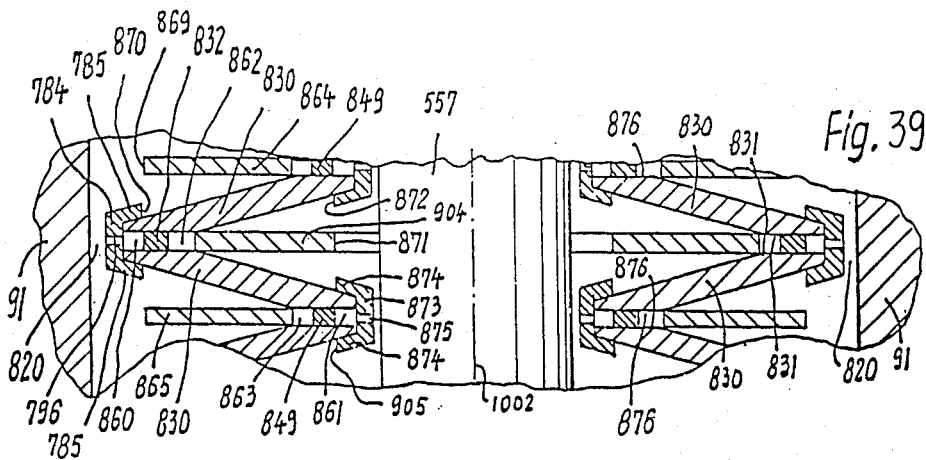

FIG. 39 shows an assembly of element 830 with distance rings 832,849 between the flattended end faces of the elements. The seal ring seats 860,862,863,861 are formed radially of the distance rings. The elements are clamped together by respective inner and outer clamping rings 873,784 with fluid pressure supply passages 796, 875 and with clamping borders 785,874. Note here, that the clearance 820 must be provided between the outermost radial ends of the assembly and the housing 91, while the inner and outer ends of the clamping rings, shown by 870,905, define the radial dimensions of the dead space fillers 864,904 in such a style that their faces 869,871 substantially meet the faces 870,905, respectively, with not too much dead space providing clearances between them.

Figure 40:
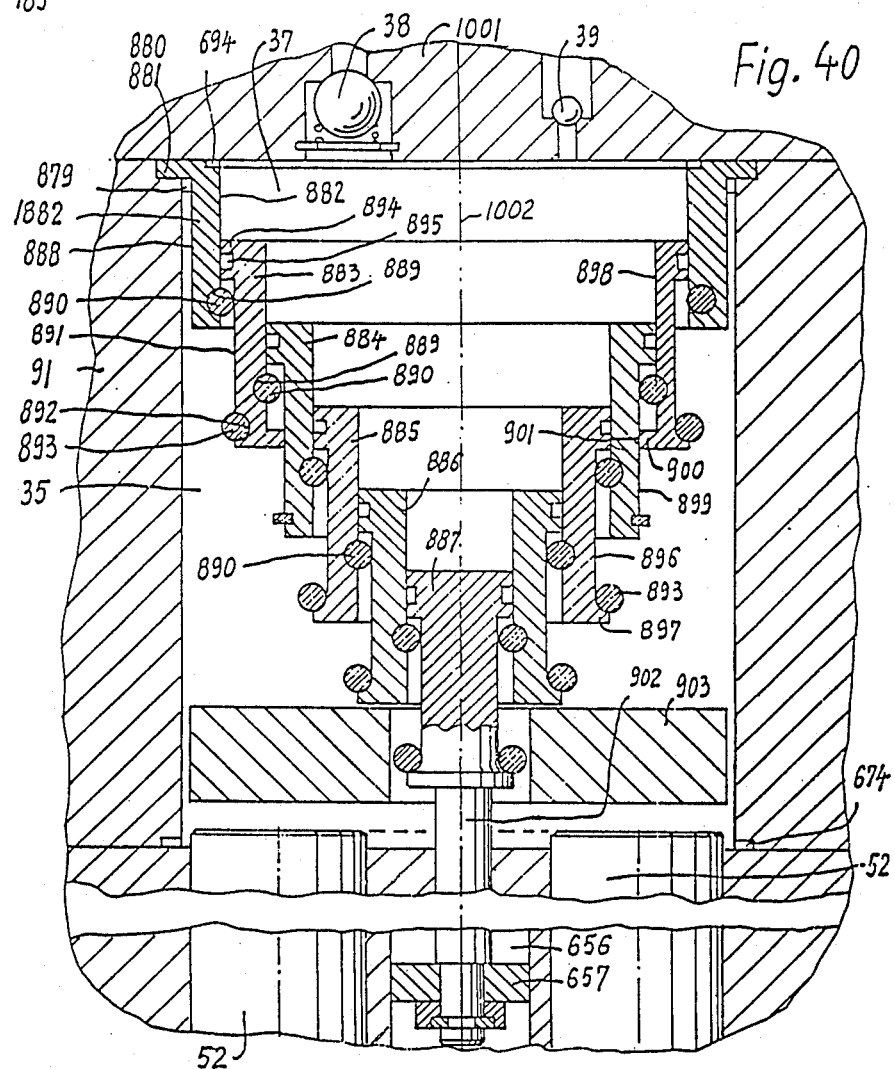

FIG. 40 brings a longitudinal sectional view through another pump of the invention, not belonging to the before mentioned systems. The housing 91 and the head 1001 are provided as in the other pumps and so is the thrust piston or the fluid supply piston (pistons) 52. The elements herein, are, however axially extending cylindrical pipes as elements, which move relatively to each other. The topmost element 1882 is provided with a flange 880 and a seal seat 694 while the flange is fastened between housing 91 and head 1001. Each element has a cylindrical outer face 888 and a cylindrical inner face 882. The cylindrical inner faces have a recess for the insertion of a stopper ring 890. The stopper recess faces may be of configurations with a radius arund a circular line. The top ends of the outer faces form radially outwardly extending portions for guidance on the inner face of the element wherein the respective element seals by a sealring in a seat in the radial extension 894. The mentioned extensions stop the movement of the inner element in the outer element by the running of the radial extension against the stopper ring 893, in the respective recess in the inner element. Thus, the elements are sealed against each other, the elements are able to move axially to each other and they are prevented by the stopper arrangements from escape from each other. Thereby element 887 slides axially in element 886, element 886 slides axially in element 885, elment 885 slides axially in elment 884, element 884 slides axially in element 883 and element 883 slides axially on the inner face 882 of element 1882. A guide ring 903 may prevent departure of the elements from their common axis 1002. A traction cylinder 656 with a traction piston 657 connected to the bottommost element 887 by piston rod 902 is also shown. The pistons 52 pump into the outer chamber. It is seen that this arrangement provides large volume inner chamber(s) 37 for big delivery of fluid out of the pump. Therefore it is mostly used for medial pressure fluid supply.

Figure 46:
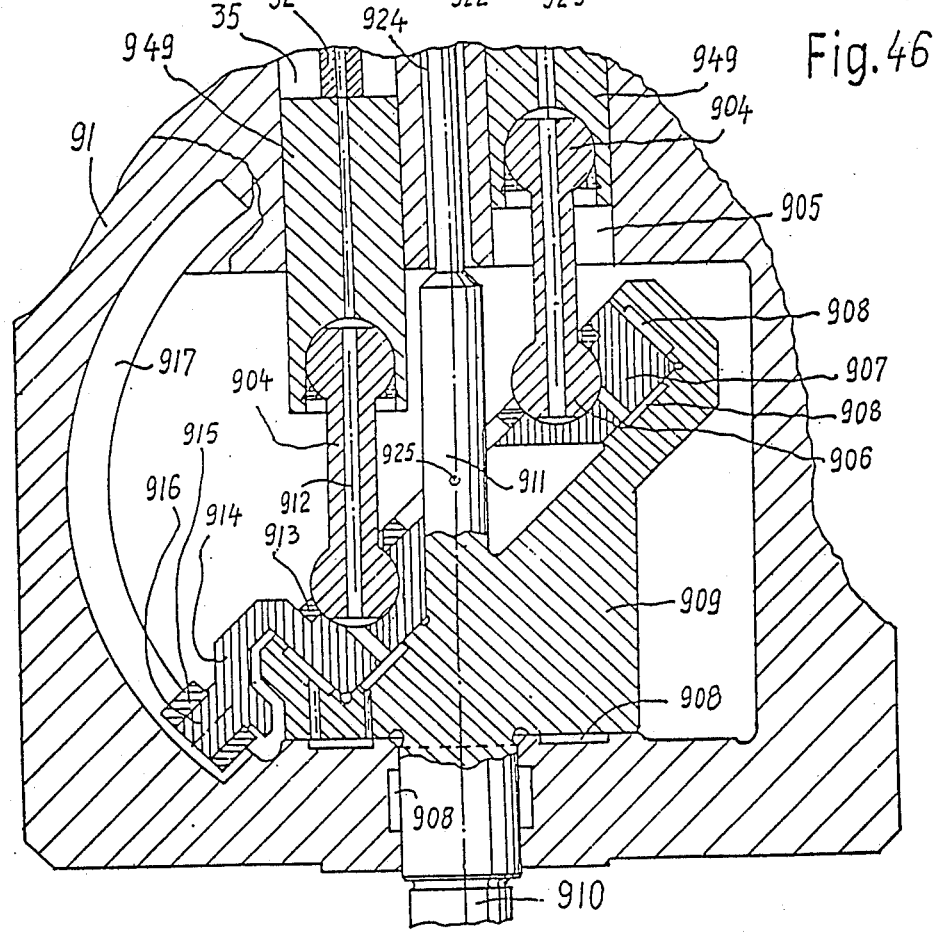

FIG. 46 illustrates an example of a long stroke axial piston device in a longitudinal sectional view. The shaft 910 is revolvingly borne in bearings 908,908 of housing 91 and has a piston stroke guide body 909 wherein a connecting rod holder 907 is relative to the member 909 revolvably borne in bearings 908, which may be hydrostatic bearings as shown in the Figure. Thus, the shaft 910 and stroke guide 909 revolves, while the member 907 does not revolve but swings when the shaft revolves. The connecting rods 904 connect the fluid supply pistons 949, which may also be drive pistons to drive the fluid supply pistons 52 for the operation of the fluid for the respective outer chamber. Passages 912 through the conrods serve for the passage of the fluid into the respective hydrostatic bearings of the device. The piston rod head holder 907 is provided with an arm 914 which bears a slide shoe or roller shoe 915 to slide or roll in a recess 917 of housing 91 to prevent rotation of the conrod heads holder 907. Thereby the member 907 swings around center 925 and provides the long piston strokes, especially if the stroke guide body 909 provides a fourtyfive degrees inclination as shown in the Figure. Ring 913 holds the conrod heads in the member 907, while the conrod heads on the other ends of the conrods are kept by holding means in the pistons 949. The long stroke device is especially suitable for EPEW pumps and for devices of FIG. 45, since in the outer chambers 35 of the EPEW pumps an amount of fluid, at least equal to the delivery quantity of the inner chamber 47, is at each stroke under compression and expansion. The compression energy of the fluid in the outer chamber is lost if it is not used to drive the other half of the piston stroke drive as a fluid motor until the inner energy of the compressed quantity of fluid in the outer chamber is used. The long stroke drive of Figure 46 secures that more than 80 percent of the inner energies of compressed fluid in the outer chambers is utilized to help to revolve the shaft of the pump by acting as a fluid motor against the respective pistons at the beginning portion of the expansion strokes. Short piston stroke devices can not obtain the more than 80 percent effective recovery of the inner compression energies of the fluid of the outer chambers.

Figure 54:
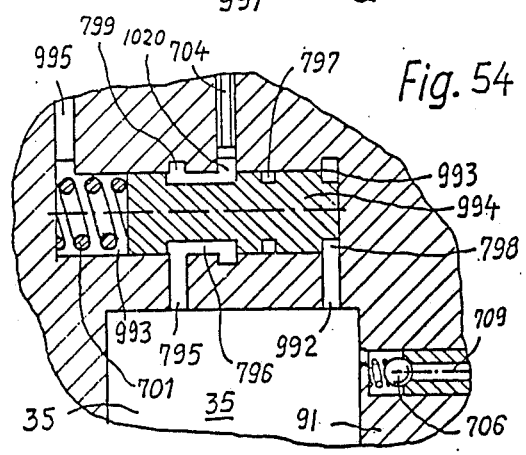

FIG. 54 illustrates a modified assembly for the control of the fluid of the outer chamber 35. The control flow inlet valve 706,709 acts as described by an earlier Figure and so does in principle the valve 994. However, here it is horizontally directed and reciprocable in control cylinder 993 . The spring 701 presses against it in rightward direction. Passage 995 extends to low pressure, passage 1020, leads the air away and may be provided with a flow-through reducing orifice or passage 704. Passage 992 extends to the other end cylinder portion 798 and passage 794 extends through the radially outwardly extending recess 799 of the cylinder 993. In the position as shown in the Figure the air escapes from the respective outer chamber 35 through passage 795,ring groove 794 and passage 704. If the pressure builts up in the outer chamber 35, the force of fluid in the cylinder portion 798 overcomes the force of the spring and moves the control piston 994 into its leftmost position. The passage 704 is then closed and no fuid can escape from the outer chamber. Circular recesses 799,1020,797 serve for frictionless travel and prevention of lateral forces of and onto the control piston 994.

FIG. 66 illustrates a complete assembly of fiber reinforced plastis S-elements in a pump with drive piston 1081 in housing 91 and inlet and oulet passages of the inner chamber on head body 1001. Shown herein are inner and outer dead space fillers 1073 and 1072 between the respective portions 1074 to 1080 of the S-element. Shown in this Figure is also that the other end of the S-element, namely 1080, is sealed and clamped between the piston 1081 and its surrounding piston pipe 1082.

FIG. 76 illustrates how support rings can be produced. Support ring 616,690 is mounted around the outer ends of elements 1,609,11,611. The corners of the support rings (axial outer ends thereof) can then easily be tapered by letting a grinding wheel 1117 run along them in an inclined position.

Figure 83:
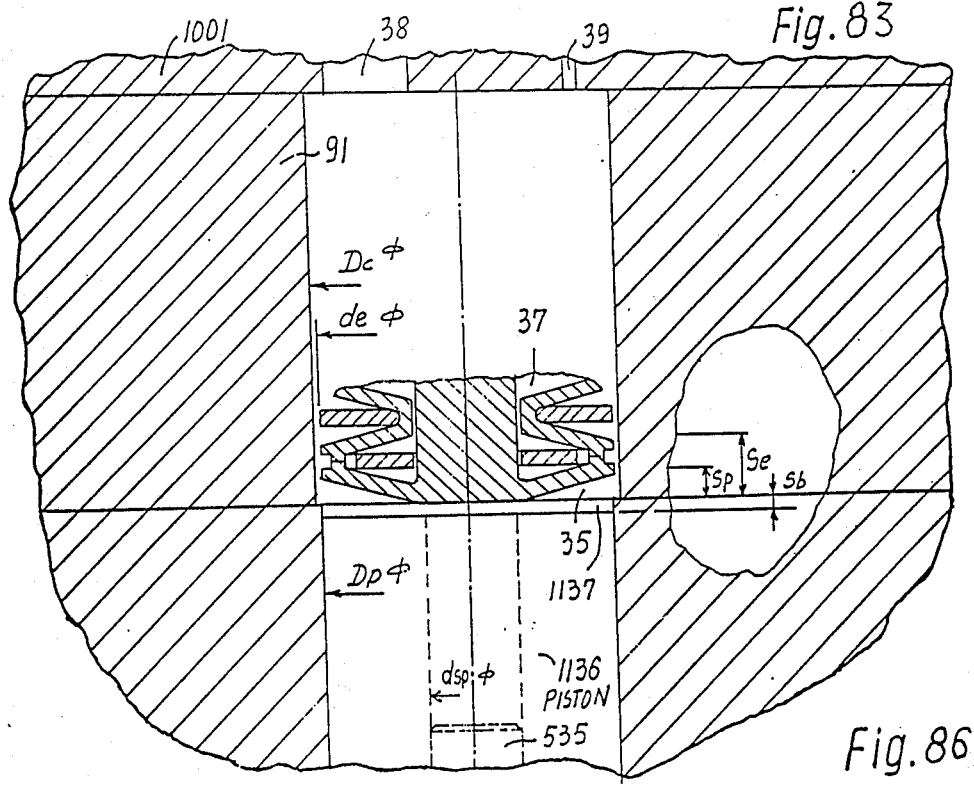
FIGS. 83 to 89 are longitudinal sectional views through devices of the invention.

FIG. 83 illustrates the disadvantage of the EPEW pumps that fluid is at all times in the outer chamber which is subjected to expansion and compression. At the compression stroke fluid moves away from the outer space between the shanks of the element downward to the bottom portion of the outer chamber 35. The consequence thereof is, that if a piston of diameter "Dp" of equal diameter to the outer chamber moves upwards by the length "Sb" the bottom of the set of elements does not move equally upward by a stroke "Sp" equal to the stroke "Sb" of the mentioned piston but by a longer stroke "Se". This sample is brought to explain the matter. Actually a "Dp" diameter piston requires too heavy stroke guides, which is the reson therefore, that not big diameter supply pistons 1136 are used, but smaller diameter pistons 535 of diameter "dsp:".

Figure 84:
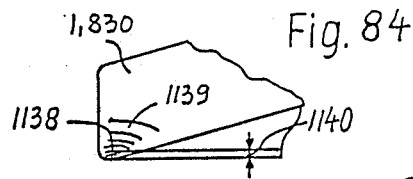

FIG. 84 illustrates that the ring noses of elements may deform by inwardly extending stresses 1139 whereby the noses 1138 may shorten by the distance 1140, which has the feature of reducing the sizes or prevent the appearances of the described gaps.

FIG. 85 illustrates a preferred solution for a fluid separation device. It is a hollow body 1141 which fits with its outer face in the cylinder to separate the water above it from the oil below it. It has a seal ring groove 1142 for the insertion of an elastically deformable seal ring. The hollow interior space 1144 is axially closed by axially outwardly bowed end portions 1141 and 1143. If now high pressure fluid acts on the axial ends of these portions 1141,1143, these portions bend axially inwardly whereby they press the radial outer portions outwardly for closer seal of the cylindrical outer face portions 1145 on the inner face of the cylinder. If the pressure reduces, the body returns to its original smaller diameter of faces 1145 for easier running with less friction on the inner face of the wall of the cylinder wherein the device of this Figure is applied.

Figure 86:
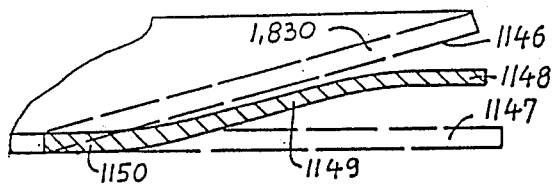
Figure 87:
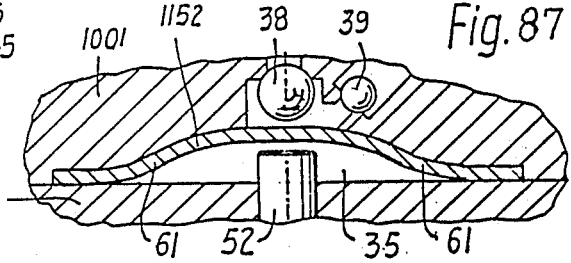

FIGS. 86 and 87 illustrate that membranes or elements should preferably be run against curved faces to reduce the danger of breaking of the elements or membranes at sharp corners of angularly inclined faces 1146. See the preferred configuration 1150-1148 and the respective forming of head 1001. More details for membrane applications may be provided in a future patent application.

Figure 88:
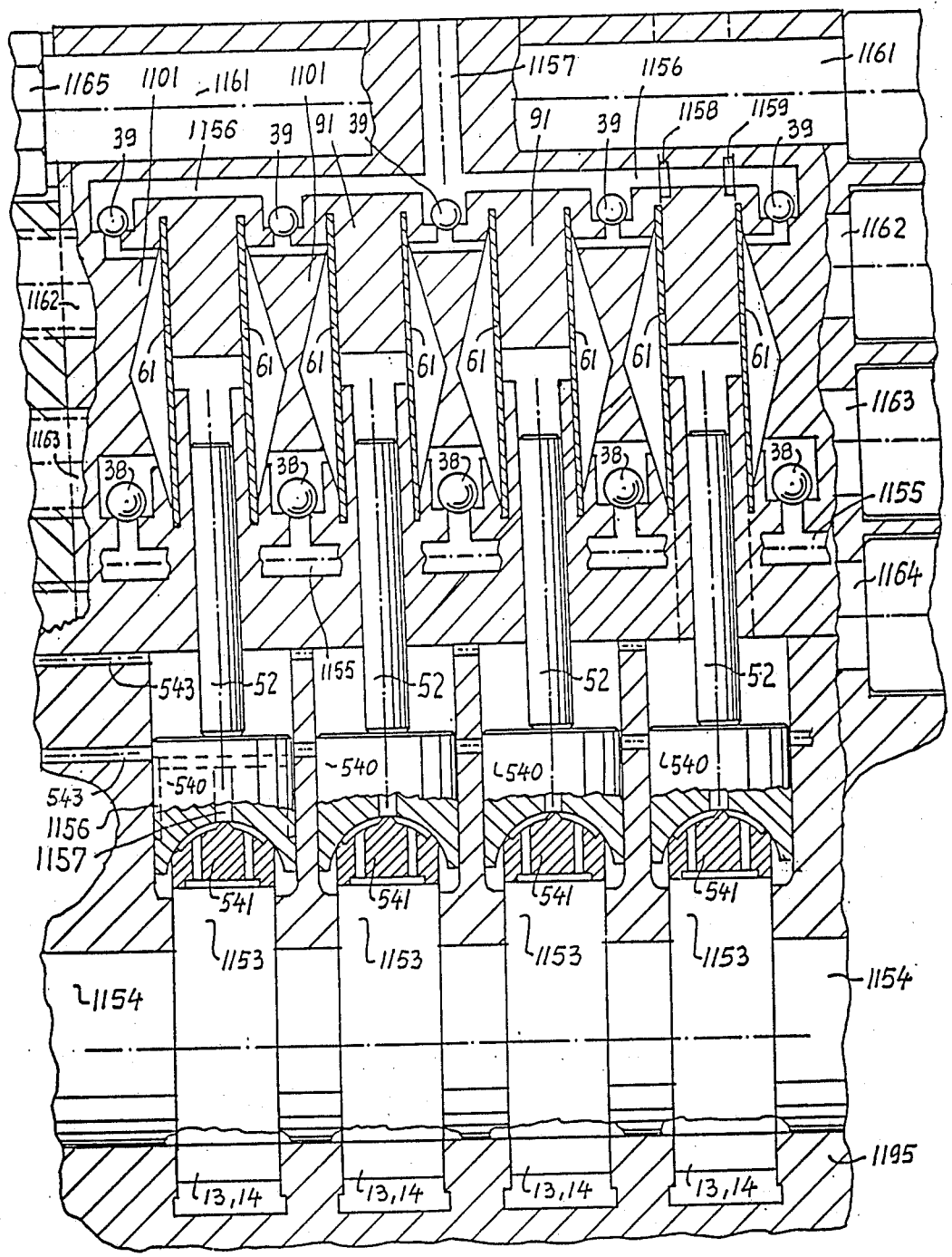

FIG. 88 is a longitudinal sectional view through a portion of an important big volume delivery membrane pump of the invention. Shaft 1154 revolves excentric cams 1153 in spaces 13,14 of the housing 1195 to drive with their outer faces the pistons shoes for the piston strokes. Shoes 541 may have hydrostatic bearings as known from earlier Figures and they are pivotably provided in beds of drive pistons 540 as also is known from earlier Figures. The drive pistons drive the fluid supply stroke pistons 52 as also is known from earlier Figures. Membranes 61 separate the outer chambers from the inner chambers. The invention provides here the speciality of the provision of a plurality of many membranes 61 to increase the delivery quantity of membrane pumps. Note that membranes have only short strokes and supply only small quantities of fluid in a given diameter of the membrane. Now, each oppositely located two membranes are provided axially with an inner chamber with inlet valve 38 and outlet valve 39. That doubles the delivery quantity of a membrane bordered inner chamber 37 beause it has now two membranes instead of a single one. Additionally each one supply piston 52 serves two outer chambers 35 on the other ends of the membranes. One piston 52 is therefore placed between two neigboring inner chambers with two membranes 61. The inlet valves 38 are placed below and the outlet valves are placed above the inner chambers for the automatic exhaust of undesired air. A common inlet passage 1155 supplies the fluid to the inlet valves 38 and a common outlet passage 1156,1157 collects the pumped high pressure fluid from the outlet valves 39. The entire assembly, which may consist of plates, is kept together by the strong bolts 1161 to 1164 with nuts or a nut plate 1165. Passages 543 and 1157 or pockets 1156 may be applied for purposes as in others of the Figures. Thus, this pump is capable of supplying extremely high quantities of fluid of extremely high pressures of several thousand atmospheres.

Figure 89:
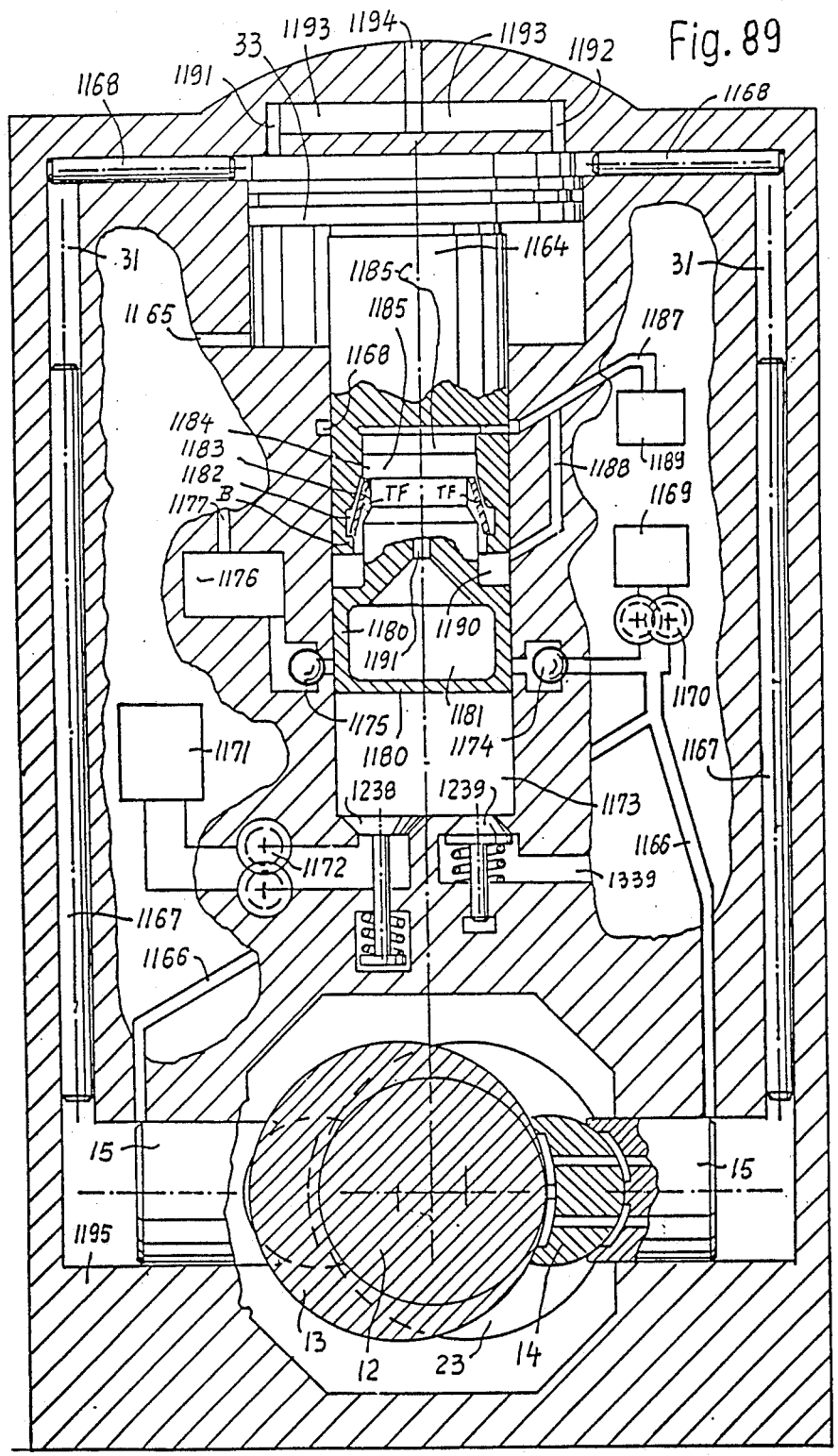

FIG. 89 improves the basic "OIL-WATER" pump of FIG. 105 to better efficiency and reliability. It is a longitudinal sectional view through the pump, somewhat simplified, to show all its members. Housing 1195 bears revolvably therein the shaft 12 with cams 13,23 with eccentric outer faces whereon the piston shoes run with their slide faces. The cams are angularly spaced to provide a radial balance of forces to eliminate strong bearings for the shaft. The piston shoes 13 are pivotably borne in pistons 15 which are driven to the piston strokes over the shoes by the cams 13,23. Passages 31 lead to the pumping piston 33 with smaller diameter piston shaft 1164. Here the invention applies dead space fillers 1167,1168 in the passages 31 to eliminate or to reduce losses by compression of fluid in the passages. Passages 1191,192 and 1193, 1194 serve for the departure of unwanted air and may also serve as fluid supply passages to the rear end of piston 33. The different diameter portions of piston 33-1164 serve to obtain high pressure in chamber 1190 by medial pressure in the fluid lines 31. Pre-pressure pump 1170 supplies from oil tank 1169 the required quantity of working lubricating fluid into fluid line 31 and over one way check valves 1174,1175 into the pumping chamber 1190 at the respective times and location of the pumping piston 1164 and fluid separator 1180. Pump 1172 supplies the water from tank 1171 over the inlet valve 1238 while the water is pumped out over outlet valve 1239 into the outlet passage 1339. The pumping piston portion 1164 has a bore 1185 C open towards its bottom end. The flow separator 1180 has a hollow inner space as knwon from FIG. 85. It further has an extension 1184 with a holding border 1185 C for the one-way holding of springs "TF". The extension and the piston shaft have recesses 1182 and 1183 for locating and holding the springs(s) in opposite one-way directions. Thereby the fluid separator can move up and down in the lower end of the piston 1164. Inclined faces are provided radially of the springs to make the insertion between holders 1185C and B possible but prevent the escape of the fluid separator from the piston 1164. Tank 1176 collects unwanted air or excess quantities of fluid and passes them on through passage 1177. The arrangement secures that only a small quantity of oil remains above the water to obtain an effective pump without big losses by compression of oil in the pump. Shown again are dead space preventing inlet and outlet valves 1238 and 1239 in their complete configurations for prevention or reduction of dead spaces. As far as further referentials appear in the Figure their purpose is known from others of the described Figures.

FIG. 103 is an enlargement of a portion of FIG. 47. It shows the three support rings radially removed inward from the ring noses in order to let the support rings 20 and 958 individually be seen with their inclined faces. This Figure is supplied because this assembly, which was described at hand of FIG. 47, has proven to be very reliable in the actual testings of the pumps. Note that, if W-Y elements are assembled in ETEW pumps, only one such sealing set is required between two neighboring W-Y-elements, why no seals are required on the innermost inner faces of the elements. This arrangement is thereby reliable and inexpensive and can be easily produced.

Figure 104:
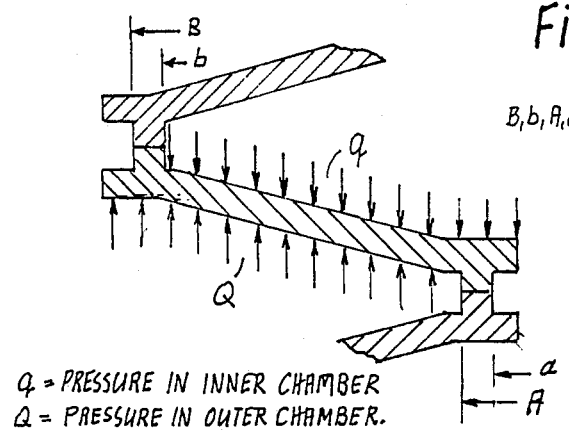

FIG. 104 explains, why the N-elements with ring noses and seals radially of the ring noses press themselves at all times against the respective ring nose of a neighboring element. The seals are not shown in the Figure because they have already been extensively described at the discussion of earlier Figures. But for the equations of FIG. 104 it is important that the ring noses are sealed by B,b,A and a. Then the equations of FIG. 104 apply. They explain that at all times the pressure "Q" in the outer chamber presses outer ring noses together and the pressure "q" in the inner chamber presses at all times the radial inner ring noses together if the pressures "Q" and "q" are equal or if "Q" exceeds "q" only by the forces of the internal stresses of the elements. The equations were developed by the inventor and they are given to make an exact calculation of the moments by fluid pressure in the inner and outer chambers around the deciding circular ring lines "B" and "a" possible.

Attention is now given to the pump in FIG. 108, which is a pump for lubricating and, corrosive fluid. Since corrosive fluid disturbs the clearances between corrosion-suffering materials like steel, iron and the like, the third pump is in my invention a pump with no sealing parts under movement relatively in a close clearance to a neighboring face.

Therefore, the third pump is provided with at least one tapered pump element 307. In the Figure there are two tapered elements 307, which are opposing each other with the hollow cones. At least one tapered element has an inner end face axially on its radially inner portion and an outer end face on its axially inner end on it's radial outer portion. The radial outer portion of the tapered element is clamped onto an adjacent part of the pump. For example, to the outer end of the second piston 305, to the housing interior face portion of housing 340 or end cover 342—(343 is the front cover of housing 340 )—or to the opposed second tapered element 307. In FIG. 108 there are two tapered elements 307, open towards each other with their hollow cones, to form therebetween the third pump chamber 311. A medial outer ring 320 is inserted between the radial outer portions of the elements 307. The clamping arrangement consists of clamp portions 318, which may be angularily cut into separated clamps, which embrace the radial outer ends of the tapered elements 307 and the medial outer ring 320. Respective fingers of the clamps may engage into grooves or recesses in the radial outer end portions of the tapered elements 307 to prevent escape of the clamping means 318 from the tapered elements 307. Holders, for example, bolts with nuts, are keeping the clamps 318 fastened strongly together. A seal ring, for example, an O-ring 317 is inserted between the tapered elements and the outer ring, 320, to seal the interior third pumping chamber 311 radially against the medial outer ring 320. Seal sheets 309 are set innermost around or along the tapered elements 307 to prevent the corrosive third fluid from meeting the walls of the tapered elements 307. The O-ring 317 also seals along these seal sheets or protection sheets 309. A medial inner ring 308 is inserted between the two tapered elements 307, holds the O-ring 317 in its place, is provided with a passage 350 to communicate the both chamber portions of chamber 311 on both ends of the medial inner ring 308 with eachother and also serves as a dead space filler to reduce internal compression losses in the third fluid at very high pumping pressure. The entrance and exit valves 310 and 313 communicate to the third pumping chamber 311 and serve as inlet and outlet means for the third fluid. The operation of the device of FIG. 108 is now as follows :

The first piston is driven by the drive means, for example 345 and the guide face 347. The first piston drives with the first fluid through the intermediate or internal passage 303 the second piston 305 in the second cylinder 304. The head of the second piston 305 bears the inner end of the left tapered element 307 and compresses it. Since the third pumping space 311 is completely sealed, has no moving relative close faces, and since all parts bordering the third space are protected from meeting the third, corrosive fluid, the second piston 305, compresses the tapered pumping elements 307, presses the third fluid out of the third pumping chamber 311 through the outlet valve 313, while it at the same time closes the inlet valve 310.

When thereafter the first piston 302 reverses the direction of its stroke, the tapered elements 307 act under their compression stress as springs and drive the second piston 305 inwards in the second cylinder 304. The first fluid from cylinder 304 passes through passage 303 into the first cylinder 301 and the inlet means 310 opens and draws the new third fluid into the now expanding third pumping chamber 311.

So far the device is easily to be understood and its operation looks rather simple. In practice however, for the very high pressures in the third fluid, which my device is able to manage, quite a substantial "know-how" is required. Some of such "know-how" is explained at the description of the following figures.

My device is commonly driven by my hydraulic motors, which means, that my hydraulic motor drives the driving shaft 345. The motor is then a complete unit together with the device of FIG. 21. In other applications the drive means is driven by combustion engines or electric motors. Until now my device has been operated with water as the third fluid and with pressures of one thousand atmospheres, corresonding to roughly fifteenthousand pounds per square inch. It is however my intention to increase the pressure of the third pump chamber 311 considerably higher for example, close to fifty thousand pounds per square inch. The efficiency at 1000 atmospheres was quite good.

A first "know-how" for example, is, that common disc springs, which are also known as "Belleville springs" are not suitable for use as tapered elements in my pump. They break already after 40,000 strokes. But in my device the lifetime of the tapered pumping elements shall be about several ten million strokes, amounting to thousandths of hours of life time under highest pressure in the corrosion-active third fluid.

I obtain to claim by using tapered elements with relatively big inner diameter but with rather small radial extension relatively to the mentioned inner diameter. That reduces the stresses in the tapered pumping elements 307. Further important, for good efficiency of the device unavoidable is the setting of the clamping means 307 and the subjection of the tapered elements to short strokes of deflection of the tapered elements 307. It is therefore important under the "know-how" to use big differences of diameters of the first and second pistons 302 und 305 of the device. Further "know - how" will be explained the description of the following Figures.

FIG. 109 shows an enlargement of portion 348 of the device of FIG. 108. The tapered element 307 changes its angle relatively to the cover's inner face from angle alpha to beta during the compression. That would lift the edge of the inner end of the tapered element away from the cover face of cover 342. The seal ring 356 would then enter into the opening gap and disturb itself. The seal would be disturbed and the pump would not work any more. It is therefore suitable to form the inner seat face of the cover 342 with a small dell of suitable configuration and angle, wherealong the inner edge of the tapered element 307 can slide at compression and expansion without departing too much from the support face. Thereby the entering of seal ring 356 into a gap is prevented, because the appearance of the gap is either prevented or reduced in such an extent, that the respective portion of the seal ring 356 can not any more enter into a gap and thereby can not disturb iteslef.

For plural third pumping chambers 311, a common inlet space 312 may be provided to the inlet valves 310 and a common pressure fluid collection chamber 314 may be provided to the exit valves or delivery valves 313.

Another important "know-how" is, that in my tapered elements 307 the internal stresses due to compression of the tapered ring elements, as generally known from Almen and Laszlo for Belleville springs, are minor compared to the more sudden appearing stresses under fluid pressure from the bottom of the respective elements 307. The stresses are called in FIG. 110 "sigma Bi" for the stress found from the inner moment and "sigma Bo" for those found from the outer moment of the radial outer portion of the element.

In FIG. 110 the tapered element portion of element 317 is kept between the holders "H" and the fluid pressure "q" is acting from the bottom in axial direction against the element. The element then bows upwards out under such fluid pressure, as the Figure demonstrates. Thereby the inner stresses "sigma" occur in the element. FIG. 110 also demonstrates, how I derived the calculation formulas. The outer moments which occur under the fluid pressure along the radial distances "delta R" are cited by : "Md". But the inner moments inside of the elements 307 are cited by : "M", whereby "M" is the distance "delta R" divided by the half of the thickness "S" of the element. The Figure shows portions "dR" on radius "R" to find the differential and integral calculus. "I" is the moment of inertia of the element -portion between the radial angle "phi". "B" would be the width, if the portion of the element would not be a portion of a ring in boundaries of the angle "phi". The width would then be a constant. Note please, that the integration is not starting from the axis of the element, but the uncommon integration, which I do, starts from the inner diameter of the element, while the moment of inertia and the width of the element between the bonderies of angle "phi" go into the integration from the centre axis of the element.

The radius, at which the moments from the inner delta radius portion and the outer radius portion "delta Ri" and "delta Ro" are giving equal moments "Md" is called by me : "Rcm". The radius, where the said outer moments give equal moments around the holders "H" is called by me : "Rcmh".

The radius, which give equal inner stresses because of inner moments "M" inside of the element, is called by me : "RCM" ; while the radius which would give equal inner moments and stresses around the holders "H" is called by me : "RMCH ". These radii are found by graph, whereupon a final respective value is then repeated by the exact calculation with the respective nearly final value, until the exact values are found.

It is important here, to understand, that these values are different from the arithmetic means of "R" and "r", when "R" is the outer and "r" is the inner radius of the tapered element 307. The medial radius of the gravity centre "Rgc" of my control body patents is also different from the above values, because it considers the ares of the section, but not the moments of it.

The different location of the mentioned radii (medial radii) for the respective purposes are for demonstration of their location substantially shown in FIG. 111 . Actually they are closer together, than in FIG. 111 . But they can not be drawn closer in the Figure, because the lines of the ink would be too big compared to the small radial distances. Of interest is also, that the recess(es) or groove(es) for the clamp 318 does (do) not disturb the life time of my tapered pump element 307, because the groove is placed there, where the inner stress in the element is small.

FIG. 111 shows in a schematic demonstration the principial locations of the novel radii Rmc, RMC, Rmch and RMCH in comparison to the arithmetic medial value Rm and to the radius Rgc of my older patents, which corresponds to the radius of the centroid of an element of the pumping element 307. The respective equations, which I have derived, are written also in FIG. 111.

FIG. 112 demonstrates schematically the different stresses inside of the pumping element 307 over the rotary angle alpha, wen drive means an eccentric outer face of a cam is used to drive the respective piston and when a radial difference appearing from pivotion of a piston shoe is neglected as neglectible small. Curve 361 shows the highest internal stress in the pumping element 307 which is due to mechanic compression of the element by the second piston. It is seen here, that this curve is rather smooth and has no stiff rises of the stresses. Curve-line 362-363 however shows the stresses, maximum thereof,which are due to the fluid pressure in the third pumping chamber 311. It is visible from the left curve 362, that this stress is appearing much more suddenly, than the stress which is due to the mechanical compression of the element 307 by the second piston 305. Once the maximum of stress 362 is reached, the stress remains constant along line 363, because the delivery pressure of pumping chamber 311 is now constant. The sudden increase in stress along curve 362 shows, that this stress damages the life time of the pumping element 307 more, than the more slowly appearing stress of curve 361.

The actual delivery quantity of the first pump, the second motor and the third pump is parallel to curve 361 of igure over the rotary angle alpha of the piston stroke drive and guide means.

FIG. 107 shows a portion of the element 307 of FIG. 108 in sectional view in a separated demonstration to indicate, that the groove 358 for the reception of the respective portions of the clamping arrangement 318 can be cut until one third of the thickness of the element 307, because this place is a place of small internal stress in the element 307. The inner corner 357 should be rounded in order to soften the internal stresses here. Good care must be taken for the inner axial outer end 359. This should never be a line as in common Belleville springs, because a line would bring too big stresses. It should be flattened substantially to a plane face, but better to a specific configuration in line with the dell 355 of FIG. 109.

Figure 113:
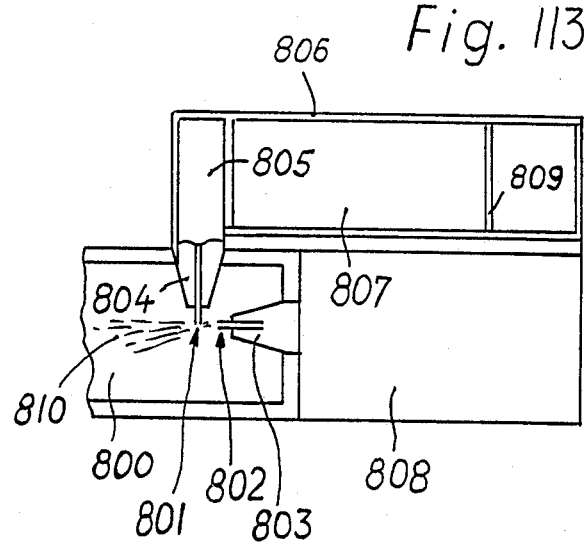
FIGS. 113 to 120 are sectional views through devices of the invention.

FIG. 113 demonstrates in a schematically a novel fuel injection system for a combustion engine or my invention. It is best applied to my pressed and cleaned coal combustion engine of my co - pending patent application Ser. No. 922,481 or to others of my co-pending patent applications. Instead of pressing the cleaned coal to blocks, in this embodiment of the invention, I compress them to wires or flat long bands of small thickness and inject and pulverize the fuel of coal by leading a high pressure liquid jet against the inward moving fuel wire or tape. This immediately pulverises the coal to a coal-liquid stream, at which the liquid also may be water. The water immedately steams in the hot common cumbustion chamber and the fuel immediately burns therein to provide the hot-air - gas for the expansion stroke of the piston of the engine.

Thus, FIG. 113 demonstrates a fuel container 806 indluding a pretransporter 809 for transporting the pressed coal tape, wire, band,807 towards the second transporter 805 which transports the coal fuel wire, tape, band,in a continuous flow through an inlet guide 804 into a combustion - chamber 800, while a high pressure fluid, liquid, pump 808 is provided and attached to the arrangement of the fuel supply and the combustion chamber, and the said fluid pump supplies through a second inlet, nozzle, 803, a steady flow of high pressure fluid in the form of a speedy and strong pressurized jet 802 , which is directed against the inflowing coal fuel stream 801 of said inlet guide 804, whereby said jet of liquid meets said inflowing coal fuel stream to pulverize it and spray it as a fine powder, 810, partially mixed with said fluid into said combustion chamber to provide a continuous and steady flow of burnable coal-fuel - fluid - mixture 810 for burning in the compressed air in said combustion chamber of said combustion angine at least as long as said combustion chamber is pressurrized with hot air and ready to supply and lead the burning or burned pressed air - coal fuel - fluid mixture into the respective expansion chamber with the respective expansion piston of said engine.

When the said liquid is water, it might vaporize to steam and transform to overheated steam inside of said combustion chamber for participation in the expansion and driving procedure with said hot air-fuel mixture in said expansion chamber of said engine.

My high-pressure fluid flow arrangement of FIG. 108 has the high pressure capability to be used as fluid pump 808 in the arrangement of FIG. 113. It may also be used to jet coal sludge or other difficult to handle fuels into the combustion chamber 800 of FIG. 113 or to be used as fuel injection pump to conventional combustion engines.

Figure 114:
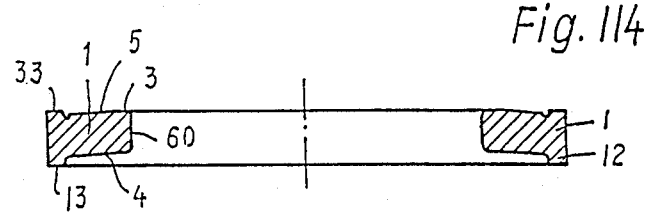
Figure 115:
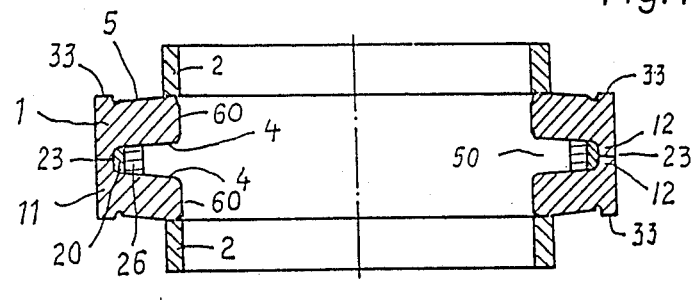

FIGS. 114 and 115 now illustrate that the invention has made use of this discovery and provided a novel element 1 which does not need and not use the medial plane ring 320 of FIG. 108 in order to eliminate by the invention of element(s) 1,11 of FIGS. 6 and 7 the friction on the former medial plane ring 320 which in the mentioned former art was called "the outer ring". According to the invention, element 1 is now provided on tis radial outer end with an axially inwardly extending portion 12, called ring nose, which has the local bearing face 13. FIG. 115 shows that a centering ring 20 is inserted radially inwardly of the axially extending portions 12 of a pair of symmetrically arranged elements 1 and 11 to center the mentioned elements around a common axis. The elements now meet each other directly at bearings 23 which are the bearing faces 13 of the elements 1 and 11. If this arrangement becomes axially compressed between a piston and the cover of the housing, the meeting and bearing face arrangements 13,23, now expands equally at equal times, whereby friction which still appeared on the radial outer bearing faces of coned elements of my earlier patents is now completely eliminated. Radially inwards of the centering ring 20, which meets the inner faces of portions 12 and keeps them aligned, an elastically deformable seal ring (O-ring, gum-ring, teflon ring) 26 is inserted to prevent escape of leadkage out from the internal pumping or motoring chamber 50 between the axial inner faces 4 of the symmetrically arranged elements 1 of the type of FIG. 114, For very high pressures the support rings of earlier described Figures are required between the ring noses 12 and the plastically deformable seal rings 26.

Figure 116:
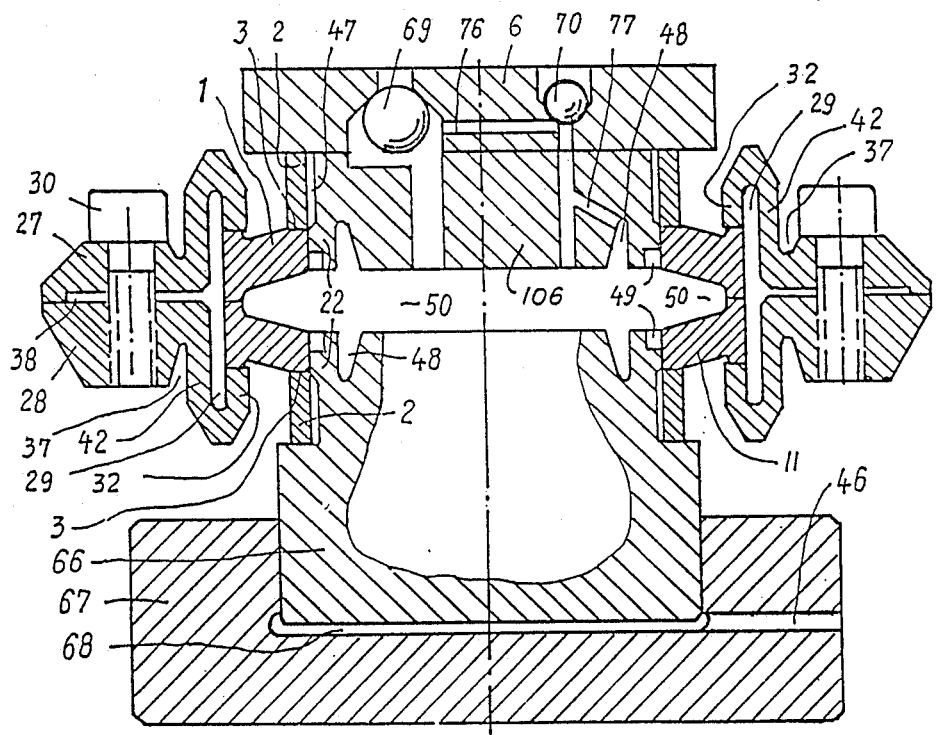

The radially flexible rings 2 of FIG. 116 may be assembled and the elements have now the important inner faces 60, which will have to be sealed. The elements 1,11 further get the clamping bearing portions 33 on the axially rear radial outer portions of the elements 1,11 to be set into the clamping portions 42 of the clamping rings 27,28 of FIG. 116.

FIG. 116 illustrates an example of a complete arrangement of the invention which commonly acts as a high pressure pump, for example, also for pumping of non-lubricating or of corroding fluid like water etc.. The pumping chamber 50 is provided between the elements 1 and 11 of FIG. 115. The clamping rings 27 and 28 are clamped strongly together by bolts 30. However, the invention discovered that the clamping rings of the former art still had large friction between the clamping segments of the rings and the elements. Therefore, in order to eliminate this additional friction of the former art, the present invention provides the ring grooves 29 in the clamping rings 27 and 28 in order to form the radially flexible holding ring portions 42 of the invention, which now face the holding faces 33 of elements 1,11 of Figure and thereby fasten, keep and hold the symmetrically arranged elements 1 and 11 together. At the radial expansion and contraction 16 of Figure 2 the ring portions 42 of the invention follow the movement 16 of the elements 1,11 and the mentioned additional friction of the former art is thereby eliminated. An oppositionally directed additional ring grove 37 may be provided to form an additional fadially flexible ring portion 32 on the clamping rings 27 and 28. The later FIG. 11 will, however, show that such an additional ring groove 37 may soften the strength of the clamping rings and may be spared or eliminated. The head cover 6 is provided with the inlet valve 69 and the outlet valve 70, as known in the art. The drive piston 66 is axially moveably provided in drive cylinder 67. Fluid under pressure is periodically led alternatingly through connection passage 46 into the bottom 68 of cylinder 67 to press the piston 66 periodically up and let it periodically move down, thereby periodically alternatingly compressing and expanding the elements 1 and 11. The supply of fluid through passage 46 and its fluid flow out in periodic cycles may be provided as in the mentined former art of the same inventor.

FIG. 116 contains in addition the following novel arrangements and provisions of the present invention :

The passage 76 leads from the bottom of the inlet valve to the outlet valve in order to let any air or gas which might collect below the inlet valve escape through the outlet valve to prevent the collection of efficiency limiting air in the device. Similarly the passage 77 leads the air out of ring groove 48. The sending out of air occurs automatically because the passages 76 and 77 are set at the highest places where the air, which is lighter than the pumped liquid, would automatically collect. The clearances 47 are provided between the rings 2 and the insert 106 below head cover 6 in order to permit the radial movement 17 of the rings 2. A very important novel arrangement of the invention is the provision of radially flexible seal bearer lips or seal lips 22 on the piston 66 and the insert 106 below the cover 6. The seal lips 22 are formed by the provision of the ring grooves 48. The fluid from pumping chamber 50 enters into grooves 48 radially inwards of the seal lips 22 and thereby presses the seal lips 22 radially outwards under the pressure of fluid from the inside and thereby presses the seal lips or its seal lip corners against the inner faces 60 of elements 1 and 11. The inner faces 60 were seen in Figure 6. The dimensioning of the radial wall thickness of the seal lips 22 and of the axial lengths of them which are defined by the depths of the grooves 48 are important parameters to make the radial movement of the seal lips and thereby the seal on the inner faces 60 of elements 1,11, effective. The chamber 50 is then effectively sealed. For pumping of corroding fluid of high pressure, the elements 1,11 and the seal lips 22 are made often by VEW stainless steel, US steel 17PH$_{C1H1}$ or by the Japanese stainless steel SUS 630. At a perfect design the seal lips 22 may seal effective on elements 1,11. In other cases and in most practical applications, flexible seal rings are inserted into seal ring grooves 49 on the seal lips to meet the seal lips and the elements to seal between them.

Figure 118:
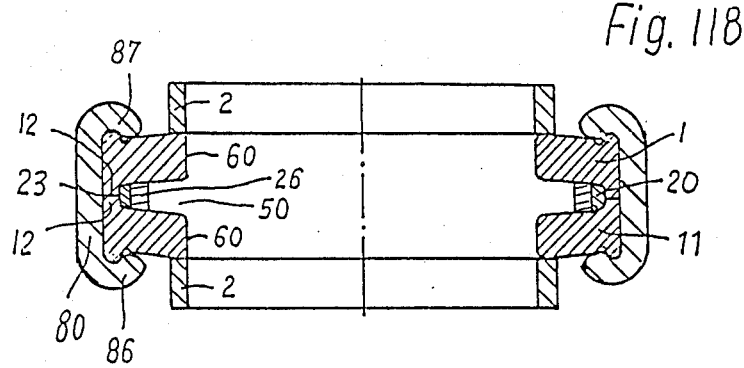

In FIG. 118 the clamping rings 27,28 of Figure 116 are replaced by a borad ring 80, which axially embraces the ring elements 1 and 11 axially from outside by boards 85, 87 and keeps them together. The arrangement of a board ring 80 is not new, but known in the art, while, however, the insertion of the centering rings 20 of FIG. 115 and the provision of the portions 12 on the elements to meet at planes 23 is a novel arrangement and provision of the present invention.

Figure 119:
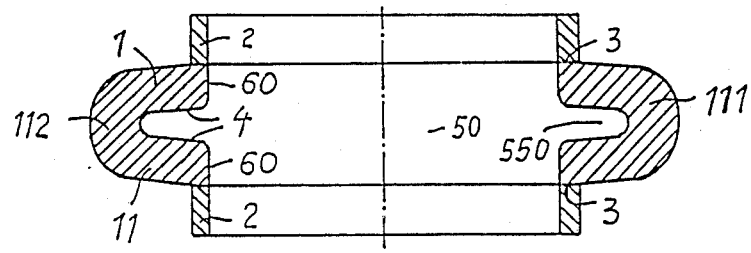

FIG. 119 shows another important provision of the present invention, namely the U-element 112. It combines two tapered ring portions, and thereby the symmetrically arranged elements 1 and 11 connected together by the outer, arched, portion 111. The element 112 is thereby a "one piece" or integral double element 1,11. It is produced from a bar or pipe by lathing the outcuts 550 from radially inside into the element 112. In case of plastic elements, the groove 550 is otherwise formed. This U-element of the invention combines simplicity with reliability. The radially flexible portions 2 may be provided on the axial ends of the elements 112 and, if two of the elements 112 are laid axially together, a seal lip bearer portion may be inserted into the inside to meet and seal neighboring inner faces 60 of two neighboring U-elements 112.

Figure 120:
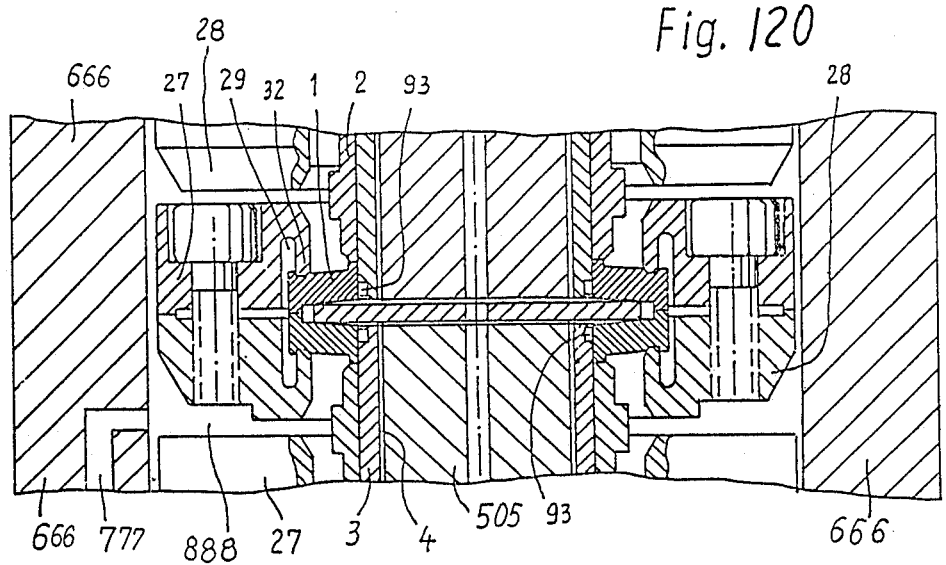

FIG. 120 shows that the clamping rings 27,28 have only grooves 29 and holding ring portions 32 in this embodiment but not the ring grooves 37 of FIG. 116. The weak portions 32 of Figure 116 are thereby eliminated. For low pressure devices the arrangement of FIG. 116 may be preferred while for high pressure devices the clamping rings of FIG. 120 are commonly used. The Figure also shows that a housing 666 should surround the entire arrangement in order to keep the head cover 6 and the cylinder 67 of FIG. 116 together.

An important novelty and provision by this embodiment of the invention is that a passage 777 may be provided in the housing 666 at any other suitable place to lead a fluid under pressure into the interior space 888 of housing 666 in order to have a pressure in the interior space 888 which surrounds the clamping rings and elements. The elements are then subjected to the pressure in space 888 from the outside and to the pressure in chambers 50 from the inside. By providing a second pressure in space 888, the pressure in pumping chambers 50 can become increased, because the elements 1,11 work under a specific difference of pressures from inside and outside before they break under the pressure. The provision of passage 7 to lead dluid under pressure from a respective source of pressure into the interior, but sealed, space 888, can thereby easily double the pressure in pump chambers 50, for example, from 1000 to 2000 atmospheres, from 2000 to 4000 atmospheres, or the like, if the second pressures in space 888 are the 1000 or the 2000 atmospheres in the mentioned samples of pressure. The Figure also shows that upper and lower sets of clamping rings and elements may be provided above and below a respective set in order to operate a plurality of sets of elements axially of each other for obtaining a larger quantity of delivery volume.

Figure 117:
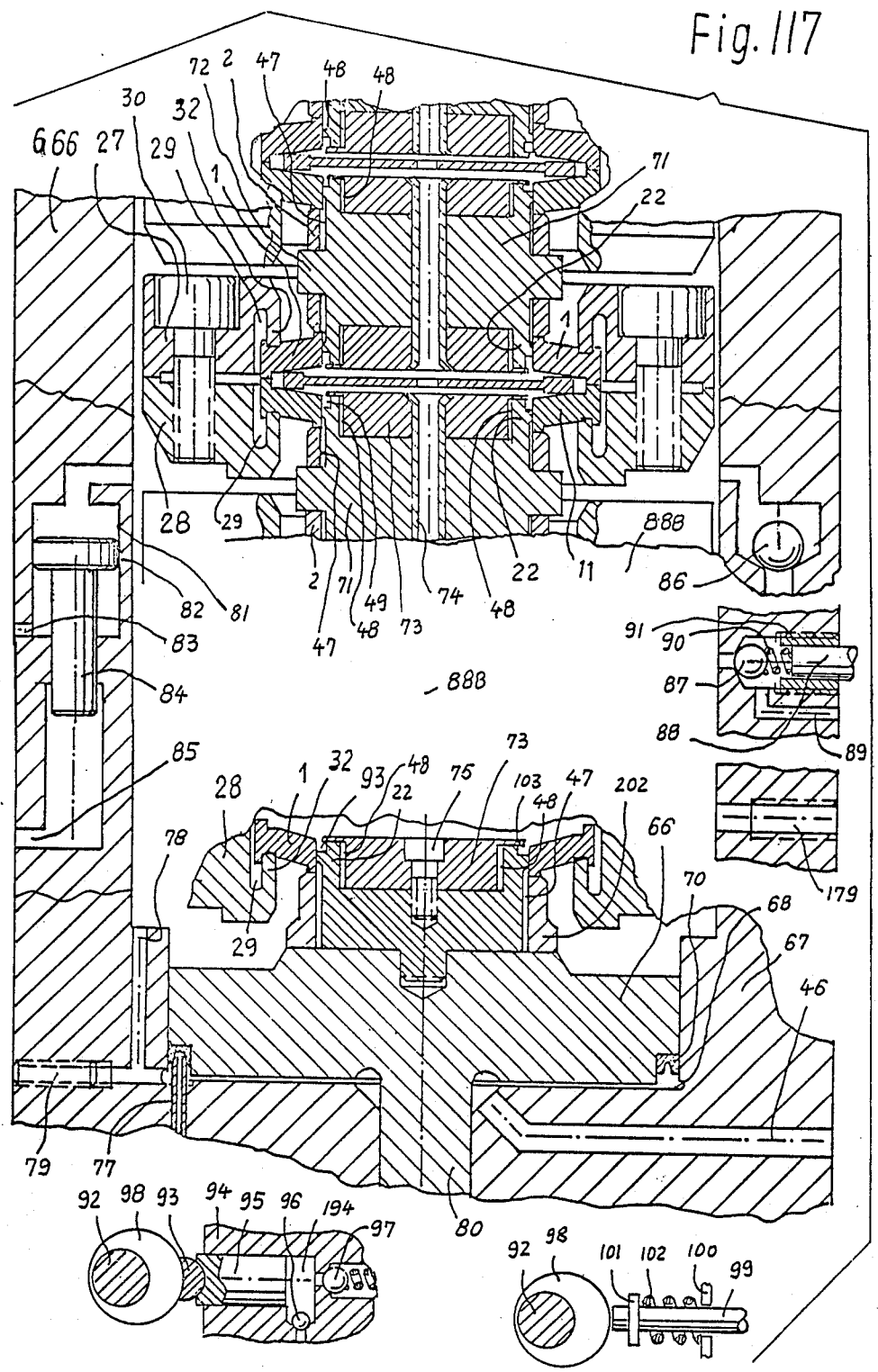

FIG. 117 illustrates again the housing 6 with pumping arrangements with clamping rings and elements therein. Since they are already known from FIGS. 116, 117 and 120, they are not repeated in the description of FIG. 117. Passage 46 leads the alternating drive fluid into and out of cylinder 68 to operate the reciprocation of drive piston 66 while seal 68 seals between the mentioned cylinder 67 and piston 66. A pipe 77 may be provided to take automatically, or manually operated, the air out of the seal groove or seal 70. Fluid under second pressure may be supplied through passage 79 into the interior space 888 in housing 666. Alternatively pressurized fluid may be supplied through passage 179. Passage 179 may also serve alternatively as a connector for control of the pressure in space 888 in housing 666. Passage 78 may be provided and meet passage 79 in order to have a port at a specific height or location in or on space 888 in housing 666. Pressure control means and timed fluid or fluid pressure supply means may be added to the space 888 in housing 666 as, for example, by the following alternative arrangements : Cylinder 81 may contain axially moveable therein piston 82 with piston shaft 84 communicating to passages 83 and/or 85 at the specific locations;

valve 86: valve 87 with spring 90, piston 88, adjuster or guider 91 and/or passage 89; or other suitable fluid pressure supply and control means. The passages 46, 79,179 or others may communicate to exterior fluid handling chambers, like, for example, cylinder 194 in housing 94. Piston 95 running with its piston shoe 93 along the eccentric outer face of cam 98 of shaft 92 may then send fluid through the medial passage 46 between cylinders 194 and 68 into and out of cylinder 68. The piston 95 is then the primary piston "giver piston" while piston 66 is then the secondary or "following piston" of the reciprocating fluid column between and in primary cylinder 194 and secondary cylinder 66. In such case no valve 97 is used. In other cases or provisions, the chamber 194 may be used as a pumping chamber and then have inlet valve 96 and outlet valve 97. The shaft with the eccentric cam 98 may also be used to drive a control piston 99 and let it return under the spring 102 between the retainers 100 and 101 on piston 99 and a stationary portion 100. The mentioned shafts 92 with cams 98 can be utilized for the handling or control of pumping arrangements of the invention and of the Figures thereof, particularly, if they are suitably dimensioned respective to the parts or portions with which they are associated for co operation. The pistons 95,99 and 66 are not in scale in FIG. 117. It may be noted, however, that the primary pistons like 95 commonly have much smaller diameters but longer strokes than the secondary pistons 66 since the following pistons commonly in high pressure devices of the invention act against many tons of force while the primary, giver pistons are limited in axial load by the bearings of the revolving shafts 92.

What is claimed is:

1. A pump including a fluid containing inner chamber (50) formed between at least two hollow coned ring elements (1,11 or 301) and at least one closing wall portion, formed by a piston (357), subjected to periodic axial movement with axial compression and expansion of said coned ring elements by said piston (357) which is reciprocably provided in a cylinder (356) and a housing (91,306) surrounding and coned elements for forming an outer chamber (350) around said elements with fluid under pressure passed into said outer chamber at times when fluid is compressed in said inner chamber when said coned rings are compressed, with an improvements whichincludes that said piston is a differential piston of a small diameter and a big diameter portion with said small diameter portion forming said closing wall portionand said big diameter portion provided axially moveably and sealingly fitting in said cylinder, wherein a passage is provided from said cylinder to said outer chamber, wherein said big diameter portion has a cross sectional area substantially twice the cross sectional area of said small diameter portion whereby at thrusting movement of said piston against said coned ring the pressure in said outer chamber is due to the relation of said sectional areas substantially one half of the pressure in said inner chamber, and;

wherein clamping rings are provided around said coned ring elements to keep pairs of oppositionally directed elements of said coned ring elements closely and sealingly together with said clamping rings filling at least a major portion of said outer chamber to prevent excessive compressible fluid in said outer chamber.

2. The pump of claim 1 wherein dead space fillers are provided in said inner and outer chambers for the prevention of excessive compressible fluid containing spaces in said inner and outer chambers.

3. A pump including a fluid containing inner chamber (50) formed between at least two hollow coned ring elements (1,11 or 301) and at least one closing wall portion, formed by a piston (357), subjected to periodic axial movement with axial compression and expansion of said coned ring elements by said piston (357) which is reciprocably provided in a cylinder (356) and a housing (91,306) surrounding said coned elements for forming an outer chamber (350) around said elements with fluid under pressure passed into said outer chamber at times when fluid is compressed in said inner chamber when said coned rings are compressed, with an improvement which includes that said piston is a differential piston of a small diameter and a big diameter portion with said small diameter portion forming said closing wall portion and said big diameter portion provided axially moveably and sealingly fitting in said cylinder, wherein a passage is provided from said cylinder to said outer chamber, wherein said big-diameter portion has a cross sectional area substantially twice the cross sectional area of said small diameter portion whereby at thrusting movement of said piston against said coned ring the pressure in said outer chamber is due to the relation of said sectional areas substantially one half of the pressure in said inner chamber, wherein said pump includes :

(a) a radially flexible ringshaped seal lip portion (22) which is subjected from its inner space (clearance) (48) to pressure in said chamber (50) to be sealingly pressed against the inner face (60) of said hollow coned ring (1,11,301) while following radial movements of said inner face under said pressure radially inwardly of said seal lip portion to maintain said seal at said radial movements, and;

(b) said pair of said hollow coned rings elements (1,11,301) with said elements symmetrically arranged around a common axis to form between said hollow elements said chamber (50) with a clamping ring arrangement provided radially outwards of said elements to fasten the radial outer ends of said elements together, wherein said clamping rings (27,28,327,328) form radially flexible ring shaped portion (42,32,332) radially inwards of circular ring grooves (29,329) to meet with the holding faces of said portions (42,32,332) clamping faces (33) on the radial outer ends of said elements (1,11,301), and, wherein said elements (1,11,301) are provided with axially towards the other of said rings (1,11,301) directed outer axial extensions (12) with said extensions (12) formed with bearing faces (13) which meet each other in a pair of bearing faces (23), while a centering ring (20) meets the radial inner faces of said extensions (12) to center said elements (1,11,301) on each other while a seal ring (26) is provided radially inwards of said centering ring (20) to seal said chamber 50.

4. A pump including a fluid containing inner chamber (50) formed between at least two hollow coned, ring elements (1,11 or 301) and at least one closing wall portion, formed by a piston (357), subjected to periodic axial movement with axial compression and expansion of said coned ring elements by said piston (357) which is reciprocably provided in a cylinder (356) and a housing (91,306) surrounding said coned elements for forming an outer chamber (350) around said elements with fluid under pressure passed into said outer chamber at times when fluid is compressed in said inner chamber when said coned rings are compressed, with an improvement which includes that said piston is a differential piston of a small diameter and a big diameter portion with said small diameter portion forming said closing wall portion and said big diameter portion provided axially moveably and sealingly fitting in said cylinder.

wherein a passage is provided from said cylinder to said outer chamber, wherein said big-diameter portion has a cross sectional area substantially twice the cross sectional area of said small diameter portion whereby at thrusting movement of said piston against said coned ring the pressure in said outer chamber is due to the relation of said sectional areas substantially one half of the pressure in said inner chamber, wherein clamping rings are provided around said coned ring elements to keep pairs of oppositionally directed elements of said coned ring elements closely and sealingly together with said clamping rings filling at at least a major portion of said outer chamber to prevent excessive compressible fluid in said outer chamber, wherein dead space fillers are provided in said inner and outer chambers for the prevention of excessive compressible fluid containing spaces in said inner and outer chambers, wherein said pump includes :

(a) a radially flexible ringshaped seal lip portion (22) which is subjected from its inner space (clearance) (48) to pressure in said chamber (50) to be sealingly pressed against the inner face (60) of said hollow coned ring (7,11,301) while following radial movements of said inner face under said pressure radially inwardly of said seal lip portion to maintain said seal at said radial movements, and;

(b) said pair of said hollow coned rings elements (1,11,301) with said elements symmetrically arranged around a common axis to form between said hollow elements said chamber (50) with a clamping ring arrangement provided radially outwards of said elements to fasten the radial outer ends of said elements together, wherein said clamping rings (27,28,329,328) form radially flexible ring (shaped portions (42,32,332) radially inwards of circular ring grooves (29,329) to meet with the holding faces of said portions (42,32,332) clamping faces (33) on the radial outer ends of said elements (1,11,301), and, wherein said elements (1,11,301) are provided with axially towards the other of said rings (1,11,301) directed outer axial extensions (12) with said extensions (12) formed with bearing faces (13) which meet each other in a pair of bearing faces (23), while a centering ring (20) meets the radial inner faces of said extensions (12) to center said elements (1,11,301) on each other while a seal ring (26) is provided radially inwards of said centering ring (20) to seal said chamber 50.

* * * * *